(12) United States Patent
Futaeda et al.

(10) Patent No.: US 8,820,651 B2
(45) Date of Patent: Sep. 2, 2014

(54) INDOOR ENVIRONMENT REGULATING SYSTEM

(75) Inventors: Takaharu Futaeda, Fukuoka (JP);
Kouichi Takada, Mishima (JP);
Shinsuke Fuwa, Nagaokakyo (JP)

(73) Assignee: Ishinoyu Co., Ltd., Fukuoka (JP)

( * ) Notice: Subject to any disclaimer, the term of this patent is extended or adjusted under 35 U.S.C. 154(b) by 983 days.

(21) Appl. No.: 12/989,260

(22) PCT Filed: Apr. 22, 2009

(86) PCT No.: PCT/JP2009/058433
§ 371 (c)(1),
(2), (4) Date: Oct. 22, 2010

(87) PCT Pub. No.: WO2009/131244
PCT Pub. Date: Oct. 29, 2009

(65) Prior Publication Data
US 2011/0042471 A1    Feb. 24, 2011

(30) Foreign Application Priority Data

Apr. 23, 2008  (JP) .................. 2008-113023
Sep. 19, 2008  (JP) .................. 2008-240632
Sep. 19, 2008  (JP) .................. 2008-240679

(51) Int. Cl.
*G05D 23/00* (2006.01)
*F24D 13/02* (2006.01)
*F24D 3/18* (2006.01)
*F24D 19/10* (2006.01)
*F24F 5/00* (2006.01)

(52) U.S. Cl.
CPC .............. *F24F 5/0089* (2013.01); *F24D 13/02* (2013.01); *Y02B 30/12* (2013.01); *F24D 3/18* (2013.01); *F24D 19/1039* (2013.01)
USPC ........................................................ 236/1 C

(58) Field of Classification Search
USPC ............................. 236/1 C; 165/133; 106/13
See application file for complete search history.

(56) References Cited

U.S. PATENT DOCUMENTS 4,965,434 A * 10/1990 Nomura et al. ............... 392/407
5,356,724 A * 10/1994 Tsuda et al. .................. 428/629

(Continued)

FOREIGN PATENT DOCUMENTS

| JE | 10-266374 A   | 10/1998 |
| JP | 01222946 A  * | 9/1989  |

(Continued)

OTHER PUBLICATIONS

International Search Report dated Jul. 21, 2009 in International Application No. PCT/JP2009/058433.

(Continued)

*Primary Examiner* — Marc Norman
(74) *Attorney, Agent, or Firm* — Birch, Stewart, Kolasch & Birch, LLP

(57) ABSTRACT

The invention provides an indoor environment regulating system with excellent energy efficiency. The indoor environment regulating system of the invention is provided with an indoor surface structural member 300, 400 constructed of a material comprising a far-infrared emitting substance that emits and absorbs far-infrared rays and has a far-infrared emissivity of 0.6 or greater, and a cooling and/or heating source 200, 301 having a cooling and/or heating surface constructed of a material comprising the same far-infrared emitting substance as the far-infrared emitting substance of the indoor surface structural member, and wherein when the cooling surface of the cooling source 301 is cooled, the far-infrared emitting substance of the cooling surface absorbs the far-infrared rays emitted by the far-infrared emitting substance of the indoor surface structural member 300, 400, and/or when the heating surface 200 of the heating source is heated, the far-infrared rays 62 emitted by the far-infrared emitting substance of the heating surface are absorbed by the far-infrared emitting substance of the indoor surface structural member 300, 400.

32 Claims, 22 Drawing Sheets

(56) References Cited

U.S. PATENT DOCUMENTS

| | | | |
|---|---|---|---|
| 6,325,060 B1 * | 12/2001 | Okura et al. | 126/94 |
| 2006/0065754 A1 | 3/2006 | Joergensen et al. | |

FOREIGN PATENT DOCUMENTS

| JP | 01223175 A * | 9/1989 |
| JP | 1-154704 U | 10/1989 |
| JP | 2-34919 U | 3/1990 |
| JP | 3-105128 A | 5/1991 |
| JP | 4-270830 A | 9/1992 |
| JP | 6-88632 A | 3/1994 |
| JP | 2000-356364 A | 12/2000 |
| JP | 2002-248029 A | 9/2002 |
| JP | 2004020059 A * | 1/2004 |
| JP | 2004-182918 A | 7/2004 |
| JP | 2007-56649 A | 3/2007 |
| JP | 2007-127292 A | 5/2007 |
| JP | 2007-307243 A | 11/2007 |
| KR | 10-2003-0062525 A | 7/2003 |
| RU | 2 200 808 C1 | 3/2003 |
| RU | 2005 130 460 A | 4/2007 |
| RU | 2300055 C1 | 5/2007 |
| TW | 553918 B | 9/2003 |
| WO | WO 02/49985 A1 | 6/2002 |

OTHER PUBLICATIONS

Decision on Grant dated Feb. 7, 2012 issued in corresponding Russian application No. 2010147666/3(068826). English translation attached.

* cited by examiner

ZrO₂+CaO

Al₂O₃+TiO₂

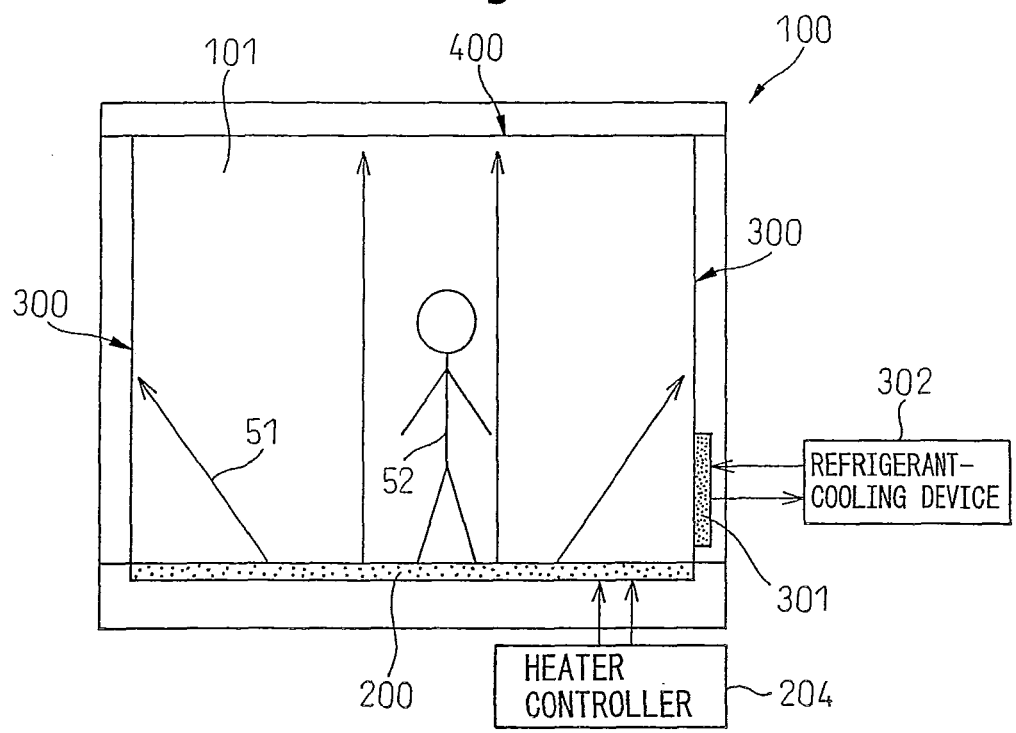
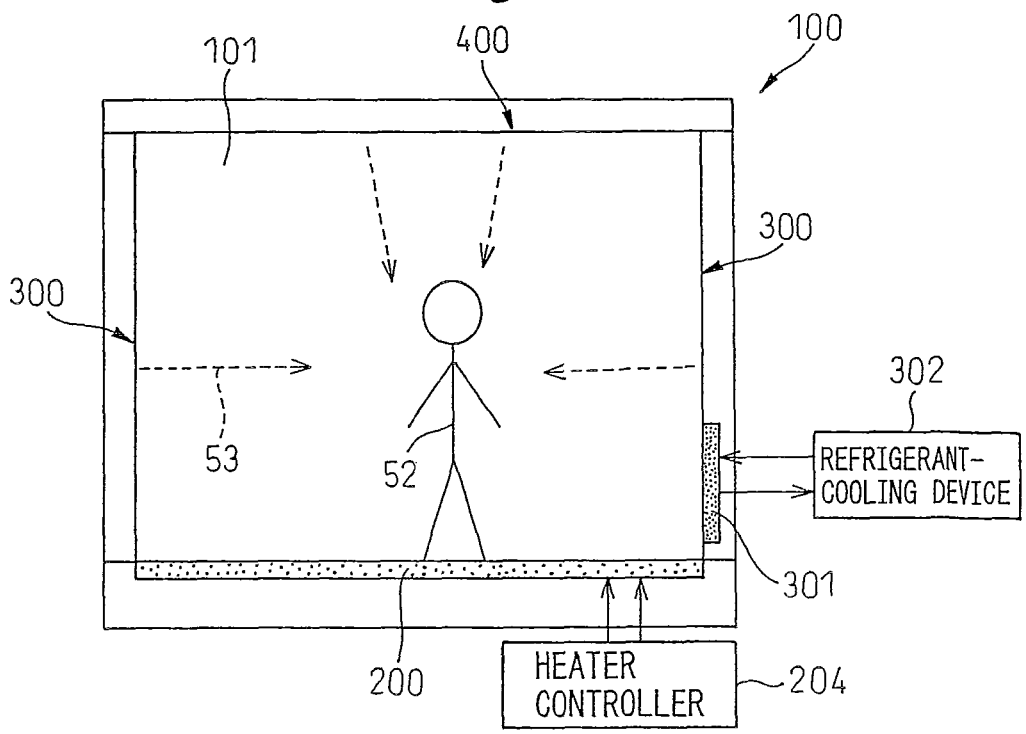

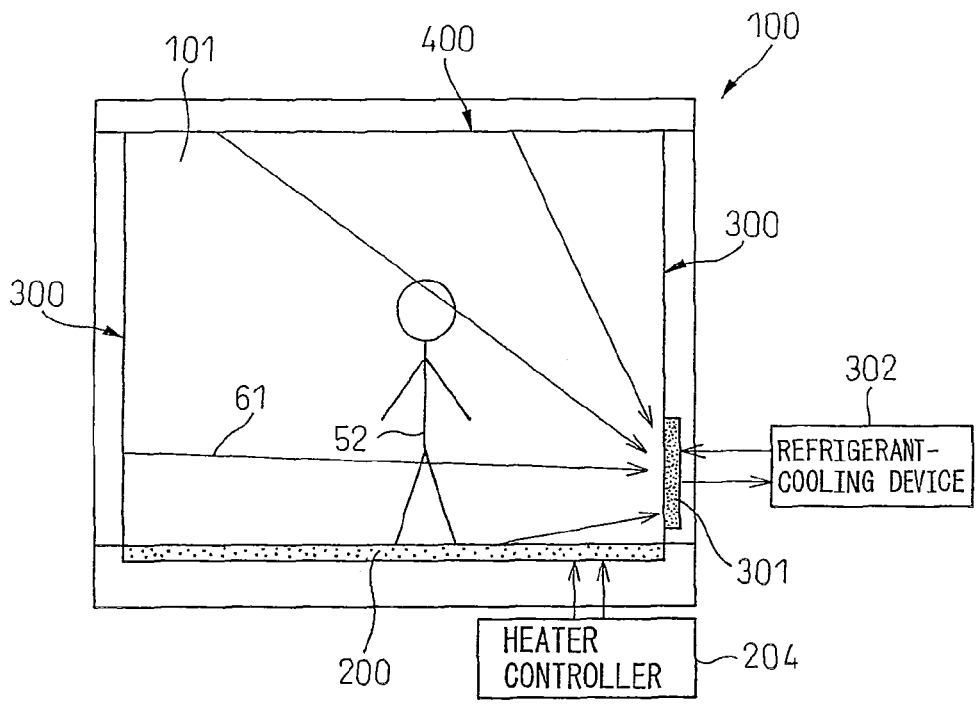
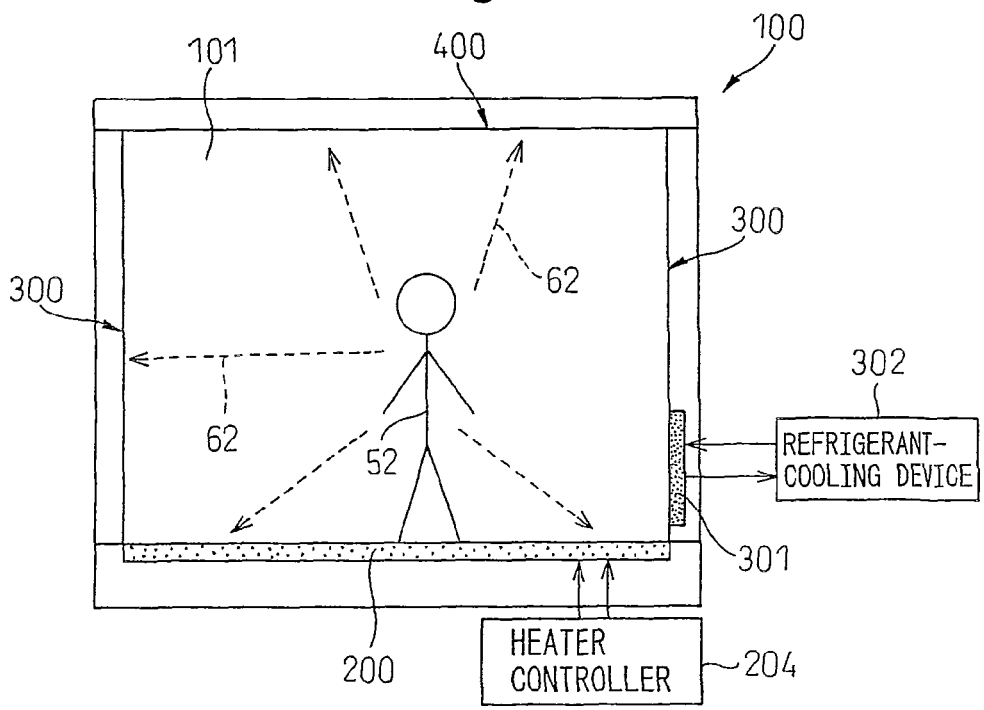

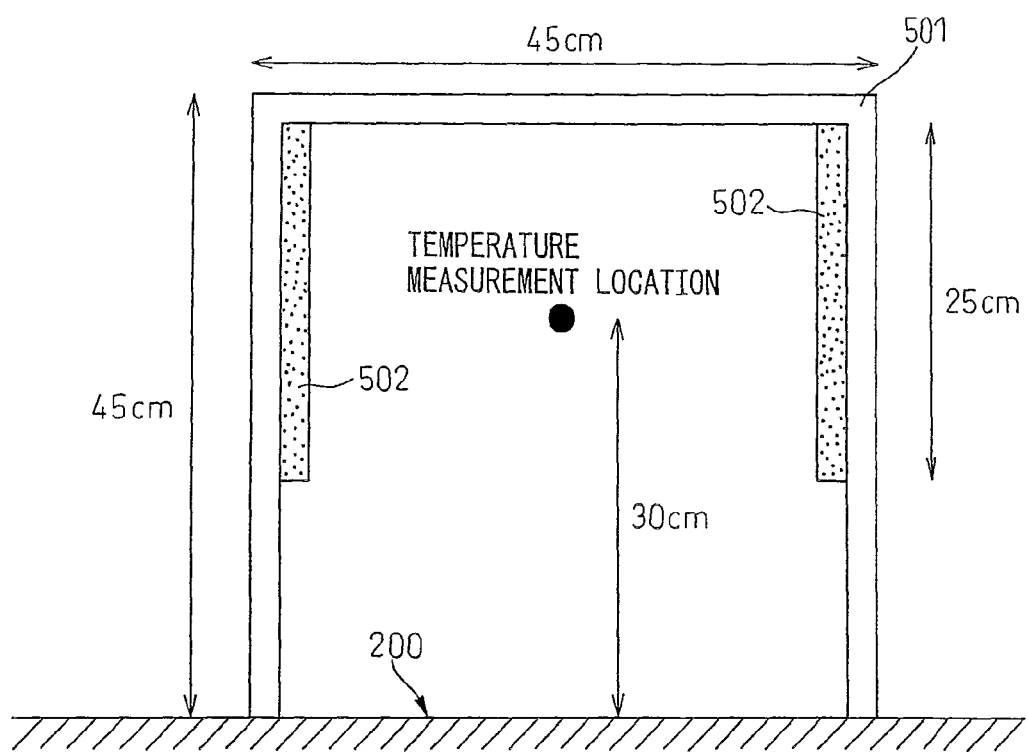

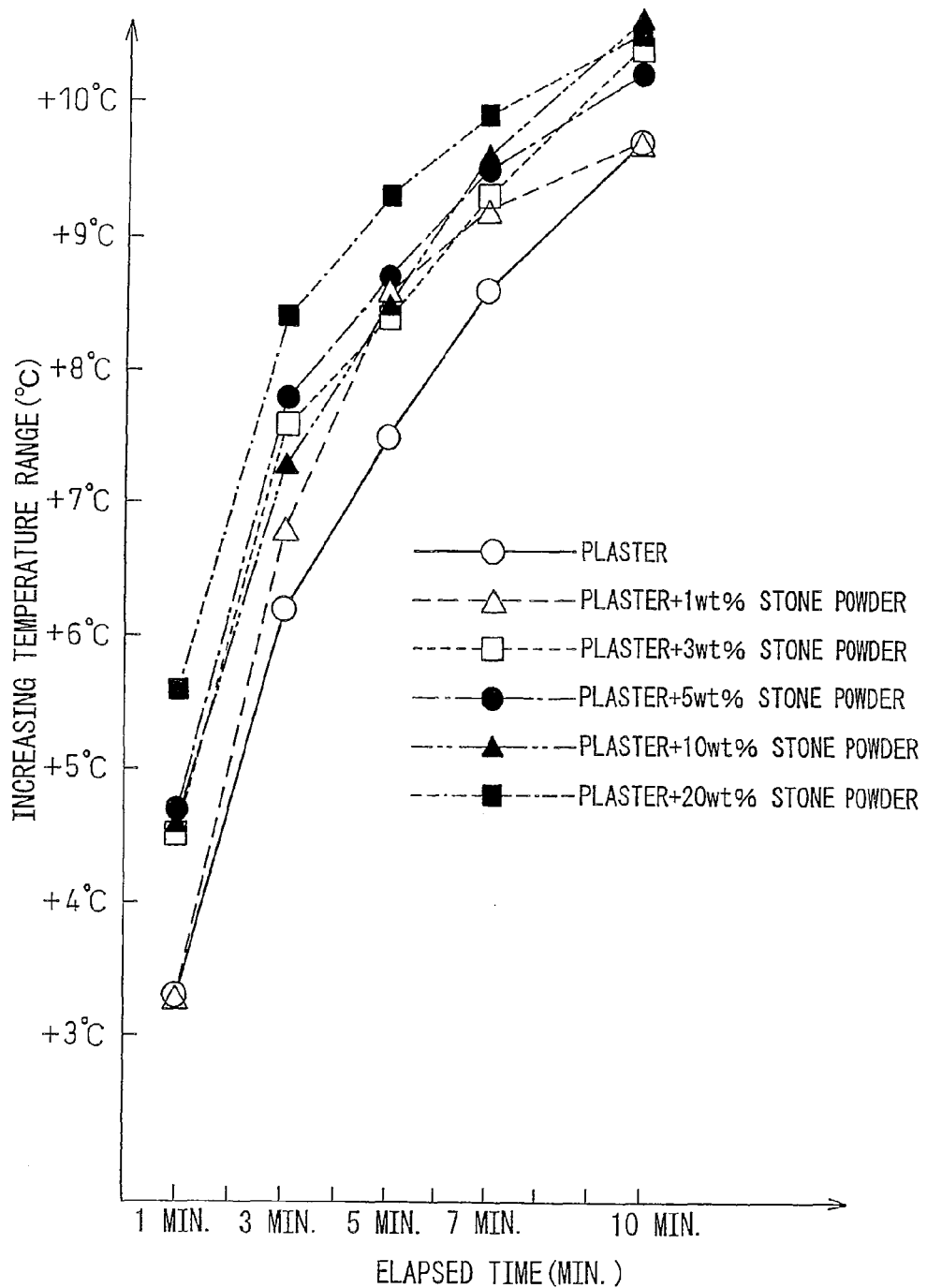

INDOOR ENVIRONMENT REGULATING SYSTEM

TECHNICAL FIELD

The present invention relates to an indoor environment regulating system that utilizes the far-infrared ray emitting and absorbing properties of stone, inorganic material particles or the like to regulate an indoor space to a comfortable environment.

BACKGROUND ART

The primary methods for regulating indoor temperature employ "convection current systems" that create convection of heated or cooled air in indoor spaces. There are also known systems that heat floor faces or that warm from below the feet, such as floor heating systems, and heating systems that utilize radiation, such as ceramic heaters. In addition, there have been proposed mechanisms whereby wall faces or ceilings are cooled by air that has been cooled with artificial cooling devices, to obtain a secondary cooling effect in indoor spaces (see Patent literature 1, for example).

In Patent literature 2 there is described a construction that employs floor heating by radiation of far-infrared rays, as a technology for providing warmth to humans indoors by thermal radiation of far-infrared rays.

Patent literature 3 discloses a radiation air conditioner that accomplishes cooling using cold radiation and heating using thermal radiation.

CITATION LIST

Patent Literatures

Patent literature 1: JP 2000-356364 A
Patent literature 2: JP 2007-307243 A
Patent literature 3: JP 2007-127292 A

SUMMARY OF THE INVENTION

Technical Problems

The convection current systems described above have suffered from the problem of large energy loss, due to the large difference in indoor temperature distribution in the vertical direction. Increased energy loss also results from the 2-stage heat exchange involving heating or cooling of air and then heating or cooling of the human body from the air. In convection current systems, the direct contact of an airflow on the skin causes unpleasantness and adverse effects on health. Heating devices employing floor heating systems or ceramic heaters eliminate the problem of airflow, but their energy utilization efficiency is not very high. In addition, heating devices employing floor heating systems or ceramic heaters have no artificial cooling function, and therefore artificial cooling must be accomplished with convection-type artificial cooling devices.

Problems of airflow are avoided by methods in which air is cooled and contacted with a wall face to cool the wall face, and then radiant heat is absorbed from the cooled wall face, as described in Patent literature 1, but the efficiency of such methods is extremely low and the energy utilization efficiency is also low.

Similarly, the construction employing floor heating which radiates far-infrared rays, described in Patent literature 2, and the radiation air conditioner employing cold radiation and thermal radiation, described in Patent literature 3, are not comparable to convection current systems in terms of efficiency, and they have not been practical.

It is an object of the present invention to solve these problems of the prior art and to provide an indoor environment regulating system that has good energy efficiency and a low difference in temperature distribution in the vertical direction of indoor space, and that does not have the problems associated with contact of an airflow with the skin.

Solution to the Problems

The indoor environment regulating system of the invention may be summarized as follows, including the preferred embodiments thereof.

[1] An indoor environment regulating system, wherein the system is provided with an indoor surface structural member constructed of a material comprising a far-infrared emitting substance that emits and absorbs far-infrared rays and has a far-infrared emissivity of 0.6 or greater, and a cooling and/or heating source having a cooling and/or heating surface constructed of a material comprising the same far-infrared emitting substance as the far-infrared emitting substance of the indoor surface structural member, and wherein when the cooling surface of the cooling source is cooled, the far-infrared emitting substance of the cooling surface absorbs the far-infrared rays emitted by the far-infrared emitting substance of the indoor surface structural member, and/or when the heating surface of the heating source is heated, the far-infrared rays emitted by the far-infrared emitting substance of the heating surface are absorbed by the far-infrared emitting substance of the indoor surface structural member.

[2] An indoor environment regulating system according to [1] above, wherein the indoor surface structural member is constructed of stone comprising the far-infrared emitting substance, or is constructed of a material including the far-infrared emitting substance, or has a film comprising the far-infrared emitting substance, and the cooling and/or heating surface of the cooling and/or heating source is constructed of stone comprising the far-infrared emitting substance, or is constructed of a material including the far-infrared emitting substance, or is constructed of a film comprising the far-infrared emitting substance.

[3] An indoor environment regulating system according to [1] or [2] above, wherein the indoor surface structural member and the cooling and/or heating source are present in the same room.

[4] An indoor environment regulating system according to [1] or [2] above wherein, with a first room and a second room that are either adjacent or connected, the cooling and/or heating source is located in the first room while the indoor surface structural member is located in either or both the first room and second room.

[5] An indoor environment regulating system according to any one of [1] to [4] above, wherein the indoor surface structural member constitutes at least part of the wall face, ceiling face or floor face of an indoor space whose environment is to be regulated.

[6] An indoor environment regulating system according to any one of [1] to [5] above, wherein the indoor surface structural member contains the far-infrared emitting substance at 1 wt % or greater.

[7] An indoor environment regulating system according to [6] above, wherein the indoor surface structural member contains the far-infrared emitting substance at 3 wt % or greater.

[8] An indoor environment regulating system according to any one of [1] to [7] above, wherein the cooling and/or heating surface of the cooling and/or heating source is constructed with a covering layer that contains the far-infrared emitting substance at 1 wt % or greater.

[9] An indoor environment regulating system according to [8] above, wherein the covering layer contains the far-infrared emitting substance at 3 wt % or greater.

[10] An indoor environment regulating system according to [8] above, wherein the covering layer contains the far-infrared emitting substance at 20 wt % or greater.

[11] An indoor environment regulating system according to any one of [8] to [10] above, wherein the cooling and/or heating source is a device that cools and/or heats the cooling and/or heating surface by circulating a medium through an internally formed fluid channel.

[12] An indoor environment regulating system according to any one of [8] to [11] above, wherein the covering layer is formed on the surfaces of heat exchange fins made of a metal material.

[13] An indoor environment regulating system according to any one of [1] to [12] above, wherein the cooling surface carries out dehumidification by condensation.

[14] An indoor environment regulating system according to [13] above, which further comprises means for collecting water that has condensed on the cooling surface.

[15] An indoor environment regulating system according to any one of [1] to [5] above, wherein the indoor surface structural member and/or cooling and/or heating source is a stone floor panel.

[16] An indoor environment regulating system according to any one of [1] to [5] above, wherein the heating source is an electric carpet comprising the far-infrared emitting substance.

[17] An indoor environment regulating system according to any one of [1] to [16] above, wherein the far-infrared emissivity of the far-infrared emitting substance is 0.8 or greater.

[18] An indoor environment regulating system according to [17] above, wherein the far-infrared emissivity of the far-infrared emitting substance is 0.9 or greater.

[19] An indoor environment regulating system according to any one of [1] to [18] above, wherein the indoor surface structural member comprising the far-infrared emitting substance has a total surface area of at least 25% of the inner area of the room in which the indoor surface structural member is located.

[20] An indoor environment regulating system according to [4] above, wherein if means for partitioning the first room and second room are present, the partitioning means comprises the far-infrared emitting substance.

[21] An indoor environment regulating system according to [20] above, wherein the partitioning means is opening and closing means.

[22] An indoor environment regulating system according to any one of [1] to [21] above, wherein at least one of the articles in the indoor space comprises the far-infrared emitting substance.

[23] An indoor environment regulating system according to [22] above, wherein the article is an article of furniture, bedding, clothing, indoor appliance, interior furnishing or storage door.

[24] An indoor environment regulating system according to [23] above, wherein the article is a chair, sofa, table, desk, bed, futon, blanket, bed wear, pillow, cushion, mat, partition, curtain, table cloth or bed cover.

[25] An indoor environment regulating system according to any one of [1] to [24] above, which is used to regulate the environment in a closed space where humans are active or living, a closed space in which articles are stored or exhibited, a closed space for breeding of animals or a closed space for transport vehicles.

[26] An environment regulating system according to [25] above, wherein the closed space in which humans are active or living is a closed space in a separate or multiple dwelling house, an office, an educational facility, a sports facility, a library or a shop.

[27] An environment regulating system according to [25] above, wherein the closed space in which articles are stored or exhibited is a closed space in a warehouse, a showcase or an exhibition case.

[28] An environment regulating system according to [25] above, wherein the transport vehicle is an automobile, railway vehicle, ship or aircraft.

Advantageous Effects of the Invention

According to the invention there is provided an indoor environment regulating system that has good energy efficiency and a low difference in temperature distribution in the vertical direction of indoor space, and that does not have the problems associated with contact of an airflow with the skin.

According to the invention there is also provided technology for regulating living environments utilizing thermal radiation from fabrics comprising clothing and the like.

BRIEF DESCRIPTION OF THE DRAWINGS

FIG. 7A is an illustration of the principle by which a heating effect is obtained with the embodiment shown in FIG. 2.

FIG. 7B is an illustration of the principle by which a heating effect is obtained with the embodiment shown in FIG. 2.

FIG. 8A is an illustration of the principle by which a cooling effect is obtained with the embodiment shown in FIG. 2.

FIG. 8B is an illustration of the principle by which a cooling effect is obtained with the embodiment shown in FIG. 2.

FIG. 9 is an illustration showing an environment in which measurement was carried out to demonstrate the effect of the invention.

FIG. 10 is a graph showing the results of the measurement.

DESCRIPTION OF EMBODIMENTS

Figure 1A:
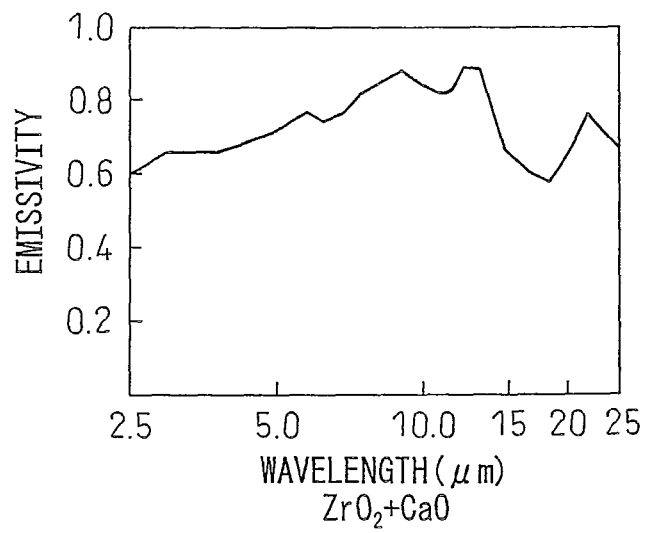
FIG. 1A is a graph showing the emissivity property with respect to wavelength, for a $ZrO_2$+CaO film.

The indoor environment regulating system of the invention is provided with an indoor surface structural member constructed of a material comprising a far-infrared emitting substance that emits and absorbs far-infrared rays and has a far-infrared emissivity of 0.6 or greater, and a cooling and/or heating source having a cooling and/or heating surface constructed of a material comprising the same far-infrared emitting substance as the far-infrared emitting substance of the indoor surface structural member, and wherein when the cooling surface of the cooling source is cooled, the far-infrared emitting substance of the cooling surface absorbs the far-infrared rays emitted by the far-infrared emitting substance of the indoor surface structural member, and/or when the heating surface of the heating source is heated, the far-infrared rays emitted by the far-infrared emitting substance of the heating surface are absorbed by the far-infrared emitting substance of the indoor surface structural member.

The indoor surface structural member is constructed of stone comprising a far-infrared emitting substance (described in detail below), or it is constructed of a material including a far-infrared emitting substance, or it has a film comprising a far-infrared emitting substance. The cooling and/or heating surface of the cooling and/or heating source is constructed of stone comprising a far-infrared emitting substance, or it is constructed of a material including a far-infrared emitting substance, or it is constructed of a film comprising a far-infrared emitting substance.

According to the invention, "indoor surface structural member" refers to a member forming part of a surface exposed in a closed space where the environment is to be regulated. The closed space may comprise opening and closing means, such as a door or window, that allows communication between the inside and outside. The typical closed space is a building room or hallway in which humans live or are active, and there may also be mentioned spaces in which articles are stored or exhibited (for example, warehouse rooms, product showcases or art exhibition cases), rooms for breeding of animals including farm animals, and rooms that house vehicles for transport of persons or cargo (automobiles, railway vehicles, ships, aircraft and the like). For a home in which humans dwell, typical examples of indoor surface structural members are members forming wall faces, ceiling faces and floor faces (building materials). Opening and closing fixtures (swinging doors, paper screens, sliding doors and the like) which are mounted on wall sections and serve to partition the interior and exterior of rooms, are also included in the concept of indoor surface structural members. Indoor surface structural members also include swinging doors and sliding doors for storage, that are installed as additions to rooms. When a storage compartment added to a room whose environment is to be regulated has a structure which is not completely partitioned from the room by its swinging or sliding door, the members of the surfaces of the storage compartment exposed to the room are also included as indoor surface structural members.

One or more of the indoor surface structural members are constructed of a far-infrared emitting substance that emits or absorbs far-infrared rays necessary for regulating the indoor environment according to the invention, or are constructed of a material including the far-infrared emitting substance, or have films comprising the far-infrared emitting substance. In order to efficiently emit and absorb far-infrared rays, the far-infrared emitting substance included in the indoor surface structural member is preferably exposed to the indoor space. However, instead of being directly exposed to the indoor space, the far-infrared emitting substance in the indoor surface structural member may be covered by a protective layer (for example, a coated film, varnish layer, wallpaper or the like having a thickness of no greater than about 1 mm) that does not significantly interfere with emission and absorption of the far-infrared rays of the far-infrared emitting substance.

The "far-infrared emitting substance" is a substance that emits or absorbs far-infrared rays, and a far-infrared emitting substance used for the invention is a far-infrared emitting substance with a far-infrared emissivity of 0.6 or greater and preferably 0.8 or greater.

Such a far-infrared emitting substance will usually be an inorganic material, and this includes natural and artificial minerals, metals and metalloid oxides, nitrides, carbides, sulfides and hydroxides, salts such as carbonates, and their compound forms (double salts), charcoal, as well as natural materials such as seashells. Most far-infrared emitting substances for the invention are ceramic materials in the wide sense (inorganic materials other than metals), but organic materials or organic material-derived substances may also be used if they satisfy the aforementioned conditions for emissivity.

According to the invention, the form of the far-infrared emitting substance in the member comprising the far-infrared emitting substance is not restricted in any particular way so long as the member comprising the far-infrared emitting substance can emit/absorb far-infrared rays, and typical examples include solids (stone) comprising far-infrared emitting substances, members comprising far-infrared emitting substance particles, powder or aggregates (these will also be collectively referred to as "particles"), and members having far-infrared emitting substance films.

According to the invention, "stone comprising a far-infrared emitting substance" is a solid material composed of natural or artificial inorganic material, and it is usually used as a panel- or tile-shaped building material. As examples of natural stone there may be mentioned granite, basalt and the like. Artificially produced stone may of course be used as well. Building materials such as artificial panels and other solid members may also be considered stone.

According to the invention, a "material including a far-infrared emitting substance" is a material containing a far-infrared emitting substance as part of the constituent components. The far-infrared emitting substance in this case is typically included as natural or artificial inorganic material particles in a production material for an indoor surface structural member and/or a production material for the cooling and/or heating surface of a cooling source and/or heating source.

A "film comprising a far-infrared emitting substance" according to the invention is a far-infrared emitting substance film formed on the surface of an indoor surface structural member or cooling and/or heating source. The film can be formed by coating the far-infrared emitting substance on the desired surface by an appropriate film-forming technique, for example a PVD technique such as spraying or vapor deposition, or a CVD technique.

According to the invention, the far-infrared emitting substance of the indoor surface structural member and the far-infrared emitting substance of the cooling and/or heating surface of a cooling and/or heating source are the same. As will be explained in more detail below, the indoor environment regulating system of the invention utilizes a phenomenon in which heat transfer occurs by thermal radiation between identical molecules at higher efficiency than between non-identical molecules, and regulation of an indoor environment is accomplished by the high-efficiency heat transfer by thermal radiation between the indoor surface structural member and the cooling and/or heating surface of the cooling and/or heating source. In order for the system of the invention to exhibit the desired function, therefore, it is necessary for a substance with identical molecular species to be present in the indoor surface structural member and the cooling and/or heating surface of a cooling and/or heating source, between which heat transfer occurs by thermal radiation. According to the invention, the far-infrared emitting substance of the indoor surface structural member and the far-infrared emitting substance of the cooling and/or heating source, which are composed of identical molecular species, are referred to as identical substance. The term "identical molecular species" means that one substance that exhibits a property of emitting/absorbing far-infrared rays and has a far-infrared emissivity of 0.6 or greater and preferably 0.8 or greater (for example, the far-infrared emitting substance used in an indoor surface structural member) and another substance that exhibits a property of emitting/absorbing far-infrared rays and has a far-infrared emissivity of 0.6 or greater and preferably 0.8 or greater (the far-infrared emitting substance used in the cooling and/or heating surface of a cooling and/or heating source) are identical on the molecular level. The term "molecule" means a group of atoms bonded by chemical bonding. Thus, the term "molecule" as used here includes crystals of minerals composing natural stone, for example. Identical minerals having similar elements replaced or made into a solid solution are considered to be substances of identical molecular species. Natural minerals are generally composed of numerous compounds, and differences in the crystal structures of such compounds will often be found on the macroscopic level, depending on their location in the mineral. Even in such cases, however, a mineral carved out from the same place of origin will be an aggregate with essentially the same composition as the substance of essentially the same molecular species, and therefore the whole may likewise be considered a "substance of identical molecular species".

When inorganic material particles are used as the "far-infrared emitting substance" in an indoor surface structural member or the cooling and/or heating surface of a cooling and/or heating source, substances other than the inorganic material particle will usually be copresent as "far-infrared emitting substances". For example, when the indoor surface structural member is formed of plaster containing inorganic material particles as the far-infrared emitting substance, or when the cooling and/or heating surface of a cooling and/or heating source is coated with a coating material comprising inorganic material particles as the far-infrared emitting substance, the inorganic material particles as the "far-infrared emitting substance" are copresent with aggregates in the plaster or binder components in the coating material. In such cases, the substances other than inorganic material particles also have properties of emitting/absorbing some degree of far-infrared rays, as "far-infrared emitting substances". According to the invention, however, the phenomenon whereby heat transfer by thermal radiation between identical molecular species is carried out at notably higher efficiency than between non-identical molecular species is utilized, so that the role performed by substances that are not common to both the indoor surface structural member and the cooling and/or heating surface of a cooling and/or heating source is extremely minimal or negligible according to the invention. Consequently, references to the "far-infrared emitting substance" in the explanation of the invention provided below are to identical substances with far-infrared ray emissivity of 0.6 or greater and preferably 0.8 or greater that are common to both the indoor surface structural member and the cooling and/or heating surface of a cooling and/or heating source (substances that produce a resonance phenomenon of molecular vibration between identical molecules via electromagnetic waves, which is explained below). However, this does not apply when it is clear that the reference to substances that emit or absorb far-infrared rays indicates substances other than the aforementioned "far-infrared emitting substances", or when it is obvious from the context that it refers to other substances.

When inorganic material particles are used as the far-infrared emitting substance of an indoor surface structural member and the cooling and/or heating surface of a cooling and/or heating source, the particle sizes and shapes of both may be the same or different. The contents of the inorganic material particles in both the indoor surface structural member and the cooling and/or heating surface of a cooling and/or heating source do not need to be equal. Also, when the indoor surface structural member forms a wall face and a ceiling face, for example, and inorganic material particles are employed as the far-infrared emitting substance, the particle sizes and shapes of the particles of the far-infrared emitting substance on the wall face and ceiling face may be the same or different. In such cases the inorganic material particles are added to the indoor surface structural member (a building material forming the wall face and ceiling face in this example) to a content that allows the desired heat transfer by thermal radiation between identical molecular species according to the invention. The contents of the inorganic material particles in the building material forming the wall faces and the building material forming the ceiling faces may be the same or different. The same also applies to inorganic material particles of far-infrared emitting substances in two or more wall faces.

Different types of far-infrared emitting substances may be used in the indoor surface structural member and in the cooling and/or heating surface of a cooling and/or heating source. When the far-infrared emitting substance is stone, two or more different stone materials may also be used in combination for the indoor surface structural member or the cooling and/or heating surface of a cooling and/or heating source. When the far-infrared emitting substance consists of inorganic material particles, a mixture of two or more different types of inorganic material particles may be used. In either case, so long as the combination of inorganic material particles in the indoor surface structural member and inorganic material particles in the cooling and/or heating surface of a cooling and/or heating source are the same (the same combinations are included), they are considered to be "identical substances".

The inorganic material particles as the far-infrared emitting substance included in the indoor surface structural member and the cooling and/or heating surface of the cooling and/or heating source are present therein in amounts that allow the desired heat transfer to take place by thermal radiation between the identical molecular species. Indoor surface structural members and cooling and/or heating surfaces of cooling and/or heating sources are usually fabricated away from the building site by different suppliers, and are transported to the building site or worked at the building site. Therefore, the inorganic material particles as the common far-infrared emitting substance in the indoor surface structural member and the cooling and/or heating surface will usually be added by the manufacturing supplier or construction company. In such cases, the content of the inorganic material particles as the far-infrared emitting substance is the amount of inorganic material particles included in the manufacturing materials for the indoor surface structural member and the cooling and/or heating surface of a cooling and/or heating source by each company. The inorganic material particle content in the materials used to form the indoor surface structural member and the cooling and/or heating surface can be set as the amount necessary for effective heat transfer by thermal radiation according to the invention. The amount depends on the amount of heat transfer required for the desired artificial cooling and/or heating, on the area of the indoor surface structural member and the cooling and/or heating surface that can be used for heat transfer by thermal radiation, and on the thermal radiation properties of the far-infrared emitting substance used. In the measuring experiment described below, a significant effect was found when the inorganic material particles as the far-infrared emitting substance were present in an amount of at least 1 wt % in the indoor surface structural member or the material forming the cooling and/or heating surface, and a more desirable effect was obtained when the amount was at least 3 wt %. On the other hand, the upper limit for the content when using inorganic material particles as the far-infrared emitting substance is determined by the maximum amount of inorganic material particles that can be added to the material forming the indoor surface structural member and the cooling and/or heating surface of a cooling and/or heating source in practical terms, and it is not particularly restricted (with even 90 wt %, for example, being possible in theory). However, the maximum amount in practice may be determined by the handleability of the material forming the indoor surface structural member and the cooling and/or heating surface of the cooling and/or heating source, or by the method of producing the indoor surface structural member and the cooling and/or heating surface.

According to the invention, several different types of substances may even be used (using several different substances that are "identical on the molecular level") as the inorganic material particles of the far-infrared emitting substance. In this case, the same mixture of inorganic material particles may be used for the indoor surface structural member and the cooling and/or heating surface of the cooling and/or heating source. The contents of the inorganic material particles in the materials forming the indoor surface structural member material and the cooling and/or heating surface of the cooling and/or heating source in this case are represented as the total amounts of those different substances in the mixtures.

As a particular example, different mixtures may be used in the indoor surface structural member and the cooling and/or heating surface of the cooling and/or heating source so long as they contain one or more identical inorganic material particles. For example, a first type of inorganic material particle alone may be used in a first wall face (indoor surface structural member) and a second type of inorganic material particle alone may be used in a second wall face (indoor surface structural member), while a mixture of two different inorganic material particles may be used in the cooling and/or heating surface.

In order to efficiently emit and absorb far-infrared rays, the far-infrared emitting substance is preferably exposed as much as possible to the indoor space whose environment is to be regulated. However, it is not a significant problem if the far-infrared emitting substance is not directly exposed to the indoor space, so long as it is covered with a protective layer of no greater than about 1 mm (for example, a paint layer, varnish layer, wallpaper or the like).

The far-infrared emitting substance in the indoor surface structural member and the cooling and/or heating surface of the cooling and/or heating source contributes to heat transfer by thermal radiation between identical molecular species according to the invention, mainly by the components exposed on their surfaces, or components near them. Consequently, when the indoor surface structural member and the cooling and/or heating surface of the cooling and/or heating source are constructed of materials including a far-infrared emitting substance, it is appropriate to represent the necessary content of the far-infrared emitting substance in the indoor surface structural member and the cooling and/or heating surface of the cooling and/or heating source by the amount of the far-infrared emitting substance present on or near their surfaces, which are the areas that contribute to heat transfer according to the invention (as mentioned above, a far-infrared emitting substance that is not directly exposed to the indoor space but is present at a depth of up to about 1 mm can also contribute to heat transfer by thermal radiation between identical molecular species according to the invention). Stated differently, the far-infrared emitting substance content according to the invention is properly represented as the far-infrared emitting substance content present on, and at a depth of up to 1 mm in, the surface of the indoor surface structural member and the cooling and/or heating surface of the cooling and/or heating source. However, regardless of whether the indoor surface structural member (defined as a member forming a surface exposed to a space (indoor space) such as a room or hallway whose environment is to be regulated, as explained above) is constructed of a thin film such as paper (for example, wallpaper) or a painted coat film or a sheet-like material, or is constructed of a laminar material of significant thickness formed from plaster or the like, or is constructed of a solid material that also serves as a structural member, formed from concrete or the like, so long as the material is a homogeneous mixture, the far-infrared emitting substance content at or near the surface (up to a depth of 1 mm, for example) (the content represented as the weight proportion of the far-infrared emitting substance in the indoor surface structural member material) can be considered to be the same as the content represented as the weight proportion of the far-infrared emitting substance in the entire indoor surface structural member material. Thus, when the indoor surface structural member of the invention is considered to be composed of a homogeneous mixture (a mixture wherein the distribution of the constituent components is constant throughout the entire member), the far-infrared emitting substance content in the indoor surface structural member is the content represented as the weight proportion of the far-infrared emitting substance in the entire material. When the indoor surface structural member is not considered to be composed of a homogeneous mixture (for example, when the distribution of the constituent components has a bias (concentration distribution) in the direction of thickness of the member), the far-infrared emitting substance content of the indoor surface structural member is represented as the average content (as a weight proportion) of the far-infrared emitting substance present from the surface exposed to the indoor space to a depth of 1 mm. This also applies to the cooling and/or heating surface of the cooling and/or heating source constructed of a material including the far-infrared emitting substance.

The far-infrared emissivity of the far-infrared emitting substance used for the invention is 0.6 or greater, preferably 0.8 or greater and more preferably 0.9 or greater. Far-infrared rays are electromagnetic waves with a wavelength of 3 µm-1000 µm. The emissivity of a material is defined as $W/W_0$, where $W_0$ is the radiant energy for far-infrared rays of an ideal black body, and W is the radiant energy for far-infrared rays of the material under the same conditions. The value of the emissivity is preferred to be a value at room temperature which is near the actual use temperature of the system of the invention (for example, 25° C.), and, for example, the value at near 10 µm where thermal effects on the human body are great is used.

According to the invention, "cooling and/or heating surface" refers to the heat transferring "surface" of the cooling and/or heating source that carries out cooling and/or heating of the indoor surface structural member by heat transfer via thermal radiation between it and the indoor surface structural member. In other words, the "cooling and/or heating surface" is the section of the surface of the cooling and/or heating source in which same far-infrared emitting substance as the far-infrared emitting substance of the indoor surface structural member is present. As explained above, the far-infrared emitting substance is preferably exposed on the surface but may be covered with a protective layer of no greater than about 1 mm. When the cooling surface of the cooling source is cooled, the far-infrared emitting substance on the cooling surface absorbs the far-infrared rays emitted by the far-infrared emitting substance of the indoor surface structural member, and when the heating surface of the heating source is heated, the far-infrared emitting substance of the indoor surface structural member absorbs the far-infrared rays emitted by the far-infrared emitting substance on the heating surface.

The present invention utilizes the phenomenon whereby heat conduction (heat transfer) by thermal radiation between identical molecular species takes place at higher efficiency than between non-identical molecular species, and the basic inventive concept is that the presence of the same far-infrared emitting substance in the cooled surface and at least part of the inner surface of the room causes the inner surface of the room (for example, a wall face) to function as an absorbing member for far-infrared rays from the human body (that is, as a secondary cold radiation source), to obtain a cooling effect that cools the human body. As the reverse principle, it is also the basic inventive concept that if the cooled surface is instead heated for use as the heat-supplying source, the inner surface of the room becomes a far-infrared ray-emitting member (secondary thermal radiation source), which reduces the amount of far-infrared rays absorbed by the inner surface of the room from the human body, thus producing a heating effect which moderates the sense of coldness felt by the human body.

Using the entire inner surface of the room as a cooling surface with cold water or a heating surface with hot water, for example, is difficult from the standpoint of cost and interior design. However, since a wide area can be guaranteed by the walls or ceilings (or floors), as parts of the inner surface of the room, these may be utilized as the cold radiation sources or thermal radiation sources so that the total amount of absorbed or emitted thermal radiation can obtained within that area. In addition, by utilizing the inner surface of the room it is possible to peripherally absorb thermal radiation from the human body in multiple directions surrounding the human body during cooling, and to reduce the thermal radiation from the human body in multiple directions surrounding the human body during heating. Consequently, even if the area of the cooling surface or heating surface is restricted or the installation space is limited, cooling or heating is accomplished utilizing thermal radiation that makes use of the entire inner surface of the room.

The principle by which heat exchange is accomplished at high efficiency by thermal radiation between identical molecular species will now be explained. Heat exchange is accomplished at high efficiency by thermal radiation between identical molecular species because, with substances having identical molecular species (substances having the same composition and the same molecular structure), the phenomenon of molecular vibration resonance occurs between the identical molecules via electromagnetic waves. This can be interpreted as the same phenomenon whereby energy transfer occurs at high efficiency due the sound wave energy propagation phenomenon between tuning forks with the same natural oscillation frequency, or the electrical signal transmission or electromagnetic wave propagation phenomenon between tuned circuits of the same tuning frequency.

Figure 1B:
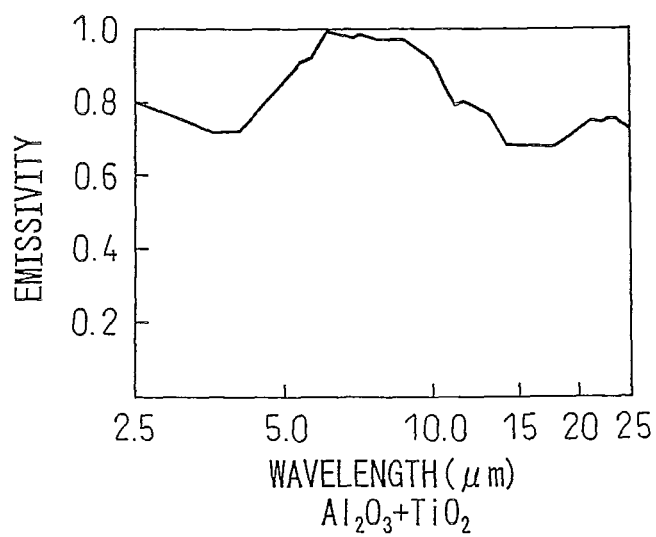
FIG. 1B is a graph showing the emissivity property with respect to wavelength, for an $Al_2O_3$+$TiO_2$ film.

This principle will now be explained based on data. FIG. 1A and FIG. 1B show emission properties for $ZrO_2+CaO$ and $Al_2O_3+TiO_2$ sprayed films (400 µm thickness) heated to 600° C., as data for the emissivity of far-infrared-emitting materials for electromagnetic wavelengths. The component ratio of $ZrO_2$ and CaO and the component ratio of $Al_2O_3$ and $TiO_2$ are both 1:1 (weight ratio).

FIG. 1A and FIG. 1B show that the emissivity properties with respect to wavelength differ between the $ZrO_2$+CaO film and $Al_2O_3$+$TiO_2$ film. This indicates that a different far-infrared emitting substance composition (i.e. different molecular species) will have different emissivity properties with respect to wavelength.

Here it is assumed that a temperature difference exists between the two films, with the $ZrO_2$+CaO film at relatively high temperature and the $Al_2O_3$+$TiO_2$ film at relatively low temperature, and far-infrared rays are emitted from the $ZrO_2$+CaO film and absorbed into the $Al_2O_3$+$TiO_2$ film. Assuming ideal conditions according to Kirchhoff's law, since the emissivity is equal to the absorption rate of the material, the far-infrared rays emitted from the $ZrO_2$+CaO film toward the $Al_2O_3$+$TiO_2$ film at the wavelength at which their emissivities match are absorbed 100% by the $Al_2O_3$+$TiO_2$ film. That is, lossless radiant energy transfer occurs from the viewpoint of energy transport efficiency.

On the other hand, a portion of the far-infrared rays emitted from the $ZrO_2$+CaO film are not absorbed into the $Al_2O_3$+$TiO_2$ film due to the difference in emissivities (absorption rates) at any wavelength where the emissivity of the $ZrO_2$+CaO film is a larger value than the emissivity of the $Al_2O_3$+$TiO_2$ film. This is because, since emissivity=absorption rate, if (emissivity of substance A>emissivity substance B=absorption rate of substance B) at that wavelength, a portion of the radiant energy emitted from substance A will not be absorbed into substance B. For example, when the emissivity of substance A is 0.9 and the emissivity of substance B is 0.1 at a certain wavelength, the far-infrared rays at that wavelength emitted from substance A will be absorbed by substance B only minimally, while most will be reflected. This may be considered lossy radiant energy transfer, from the viewpoint of energy transport efficiency.

If the temperature difference relationship is reversed and far-infrared rays emitted from the $Al_2O_3$+$TiO_2$ film are absorbed into the $ZrO_2$+CaO film, then by the same logic, the far-infrared rays emitted from the $Al_2O_3$+$TiO_2$ film toward the $ZrO_2$+CaO film will be absorbed 100% into the $ZrO_2$+CaO at the wavelength at which their emissivities match (under ideal conditions). At wavelengths in which the emissivity of $ZrO_2$+CaO is smaller than the emissivity of $Al_2O_3$+$TiO_2$, however, a portion of the far-infrared rays having those wavelengths that are emitted from the $Al_2O_3$+$TiO_2$ are not absorbed by the $ZrO_2$+CaO, and loss is generated.

In other words, even under ideal conditions, loss is generated in the exchange of thermal radiation between materials with different emissivity properties with respect to wavelength (i.e. between different molecular species). On the other hand, no loss is generated in the exchange of thermal radiation under ideal conditions between materials with the same emissivity properties with respect to wavelength (i.e. between identical molecular species). The present invention provides an indoor environment regulating system based on the principle described above, wherein heat exchange by thermal radiation between identical molecular species occurs at high efficiency.

Embodiments of the invention will now be explained with reference to the accompanying drawings. In the explanation which follows, the cooling surface of the cooling source will usually be referred to as "cooling/dehumidifying surface". As a comment in this regard, the system of the invention utilizes the phenomenon by which heat transfer occurs by thermal radiation between identical molecular species at higher efficiency than between non-identical molecular species, so that heat transfer by thermal radiation between the indoor surface structural member and the cooling surface of the cooling source occurs at high efficiency, to obtain a cooling effect. In this system, dehumidification on the cooling surface is merely a secondary effect. The cooling surface exhibits a cooling effect by being cooled with a refrigerant or the like. If the temperature of the cooled cooling surface is lowered to below the dew point of the moisture in the indoor environment, condensation will occur on the cooling surface and as a result the dehumidification will essentially be accomplished. Since moisture in the air is an far-infrared ray-absorbing substance, it will tend to inhibit the far-infrared absorption function of the indoor surface structural materials, such as walls, and the far-infrared absorption from the human body into the indoor surface structural members. Consequently, when an indoor environment is dehumidified as a result of condensation on the cooling surface, it is possible to efficiently increase the cooling effect of utilizing emission by the system of the invention. Furthermore, since the discomfort index is reduced as a result of dehumidification, it is possible to increase the cooling effect from this viewpoint as well. While dehumidification is thus advantageous in the system of the invention, it is not indispensable, and whether or not dehumidification occurs will depend on the humidity of the indoor environment in which the system of the invention is applied and on the temperature of the cooling surface which is cooled with a refrigerant or the like. Nevertheless, considering that there is no disadvantage to dehumidification by condensation on a cooling surface and that the humidity is often high in high-temperature environments in which the system of the invention will be applied, the cooling surface of the cooling source will be referred to as "cooling/dehumidifying surface" in the explanation that follows.

Figure 2:
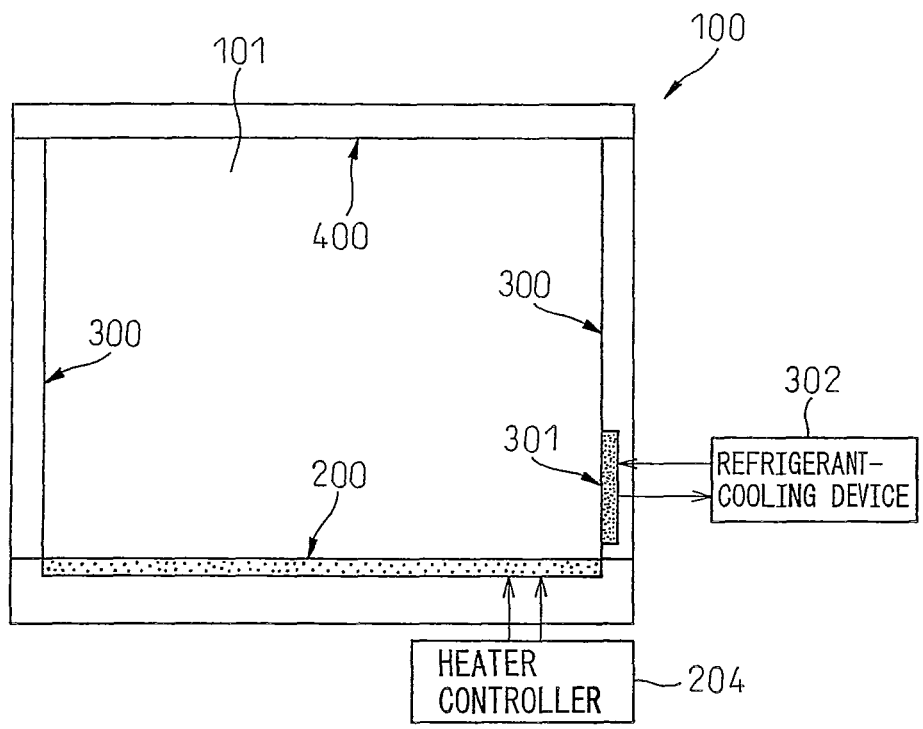
FIG. 2 is an illustration of an embodiment of an indoor environment regulating system according to the invention.

FIG. 2 is a conceptual drawing showing an overview of a room furnished with an indoor environment regulating system according to the invention, as an embodiment of the invention. A room 100 is shown in FIG. 2. The room 100 is a room for residence in a detached house or multiple dwelling house. The room 100 comprises a hexahedronal indoor space 101. The interior of the indoor space 101 is composed of a floor face 200, wall faces 300 and a ceiling face 400.

The floor face 200 comprises a floor panel obtained by fashioning natural stone, and it is warmed by an electric heater which is controlled by a heater controller 204. As the floor face 200 is warmed, the far-infrared ray-emitting effect of the natural stone functions as a heating surface to emit far-infrared rays in the room 101. An electric carpet containing a far-infrared emitting substance (for example, natural stone powder particles or the like) may also be utilized as having the same function as the floor panel.

The wall faces 300 are composed of plaster comprising a mixed ground product obtained by grinding the natural stone composing the floor face 200. A cooling/dehumidifying surface 301 is provided on part of the wall faces 300. The cooling/dehumidifying surface 301 includes on its outer surface a ground product obtained by grinding the same natural stone composing the floor face 200. The cooling/dehumidifying surface 301 is cooled by a refrigerant which is in turn cooled by a refrigerant-cooling device 302. Also, as explained below, a dehumidification device employing the cooling/dehumidifying surface 301 is constructed. The installation area of the cooling/dehumidifying surface 301 constitutes 5% of the wall faces 300.

While not shown here, a window and door are also provided on the wall faces 300. In this example, the combined area of the window and door is 30% of the wall faces 300. The ceiling face 400 is composed of a gypsum board containing a ground product obtained by grinding the same natural stone composing the floor face 200.

In this example, the total heat capacity of the natural stone in the floor face 200 is designed to about approximately 3 times the heat capacity of the air occupying the indoor space 101 (calculated at a temperature of 20° C. and a humidity of 50%). Also, a metal foil sheet as a reflective layer is provided on the rear side of the stone floor of the floor face 200 and on the rear sides of the layers comprising the natural stone on the wall faces 300 and ceiling face 400, so that the far-infrared rays are reflected in the direction of the room (i.e., so that the far-infrared rays do not escape out of the room).

Figure 3:
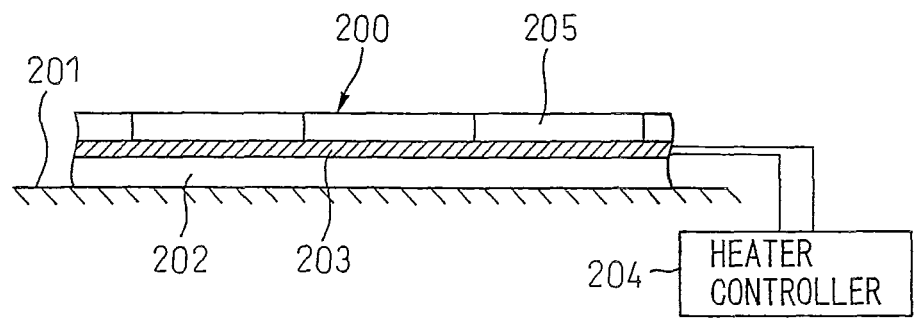
FIG. 3 is an illustration of the floor structure for the embodiment shown in FIG. 2.

FIG. 3 is a conceptual drawing showing the cross-sectional structure of the floor. FIG. 3 shows the ground layer structure 201 of the room 101. The ground layer structure 201 is a structure forming the ground layer of the floor. In this example, the heat insulating material 202 is situated on the ground layer structure 201, and a heat release layer 203 employing an electrothermal heater is provided on it. Driving current is supplied to the heat release layer 203 from a heater controller 204. On the lower side of the heat release layer 203 there is stretched a metal foil sheet (not shown), and it has a structure such that it reflects far-infrared rays in the direction of the stone floor panel 205.

A stone floor panel 205 obtained by working natural stone into a 30 mm-thick panel is provided over the heat release layer 203. The natural stone comprising the stone floor panel 205 is granite, and it is selected so that the far-infrared emissivity is about 0.9. In this example, the entire floor face 200 has the structure shown in FIG. 3.

When a current is supplied to the heat release layer 203 and the heat release layer 203 releases heat, the heat is transferred to the stone floor panel 205, thus warming the stone floor panel 205. The warmed state of the stone floor panel 205 is adjusted by the heater controller 204. The warmed stone floor panel 205 emits far-infrared rays toward the indoor space 101.

The heat release layer 203 may also have a construction in which hot water is circulated to transfer heat to the stone floor panel. For this purpose, sunlight may be used to obtain the hot water and thus reduce usage cost. The stone floor panel 205 may be made of another natural stone or ceramic material with a far-infrared emissivity of 0.6 or greater, preferably 0.8 or greater and more preferably 0.9 or greater.

Figure 4A:
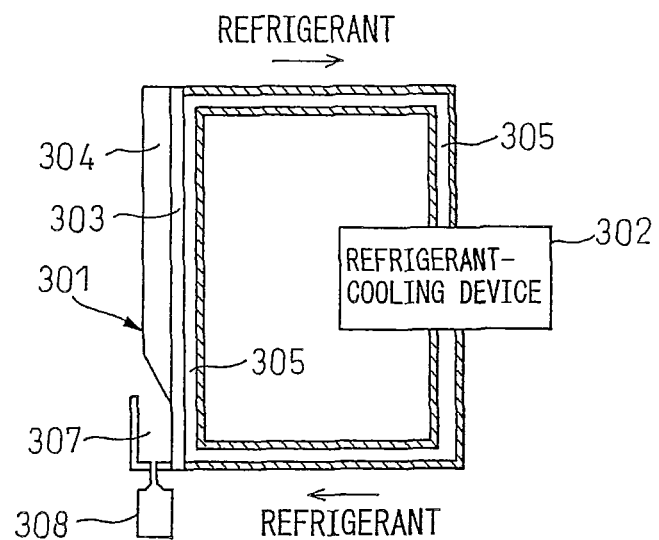
FIG. 4A is an illustration of the cooling/dehumidifying device of the embodiment shown in FIG. 2.
Figure 4B:
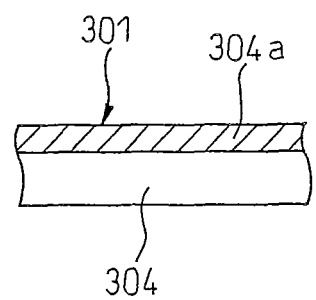
FIG. 4B is an illustration of the fin structure in the cooling/dehumidifying device of FIG. 4A.

FIG. 4A is a conceptual drawing showing an overview of a cooling/dehumidifying device, and FIG. 4B shows a cross-sectional view of a portion thereof. As shown in FIG. 4A, the cooling/dehumidifying device comprises a cooling/dehumidifying surface 301. The cooling/dehumidifying surface 301 comprises multiple fins 304 made of aluminum coated on the surface as described below. The fins 304 are thin sheets that extend vertically. The fins 304 may be constructed of another metal material or alloy material with satisfactory heat conduction, such as iron or copper or an alloy thereof, for example.

As shown in FIG. 4B, the surface of each fin 304 is covered with a far-infrared absorption layer 304a. The far-infrared absorption layer 304a is obtained by mixing a binder with a ground product obtained by grinding the natural stone composing the stone floor panel 205, and coating the surfaces of the fins 304 with the mixture in a laminar fashion and drying.

An example of a method for forming the far-infrared absorption layer 304a of the fin 304 surfaces will now be explained briefly. First, the natural stone composing the floor face 200 is ground to a mean particle size of 5-100 μm (approximately 50 μm in the case described here), and 40 parts by weight thereof is prepared. Next, 60 parts by weight of the coating material that is to function as the binder is prepared, and is combined with a solvent (not part of the quantity) and the previously ground natural stone. The mixture is coated onto the surfaces of the fins 304 to a thickness of 500 μm and dried to form a far-infrared absorption layer 304a. The content of the ground product obtained by grinding the natural stone comprising the floor face 200 is 40 wt % in the far-infrared absorption layer 304a formed in this manner, for this example. Since heat transfer by thermal radiation between identical molecular species (radiation heat transfer) is utilized according to the invention, the content of the ground product to be included in the far-infrared absorption layer 304a will depend on the quantity of heat which is to migrate by thermal radiation, as well as on the total area of the far-infrared absorption layer 304a. Generally speaking, the far-infrared absorption layer 304 may contain the ground product at 1 wt % or greater, or it may even contain the ground product at 10 wt %, 20 wt % or greater.

The fins 304 are formed integrally with an aluminum support plate 303. The rear side of the support plate 303 is exposed to a refrigerant passageway 305. Also, a layer identical to the far-infrared absorption layer 304a is provided on the front side (indoor side) of the support plate 303. Cold water is circulated as a refrigerant through the refrigerant passageway 305. The refrigerant is cooled by the refrigerant-cooling device 302. The cooling mechanism of the refrigerant-cooling device 302 is the same as that used in an ordinary air conditioner or refrigerator.

A drainage conduit 307 is provided under the cooling/dehumidifying surface 301. When cooling water is circulated through the refrigerant passageway 305, the fins 304 are cooled and the far-infrared absorption layer 304a on the surface of the fins 304 is also cooled. By cooling of the far-infrared absorption layer 304a, the ground product in the far-infrared absorption layer 304a absorbs far-infrared rays emitted from the floor face 200, wall faces 300 and ceiling face 400, thus accomplishing cooling of the environment in the room 100. Moisture in the air of the indoor space 101 condenses on the surface of the far-infrared absorption layer 304a. The condensed water droplets fall down into the drainage conduit 307. Below the drainage conduit 307 there is fitted a collecting tank 308 in a detachable manner, provided so that water falling into the drainage conduit 307 pools in the collecting tank 308. The dehumidifying device is designed with this structure to collect condensed moisture.

The refrigerant need only be at a lower temperature than the environmental temperature, and therefore it is not limited to cold water but may also be a refrigerant gas. The refrigerant-cooling device 302 is not limited to the one described above, and any device that can cool a refrigerant may be utilized. The cooling/dehumidifying surface may also be constructed with the floor face or ceiling face, but modifications are necessary for treatment of condensed water droplets. Also, instead of providing the cooling/dehumidifying surface on part of a wall face, it may be separately installed in the room. However, it is important for the cooling/dehumidifying surface to be exposed to the indoor space and for heat exchange to be carried out by radiation between the floor, wall and ceiling faces. The surface of the cooling/dehumidifying surface may be composed of stone. Also, the electric power of the refrigerant-cooling device 302 is preferably supplemented by electric power generated by a solar cell. The artificial cooling accomplished using the refrigerant-cooling device 302 has high cooling efficiency compared to ordinary convection-type artificial cooling apparatuses (air conditioners), and therefore the electric power can be adequately supplemented by solar cell electric power generation.

Figure 5:
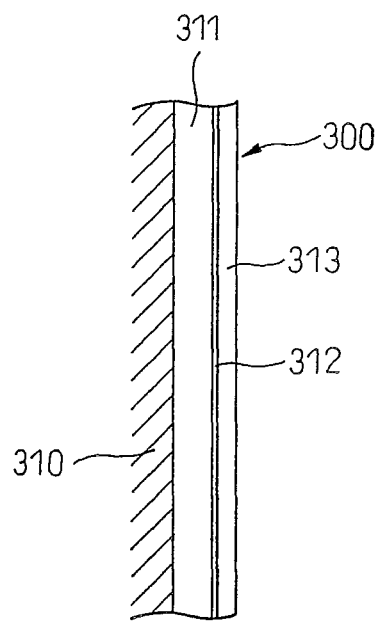
FIG. 5 is an illustration of the wall structure for the embodiment shown in FIG. 2.

FIG. 5 is a conceptual drawing showing the cross-sectional structure of a wall. The wall faces 300 shown in FIG. 2 each have the cross-sectional structure shown in FIG. 5. FIG. 5 shows the foundation structure 310 for the ground layer structure of the wall. A thermal insulating board 311 is mounted on the indoor side of the foundation structure 310. A metal foil sheet 312 is stretched on the thermal insulating board 311 and a plaster layer 313 is formed thereover.

The plaster layer 313 is composed of a starting material that is obtained by mixing a material prepared by grinding the same natural stone composing the stone floor panel 205 to a mean particle size of 5-100 μm (about 50 μm in the case described here) with an ordinary plaster material (a starting material containing no water) in an amount of 20 wt % with respect to the ordinary plaster starting material, and then adding water thereto and kneading the mixture. The thickness of the plaster layer 313 is 30 mm and the processing method is the same as for ordinary plaster walls.

Figure 6:
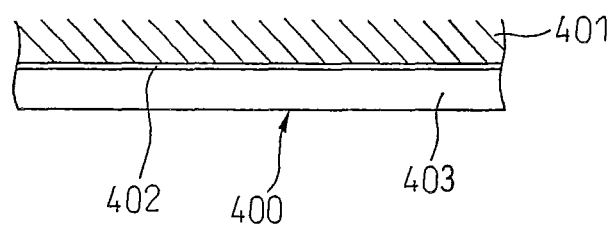
FIG. 6 is an illustration of the ceiling structure for the embodiment shown in FIG. 2.

FIG. 6 is a conceptual drawing showing the cross-sectional structure of the ceiling. The ceiling face 400 shown in FIG. 2 has the cross-sectional structure shown in FIG. 6. FIG. 6 shows the foundation structure 401 for the ground layer structure of the ceiling. In this example, a metal foil sheet 402 is provided under the foundation structure 401, and a 20 mm-thick gypsum board 403 is additionally installed. The gypsum board 403 has a composition including 10 wt % of the same natural stone composing the floor face 200, ground to a mean particle size of 5-100 μm (about 50 μm in the case described here).

The principle of heating in the embodiment of the invention described with reference to FIGS. 2 to 6 will now be explained. Since the present invention is a technique for causing absorption of radiant heat into the body of a human in an indoor space to produce a warm feeling in the human, the term "heating" will be used here to mean the effect of producing a warm feeling in a human in an indoor space. FIGS. 7A and 7B are conceptual drawings illustrating the principle by which a heating effect is obtained. Instead of operating a refrigerant-cooling device 302, heating is accomplished by operating a heater controller 204 to heat the floor face 200. This causes heating of the stone floor panel 205 of the floor face 200 (see FIG. 3), so that far-infrared rays are emitted from the stone floor panel 205 to the indoor space 101. In FIG. 7A, the far-infrared rays emitted from the floor face 200 are shown conceptually by arrows indicated by the numeral 51.

A portion of the far-infrared rays emitted from the floor face 200 are absorbed into the human 52 and into the far-infrared-absorbing components in the air of the indoor space 101, while the rest are absorbed into the wall faces 300 and ceiling face 400. At this time, since (1) the wall faces 300 and ceiling face 400 are not heated (i.e., their temperature is lower than the floor face 200), and (2) the wall faces 300 and ceiling face 400 contain powder of the same stone as the stone that serves as the far-infrared ray-generating source from the floor face 200, the far-infrared rays emitted by the floor face 200 are efficiently absorbed into the wall faces 300 and ceiling face 400.

The wall faces 300 and ceiling face 400 that have absorbed far-infrared rays from the floor face 200 re-emit far-infrared rays. In FIG. 7B, the re-emitted far-infrared rays are shown conceptually by broken arrows indicated by the numeral 53. A portion of the re-emitted far-infrared rays 53 are absorbed into the human 52 and into the far-infrared-absorbing components in the air of the indoor space 101, while the rest are re-absorbed again into the wall faces 300 and ceiling face 400. Since far-infrared rays are reflected into the indoor space by the metal foil sheets on the rear sides of the wall faces 300 and ceiling face 400 during re-emission of the far-infrared rays, dissipation of the heat energy of the far-infrared rays emitted from the floor face 200 is minimized. This allows more effective utilization of energy.

By repeated occurrence of the phenomenon illustrated by FIG. 7A→FIG. 7B→FIG. 7A, a human in the indoor space feels warmed by receiving far-infrared rays (radiant heat) from the surroundings, while the far-infrared-absorbing components in the air of the indoor space absorb the far-infrared rays and rise in temperature. A heating effect is thus obtained. In addition, the floor face 200 is heated and itself increases in temperature, thus creating the same effect as floor heating, and therefore this heating effect is simultaneously produced.

The heating effect according to the invention described above accomplishes heating not by convection or heat conduction but rather by radiation that travels across the entire indoor space, and therefore deviation in temperature distribution in the indoor space and particularly the vertical direction is minimized. Furthermore, since only the floor face is directly heated, heat from the far-infrared rays emitted from the floor face can be utilized for heating, thus contributing to effective utilization of energy. Energy waste can therefore be minimized. Also, since the human body feels warmth not only from increased room temperature but also from radiant heat, it is possible to achieve effective utilization of inputted energy from this standpoint as well. In addition, since no airstream flow is used, there is no unpleasantness or adverse effect on health from contact of hot air on the skin. It is possible to achieve zero emission when utilizing hot water obtained using solar heat as the heating source or in-house power generation with solar cells.

The principle of cooling according to the present embodiment will now be explained. Since the present invention is a technique for causing absorption of radiant heat into the body of a human in an indoor space to produce a warm feeling in the human, the term "cooling" will be used here to mean the effect of producing a cool feeling in a human in an indoor space. FIGS. 8A and 8B are conceptual drawings illustrating the principle by which a cooling effect is obtained. In this case, there are two cooling effects: (1) a cooling effect when neither the heater controller 204 nor the refrigerant-cooling device 302 are operated, and (2) a cooling effect when the heater controller 204 is not operated but the refrigerant-cooling device 302 is operated. First, the cooling effect in case (1) will be explained.

In case (1), neither the heater controller 204 nor the refrigerant-cooling device 302 are operated. However, since the floor face 200 has a stone floor panel with a large heat capacity provided on it, it a maintains temperature at times of lowest atmospheric temperature such as nighttime or daybreak. In other words, the floor face (stone floor) 200 that has cooled during times of lowest atmospheric temperature such as nighttime or daybreak increases in temperature thereafter as the atmospheric temperature rises, but because its heat capacity is large, the temperature does not increase as much as the atmospheric temperature increase. Therefore, a cold feeling is produced even during daytime when the atmospheric temperature has increased. This can also be confirmed by experience.

On the other hand, the wall faces 300 and ceiling face 400 have low stone contents compared to the floor face 200, and their heat capacities are considerably smaller than the floor face. Therefore, when the atmospheric temperature increases during daytime, the wall faces 300 and ceiling face 400 are affected so that their temperatures rise to relatively high temperatures compared to the floor face 200.

For example, when the minimum atmospheric temperature at daybreak is 20° C. and the maximum atmospheric temperature at daytime is 28° C., the floor face 200 is at a temperature of about 22-23° C. at daybreak, and moderate shading of the indoor space results in a maximum temperature of about 25-26° C. even during daytime. On the other hand, the temperature of the wall faces 300 which have low heat capacity is several degrees higher than the floor face, while the ceiling face 400 is at a temperature near atmospheric temperature.

As a result, far-infrared rays are emitted from the wall faces 300 or ceiling face 400, that are at relatively high temperature, toward the floor face 200 that is at relatively low temperature, such that the far-infrared emitting substances in the wall faces 300 and ceiling face 400 are cooled. This cooling is very immediate because the heat capacities of the wall faces 300 and ceiling face 400 are smaller than the heat capacity of the floor face 200. Heat at the wall faces 300 and ceiling face 400 is removed by the mechanism of absorption of far-infrared rays into the floor face 200, so that absorption of far-infrared rays by the wall faces and ceiling face occurs easily in proportion to the amount of emission. During this time, since the floor face 200 has a surface made of stone while the wall faces 300 and ceiling face 400 comprise ground products of the stone, heat migrates efficiently via the far-infrared rays.

As a result, as shown in FIG. 8B, the far-infrared rays emitted by a human 52 are easily absorbed into the floor face 200, wall faces 300 and ceiling face 400, producing a feeling of coolness for the human 52. In addition, the far-infrared rays emitted from primarily moisture in the air are also easily absorbed into the floor face 200, wall faces 300 and ceiling face 400, thus lowering the atmospheric temperature.

The cooling function in case (1) is a passive function that does not require electric power energy for cooling, and this is highly desirable from the viewpoint of energy irradiation and not increasing the burden on the environment. However, in this case, when the external air temperature is above 30° C. and the humidity is greater than 60%, for example, the cooling effect will not be sufficient and the burden of heat on the human body increases. That is, the body will feel hot. In such situations, the cooling effect of case (2) explained hereunder can produce a degree of cooling to allow sufficiently comfortable living.

In case (2), the heater controller 204 is not operated, while the refrigerant-cooling device 302 is operated to cool the cooling/dehumidifying surface 301. Cooling of the cooling/dehumidifying surface 301 causes the cooling/dehumidifying surface 301 to be at a lower temperature than the floor face 200, wall faces 300 and ceiling face 400. Consequently, the heat balance is significantly disturbed, and far-infrared rays are emitted from the floor face 200, wall faces 300 and ceiling face 400 toward the cooling/dehumidifying surface 301, and are absorbed into the cooling/dehumidifying surface 301. During this time, since the floor face 200 has a surface composed of the same type of stone as the ground product coated on the surface of the cooling/dehumidifying surface 301, and the wall faces 300 and ceiling face 400 comprise the same ground product coated on the surface of the cooling/dehumidifying surface 301, migration of heat via far-infrared rays takes place at high efficiency.

This situation is illustrated in FIG. 8A. FIG. 8A conceptually shows the situation in which far-infrared rays are emitted from the floor face 200, wall faces 300 and ceiling face 400 toward the cooling/dehumidifying surface 301 and are absorbed into the cooling/dehumidifying surface 301, as indicated by a solid arrows 61. The temperatures at each section in this case are in the relationship: ceiling face 400>wall faces 300>floor face 200>cooling/dehumidifying surface 301.

The floor face 200, wall faces 300 and ceiling face 400 are removed of their heat by the mechanism of absorption of far-infrared rays into the cooling/dehumidifying surface 301, so that absorption of far-infrared rays occurs easily in proportion to the amount of emission. This is manifested as temperature reduction in the floor face 200, wall faces 300 and ceiling face 400, and can be interpreted as increased ability to absorb radiant heat, as a large shift occurs from the equilibrium state as a result of supplying radiant heat to the cooling/dehumidifying surface 301.

As a result, the far-infrared rays emitted by the human 52 are easily absorbed into the floor face 200, wall faces 300 and ceiling face 400. This condition is illustrated in FIG. 8B. That is, FIG. 8B conceptually shows a state in which radiant heat indicated by the broken arrows 62 is being absorbed into the floor face 200, wall faces 300 and ceiling face 400.

The far-infrared rays emitted from the human 52 are easily absorbed into the floor face 200, wall faces 300 and ceiling face 400, and therefore the heat of the human 52 is absorbed into the floor face 200, wall faces 300 and ceiling face 400 in the form of thermal radiation. As a result, the body of the human 52 loses heat and is cooled, thus producing a cool feeling for the human 52. This also applies to heat energy of the far-infrared-absorbing components in the air in the indoor space 101. That is, the floor face 200, wall faces 300 and ceiling face 400 readily absorb far-infrared rays, so that the heat energy of the far-infrared-absorbing components in the air in the indoor space is absorbed into the floor face 200, wall faces 300 and ceiling face 400 in the form of radiant heat. As a result, the room temperature is reduced.

While this effect only lowers the room temperature by about 1-2° C., the heat is lost to the floor face 200, wall faces 300 and ceiling face 400 in the form of direct radiant heat from the body, and therefore the human 52 may feel cooler than the actual reduction in room temperature.

Also, since cooling of the cooling/dehumidifying surface 301 causes condensation on the surface and the condensed water droplets are captured by the mechanism shown in FIG. 4A and collected, it is also possible to obtain a dehumidifying function. Since moisture in the air is a good far-infrared absorption component, it inhibits the effect that utilizes far-infrared ray emission, indicated by numerals 61 and 62 in FIGS. 8A and 8B. Consequently, removal of the moisture in the air increases the function of creating a condition in which far-infrared rays are more easily absorbed by the floor face 200, wall faces 300 and ceiling face 400, which utilizes the aforementioned emission of far-infrared rays, and the efficiency of radiant heat absorption from the human body into the floor face 200, wall faces 300 and ceiling face 400, while also increasing the cooling effect caused by absorption of radiant heat from the human body. In addition, the dehumidifying function lowers the discomfort index, thus increasing the cooling effect from this viewpoint as well. For these reasons, even with a cooling effect of only 1-2° C. of air temperature, it is possible to feel cool above this numerical value.

Thus, by using absorption of radiant heat generated by the human body, it is possible to obtain a significant cooling effect even with a small decrease in room temperature. Since no cold air is utilized for this, it is possible to avoid the disadvantages of cold air contacting the skin. In addition, since absorption of radiant heat from the far-infrared-absorbing components in the air takes place without bias in the indoor space, the temperature distribution bias in the vertical direction of the indoor space can be reduced and energy utilization efficiency can be increased. Furthermore, since the room temperature decreases only slightly, it is possible to minimize symptoms such as "cooling disorder".

Cooling with a system that absorbs radiant heat from the body according to the invention speeds the initial cooling effect and increases the immediacy of noticing a cooling effect. This is also useful for increasing comfort and lowering wasteful energy consumption. In this embodiment, in particular, radiant heat is absorbed from the human body into the three surfaces, i.e., the floor face 200, the wall faces 300 and the ceiling face 400, and therefore a high body cooling effect is achieved.

Furthermore, the cooling effect of case (1) described above does not require input of energy from the outside for refrigerant, and does not produce greenhouse gases, and it can therefore be used to realize zero emission. Also, the cooling effect of case (2) described above can be obtained with less required electric power than ordinary cooling, and therefore energy savings can be achieved. When the cooling effect of case (2) is used with a solar cell, it is possible to effectively obtain a cooling effect without utilizing commercial electric power.

Data supporting the effect of mixing a ground product of a far-infrared emitting substance in a wall will now be provided.

FIG. 9 is a conceptual drawing showing an environment in which measurement was conducted. FIG. 9 shows the cross-sectional shape of a meter box 501 made of veneer. The meter box 501 comprises a 15 mm-thick veneer, and it has a box structure of the dimensions shown (45 cm depth as well), with one open surface. The meter box 501 is situated with its open surface placed on the floor face 200 shown in FIG. 3. The surface of the floor face 200 has a stone floor panel 205 (25 cm square, 15 mm-thick panel of processed granite) provided over it as explained in relation to FIG. 3, and the surface of the panel (floor face) is heated by adjusting the temperature with an electrothermal heater to between room temperature and 45° C. For this measurement, a temperature sensor enveloped by aluminum foil was placed at a position at the center of the meter box 501 at a height of 30 cm from the floor face 200, and the atmospheric temperature at that point was measured.

A plaster panel 502 was attached to each of the upper sections of the four wall faces of the interior of the meter box 501. The plaster panel 502 was obtained by forming the plaster layer 313 explained in relation to FIG. 5 into a 20 mm-thick panel, and it contains the same stone as the stone composing the stone floor panel 205 of FIG. 3, ground into powder with a mean particle size of 50μ (hereinafter referred to as "stone powder"). Six samples were prepared having stone powder contents of 0 wt %, 1 wt %, 3 wt %, 5 wt %, 10 wt % and 20 wt %.

The measurement was conducted in the following manner. First, the floor face 200 was adjusted to a temperature of about 32° C., and observed until the temperature change during 10 minutes stabilized at below 0.1° C. When the temperature of the floor face 200 stabilized, the meter box 501 having the plaster panels 502 affixed to the upper sections of the four inner wall surfaces was placed on the floor face 200 in the state shown in FIG. 9, and measurement of the air temperature was initiated at the atmospheric temperature measuring location shown. The veneer was exposed below the plaster panels 502.

Temperature measurement was conducted initially, and then 1 minute, 3 minutes, 5 minutes, 7 minutes and 10 minutes after the initial measurement. The operation was conducted for the following 6 samples: "plaster alone", "plaster+1 wt % stone powder", "plaster+3 wt % stone powder", "plaster+5 wt % stone powder", "plaster+10 wt % stone powder" and "plaster+20 wt % stone powder".

The increases for each sample from the initially measured temperature are shown in Table 1.

TABLE 1

| | After 1 minute | After 3 minutes | After 5 minutes | After 7 minutes | After 10 minutes |
| --- | --- | --- | --- | --- | --- |
| Plaster alone | +3.3° C. | +6.2° C. | +7.5° C. | +8.6° C. | +9.7° C. |
| Plaster + 1 wt % stone powder | +3.3° C. | +6.8° C. | +8.6° C. | +9.2° C. | +9.7° C. |
| Plaster + 3 wt % stone powder | +4.5° C. | +7.6° C. | +8.4° C. | +9.3° C. | +10.4° C. |
| Plaster + 5 wt % stone powder | +4.7° C. | +7.8° C. | +8.7° C. | +9.5° C. | +10.2° C. |
| Plaster + 10 wt % stone powder | +4.6° C. | +7.3° C. | +8.5° C. | +9.6° C. | +10.6° C. |
| Plaster + 20 wt % stone powder | +5.6° C. | +8.4° C. | +9.3° C. | +9.9° C. | +10.5° C. |

FIG. 10 shows a graphical representation of the data of Table 1. As clearly seen in FIG. 10, the plaster walls with the mixture of stone powder (ground product of the same stone as the floor face) exhibited a faster temperature increase and a greater increase range than the plaster alone. In this experiment only the floor face was heated, and therefore primary radiation was only from the floor face. Thus, the graph in FIG. 10 shows measurement of the increase in atmospheric temperature due to the stone powder in the wall (plaster panel 502). This supports the validity of the heating effect utilizing secondary radiation from a member other than the heating surface in the indoor space, according to the principle of the invention.

In the data shown in FIG. 10, the points are shown where the temperature increase property improved during the start-up period of 3-7 minutes after the start of heating, due to addition of the stone powder. Temperature increase due to heating of an object requires a large amount of heat energy during the start-up period up until an equilibrium state is reached. Thus, it may be said that the phenomenon in which the start-up period property is improved, as shown in FIG. 10, strongly demonstrates the effectiveness of adding stone powder to the wall (plaster panel 502). Also, the start-up period property-improving effect is clearly exhibited with addition of the stone powder at 1 wt %, and is more prominent with addition at 3 wt %.

From the viewpoint of the content of the stone powder in the plaster, a content of 1 wt % resulted in a significant difference in the effect after 3 minutes, after 5 minutes and after 7 minutes, but no difference after 1 minute and after 10 minutes. Therefore, an effect was seen with 1 wt %, and with a further increased content of 3 wt %, the increased temperature width was notably larger compared to plaster alone. It was therefore concluded that the effect of the invention is obtained with a stone powder content of 1 wt % or greater, and preferably with a content of 3 wt % or greater. With a content of 3 wt %, in particular, the increased temperature width was notably larger compared to plaster alone.

When the stone powder content was 5 wt % or 10 wt %, no notable difference was observed compared to 3 wt %. However, when the stone powder content was increased to 20 wt %, a notable difference in temperature increase effect was observed. While not shown here, further increasing the stone powder content above 20 wt % tended to saturate the temperature increase effect to some extent. In addition, a stone powder content of greater than 20 wt % will tend to reduce workability from the viewpoint of trowel running on the starting material during construction of the plaster wall, or uniform spreading during coating. For a plaster wall, therefore, it is considered suitable for the stone powder addition to be no greater than about 20-30 wt %.

The data in FIG. 10 demonstrates that including the same material in the wall faces as the far-infrared emitting substance composing the heating surface produces secondary radiation from the wall faces, and the secondary radiation component produces a notable function on the heating effect. As is well known, the actions of emission and absorption of far-infrared rays of a far-infrared emitting substance are reversible. Consequently, when the heating surface (floor face) was used as the cooling/dehumidifying surface in the experiment illustrated in FIG. 9, there was a tendency opposite to the data shown in FIG. 10, i.e., radiant heat was removed from the wall faces (plaster panels 502) into the cooling/dehumidifying surface (floor face), causing the wall faces to more easily absorb radiant heat, and it is expected that this causes the phenomenon in which the heat of the heating unit in the meter box 501 is absorbed into the wall faces as radiant heat (the atmospheric temperature is lowered). It can therefore be concluded that the data shown in FIG. 10 is evidence, albeit indirect, for the cooling effect of the invention.

Also, the data shown in FIG. 10 indicate that the effect of the superiority of heat exchange between identical far-infrared emitting substances can be confirmed if the far-infrared emitting substance is present at 1 wt % or greater in the material in which heat exchange takes place, and is notable at 3 wt % or greater. Thus, the knowledge relating to the proportion of the far-infrared emitting substance also applies to the cooling/dehumidifying surface (or heating surface), and it is concluded that in order to exhibit function as a cooling/dehumidifying surface (or heating surface) of the invention it is necessary for the far-infrared emitting substance content on that surface to be 1 wt % or greater and preferably 3 wt % or greater. The data in FIG. 10 explained above also support the range for the content of the far-infrared emitting substance when added to other materials (for example, a coating material layer or wallpaper).

Data demonstrating that uniform heating can be realized in the height direction will now be explained. Table 2 shows the results of measuring the temperature distribution in the vertical direction, for actual use of a room satisfying the conditions described for the above embodiment. The measurement was conducted in an environment with an outdoor air temperature of 11° C. (winter daytime), determining the atmospheric temperature at the location shown in Table 2 above the floor, after 2 hours of heating a floor face temperature (stone floor surface temperature shown in Table 2) to a comfortable condition. The ceiling height was 350 cm above the floor at the section of maximum height.

TABLE 2

|  | Temperature of stone floor surface | 50 cm above floor | 150 cm above floor | 250 cm above floor | Maximum temperature difference in space |
|---|---|---|---|---|---|
| Measured results 1 | 32.8° C. | 25.8° C. | 24.5° C. | 23.1° C. | 2.7° C. |
| Measured results 2 | 32.8° C. | 25.5° C. | 24.1° C. | 22.6° C. | 2.9° C. |
| Measured results 3 | 33.1° C. | 25.0° C. | 24.2° C. | 23.0° C. | 2.0° C. |
| Measured results 4 | 32.9° C. | 26.0° C. | 26.0° C. | 24.8° C. | 1.2° C. |

As clearly seen from Table 2, the temperature distribution in the vertical direction of the indoor space was highly uniform. With ordinary convection-type heating ("air conditioning heating"), the temperature difference near the floor and near the ceiling will often exceed 10° C. With heating by radiant heat of a ceramic heater as well, the radiant heat is felt only in front of the apparatus while other locations are heated by convection, and therefore the temperature distribution in the vertical direction is not much different from a convection system. It is believed that the uniformity of temperature distribution in the vertical direction shown in Table 2 is obtained because it depends not only on far-infrared rays from the floor face, but also utilizes secondary radiation of far-infrared rays from the wall faces or ceiling face.

Figure 11:
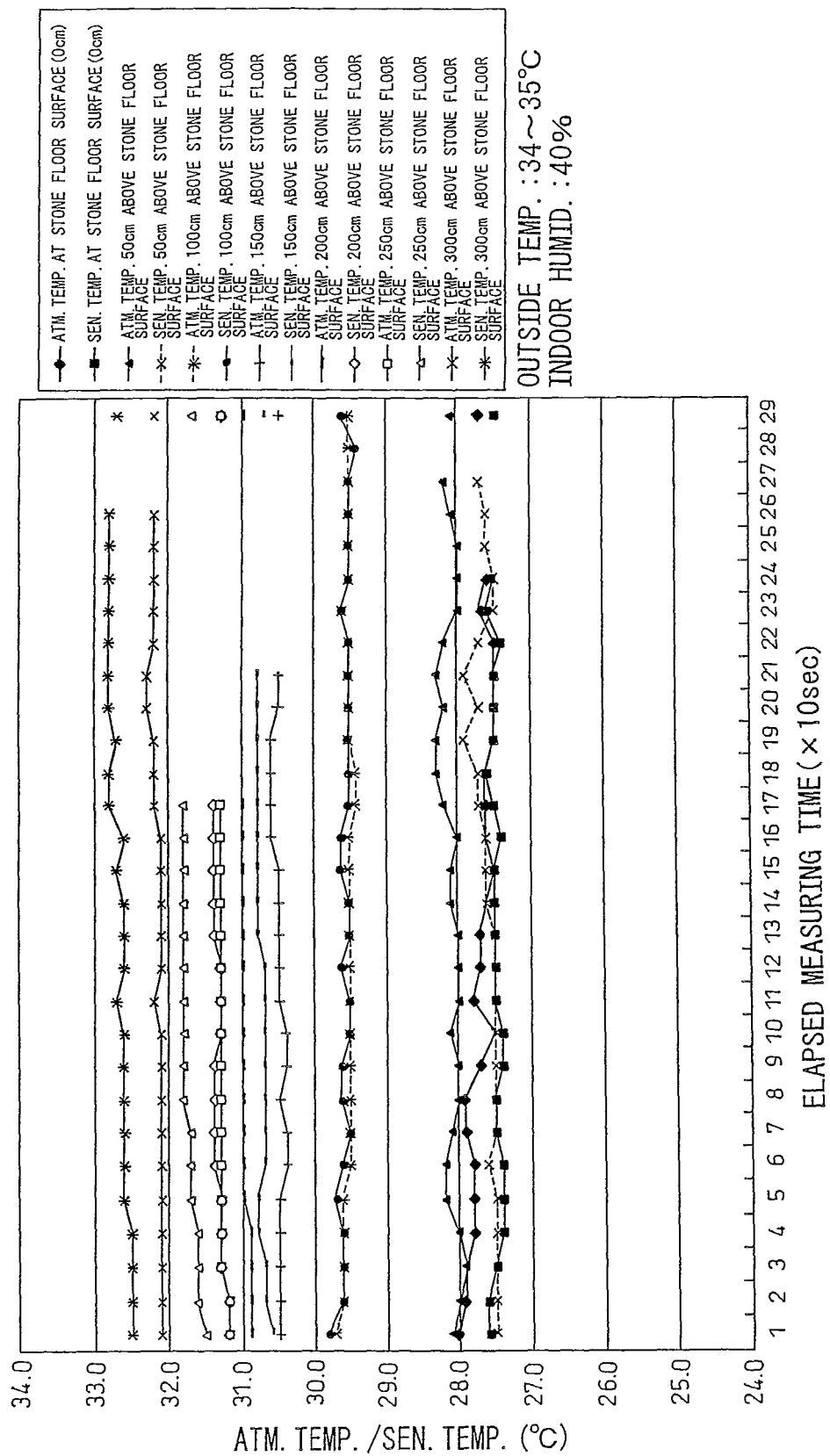
FIG. 11 is a graph showing data for the cooling effect obtained by absorption of far-infrared rays into the indoor surface structural member of a room.

Data demonstrating the cooling effect obtained by absorption of far-infrared rays into the indoor surface structural members of a room will now be explained. FIG. 11 is a graph showing the results of measurement in the summer season with an outdoor air temperature of 34° C.-35° C., for the room exhibiting the supporting data shown in Table 2.

The measurement data in FIG. 11 were obtained by operating the dehumidifying device whose overview is shown in FIGS. 4A and 4B, keeping the indoor humidity at 40%. The atmospheric temperature is the temperature measured with the temperature sensor wrapped in aluminum foil to exclude the influence of radiation. The sensible temperature is the temperature measured with the temperature sensor covered by black body tape (tape of a material comprising carbon fibers and considered to be a black body), for sensitivity to the influence of radiation. The measurement was conducted at around 2:00 pm, for the highest daytime temperature.

As shown in FIG. 11, the atmospheric temperature on the floor face and near 50 cm above the floor can be lowered to 6-7° C. lower than the outdoor air temperature. The temperature near 100 cm above the floor can also be lowered to 4-5° C. lower than the outdoor air temperature. The increase in atmospheric temperature and sensible temperature with increasing distance from the floor face is believed to be due to the effects of natural convection, as the proportion of radiant heat absorbed into the floor face increases nearer to the floor face.

Judging from FIG. 11, the sensible temperature is 0.2-0.5° C. lower than the atmospheric temperature in the region up to 50 cm above the floor. As mentioned above, the sensible temperature is the temperature when the temperature sensor has been rendered sensitive to the effects of radiation by covering it with black body tape. The facts indicated above, therefore, may be said to be a phenomenon wherein the temperature of an object is lowered in the air space between the floor and 50 cm above the floor, due to far-infrared rays being absorbed into the stone floor which is a far-infrared emitting substance that has large heat capacity.

In this measurement, the temperature sensor is not a heating unit or an object that emits far-infrared rays itself. Yet an effect of radiation being absorbed into the floor is observed. Consequently, the human body, as an object that constantly releases heat at around 36° C. and emits far-infrared rays, feels a reduction in the sensible temperature above that shown in FIG. 11. In actuality, it has been confirmed that a lowering in the sensible temperature above the temperature difference in FIG. 11 is in fact felt. FIG. 11 also confirms that a feeling of coolness can be produced even in the space at 100 cm and higher above the floor, where no notable difference between atmospheric temperature and sensible temperature is seen.

As also apparent from FIG. 11, the variation in temperature with time was extremely minimal in these measurement results. This is in contrast to the minute temperature variations caused by the frequent on-off switching and output regulation with convection-type cooling. The temperature variation during cooling causes the corresponding adaptive regulating function of the human body to work harder, and is one of the causes of cooling disorder. The temperature changes shown in FIG. 11 may therefore be considered to be more desirable for health.

In the data shown in FIG. 11, the temperature difference between the area near the feet (around 50 cm from the floor) and the area near the head (around 150 cm from the floor) of the human body is kept at about 2.5° C. within atmospheric temperature. This is a major advantage over convection cooling. This can also be considered desirable from the viewpoint of health.

As explained above, the data in FIG. 11 clearly indicate the superiority of the effect of cooling action utilizing the principle of the invention.

According to the invention, the materials that radiate and absorb far-infrared rays and have a far-infrared emissivity of 0.6 or greater (the stone of the floor panel and the stone powder mixed into plaster of the wall faces and ceiling face, in the embodiment described above), even if they are not the same materials, can produce a similar effect so long as they are materials of similar composition, although the effect will not be as great as with identical materials. This also applies when using ceramic materials as far-infrared ray materials. The heating surface is more advantageously on the floor face since it will produce a floor heating effect, but it does not have to be on the floor face if a floor heating effect is not to be utilized.

For the embodiment described above, a construction comprising stone or stone powder (far-infrared emitting substance) was used for the floor face, wall faces and ceiling face, but the faces containing the far-infrared emitting substance may be any of the 3 combinations of floor face/wall face, wall face/ceiling face or ceiling face/floor face. It is important for the far-infrared rays emitted from one face to easily reach the other face. For example, if the far-infrared emitting substance is only present in one of the floor face, wall faces or ceiling face, it will not be possible to efficiently accomplish exchange of radiant heat between the faces and the effect of the invention will be reduced.

If the combination of faces comprising the far-infrared emitting substance is one of the 3 combinations of floor face/wall face, wall face/ceiling face and ceiling face/floor face, the far-infrared emitting substance will not need to be included in all of the faces, but a greater area without the far-infrared emitting substance will increase loss during emission and absorption of radiant heat at the sections that do not contain the far-infrared emitting substance. The heating effect and cooling effect utilizing radiation according to the invention will therefore be reduced. For the combinations mentioned above, it is necessary for the far-infrared emitting substance to be present in at least 50%, preferably at least 60% and more preferably at least 70% of the area of each face.

The heating surface and/or cooling/dehumidifying surface may be provided in several divided sections.

The case described above had the ground product (stone powder) of the far-infrared emitting substance added to plaster wall and ceiling gypsum board, but there is no limit to such a case so long as the building materials allow mixing of the ground product. For example, the ground product of the far-infrared emitting substance may be added to an interior member such as wallpaper and used for the effect of the invention. Also, instead of mixing the ground product into the indoor surface structural member material such as a building material, a ceramic coating technique may be utilized to coat the surface of the indoor surface structural member material with the far-infrared emitting substance.

An example of applying the system of the invention to a room of residence was explained here, but the invention may also be utilized for a classroom, office, sports facility, library, shop, or any other room in which humans are active or live. The embodiment described above is only for illustration, and appropriate building materials and methods may be selected according to the object and building site.

In the construction shown in FIG. 2, cooling means for cooling the floor face 200 by heat conduction may also be provided instead of (or in addition to) the cooling/dehumidifying surface 301 for cooling of the floor face 200. The floor face 200 is constructed of a stone floor panel 205 (see FIG. 3) obtained by shaping and working stone, and its far-infrared absorption function is greater than the other sections while its heat capacity is also larger. Consequently, by cooling the floor face 200 during cooling, the far-infrared ray-absorbing power of the floor face 200 is increased, and absorption of far-infrared rays of the indoor space into the floor face 200 can produce a higher cooling effect. However, since condensation on the floor face 200 is not desirable, the cooling must be of a degree that does not cause condensation. The cooling means for such cooling may be a construction wherein a conduit in which ground water or tap water flows is situated in contact with the rear side of the stone floor panel 205, and the stone floor panel 205 is cooled from the rear side. The cooling means may of course be forced cooling means utilizing electricity or other energy. When the floor face 200 is cooled, dehumidification of areas other than the floor face may also be carried out to lower the humidity in the indoor space and inhibit condensation onto the floor face 200.

By modifying the shapes and placement structure of the fins 304 (see FIG. 4A) so that the surfaces of the fins on the cooling/dehumidifying surface are directed uniformly toward the floor face, wall faces and ceiling face, it is possible to further increase the radiant heat-absorbing efficiency on the cooling/dehumidifying surface. The structure may be one with different orientations for several fin surfaces, with oblique placement of several fins, with bent fins or with curved fins.

Figure 12:
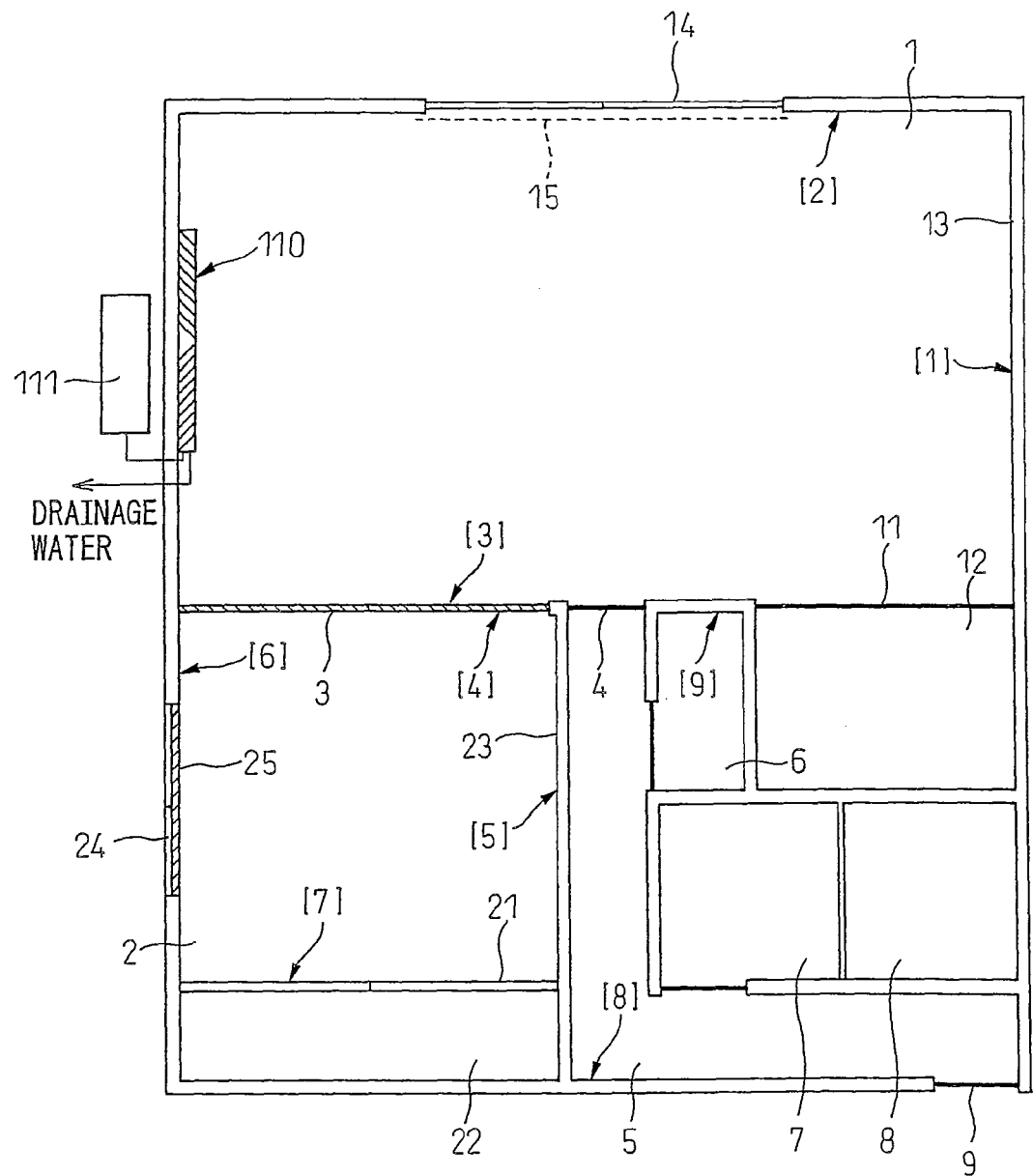
FIG. 12 is an illustration of another embodiment of an indoor environment regulating system according to the invention.

FIG. 12 is a conceptual drawing showing an overview of a room furnished with an indoor environment regulating system according to the invention, as another embodiment of the invention. FIG. 12 conceptually shows the view from the top downward. In FIG. 12, a living room 1 is shown as an example of the first room. A Japanese-style room 2 is situated as an example of a second room, next to the living room 1. The living room 1 and Japanese-style room 2 are partitioned by an opening and closing paper screen 3. A storage room (closet) 22 is provided in the Japanese-style room 2, with a sliding door 21. A storage room 12 is also provided in the living room 1, with a sliding door 11.

In the living room 1, a connecting hallway 5 is included as an example of another second room, through an opening and closing glass door 4. As rooms that can be entered and exited from the hallway 5, there are provided a toilet 6 and a lavatory 7 that can be used as a dressing room, as well as a bathroom 8 situated next to the lavatory through an appropriate door. The doors of the toilet 6 and lavatory 7 on the hallway 5 side are ordinary wooden doors. The interior finishing of the toilet 6 and lavatory 7 is a structure comprising ordinary wallpaper pasted onto an underlying gypsum board. The numeral 9 indicates a main entrance door. A cold/heat radiation device 110 is also situated in the living room 1. The cold/heat radiation device 110 will be described in detail below.

The cold/heat radiation device 110 shown in FIG. 12 is a device that can switch between cold radiation and thermal radiation. Cold radiation is the effect of absorption of thermal radiation around the surroundings as cooling, while thermal radiation is the effect of thermal radiation toward the surroundings as heating.

As shown in FIG. 12, the cold/heat radiation device 110 is connected to a cold and hot water generator 111 as an outdoor device. The cold and hot water generator 111 has a heat pump function and generates cold water or hot water. The heat pump function operates by the same principle as one used in an ordinary air conditioner or the like. A cold water generating function alone is sufficient if only a cooling effect is to be obtained. Alternatively, a hot water generating function alone is sufficient if only a heating effect is to be obtained.

When cold water is supplied to the cold/heat radiation device 110 from the cold and hot water generator 111, the fins described hereunder are cooled and dehumidification takes place by condensation. By this cooling, the fin surfaces function as cooling/dehumidifying surfaces that produce cold radiation. When hot water is supplied to the cold/heat radiation device 110 from the cold and hot water generator 111, the fins are heated and the fin surfaces function as heating surfaces (thermal radiation surfaces). Cold water is water that has been cooled by the cooling function of the cold and hot water generator 111, and hot water is water that has been heated by the heating function of the cold and hot water generator 111. The water droplets condensed on the fins drop down and are collected in a chute and drained to the outside.

Figure 13A:
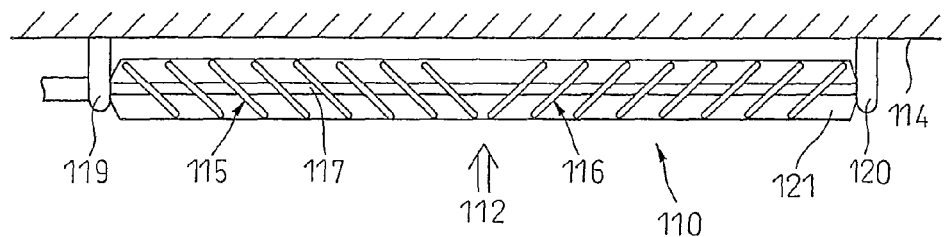
FIG. 13A is a top view of a cold/heat radiation device.
Figure 13B:
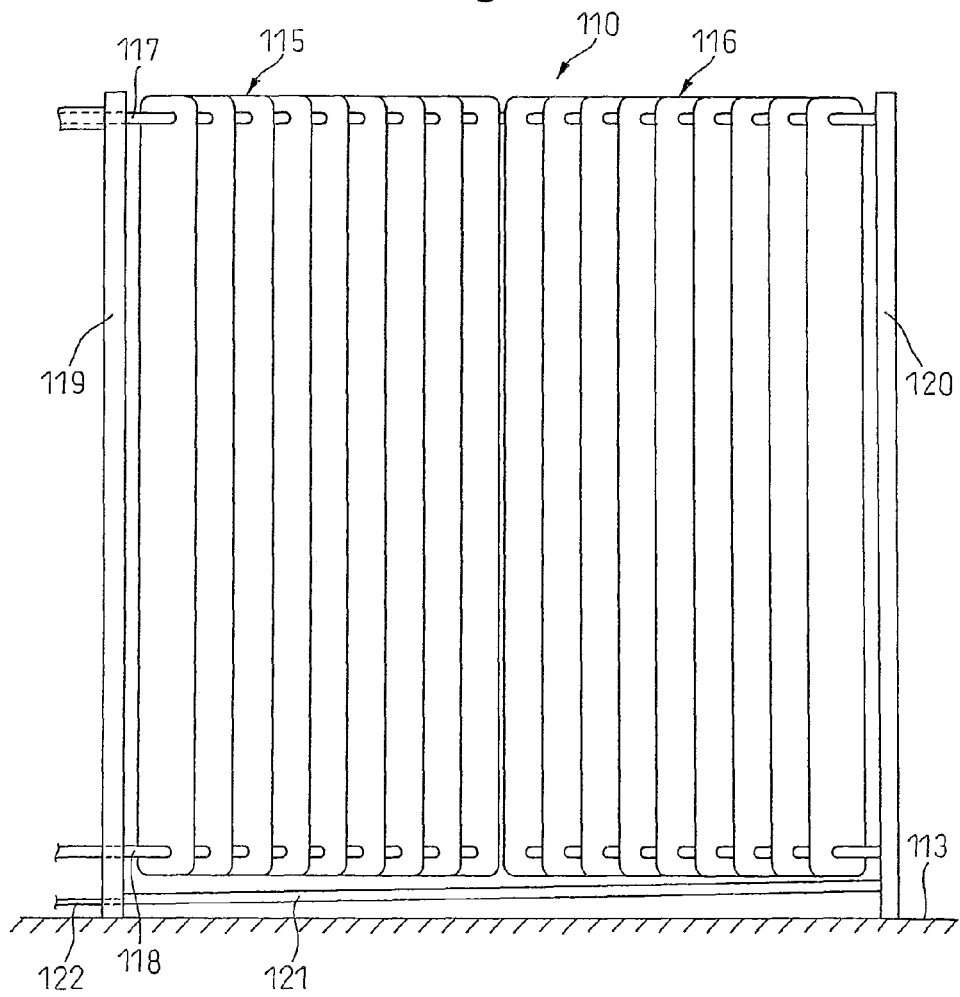
FIG. 13B is a front view of a cold/heat radiation device.

FIG. 13A is a top view of the cold/heat radiation device 110 as seen from above, and FIG. 13B is a front view of the same as seen from the direction of the arrow 112 in FIG. 13A. The cold/heat radiation device 110 is anchored to the floor face 113 and wall face 114 of the living room 1 (see FIG. 12). The cold/heat radiation device 110 is made of aluminum, and it comprises two groups of fins 115 and 116 extending in the vertical direction. The cold/heat radiation device 110 may be constructed of another metal material or alloy material with satisfactory heat conduction, such as iron or copper or an alloy thereof, for example. A plurality of fins 115 and 116 are provided, and they form oblique angles (45° in this example) with the wall face 114. The angle may be selected in the range of about 15°-75°. For this example, the surfaces of the fins 115 and 116 function as cooling/dehumidifying surfaces that perform dehumidification by condensation or as heating surfaces that are heated. That is, the fins 115 and 116 function as cold and heat radiation sources. FIG. 13A shows a cold radiation device 110 comprising two groups of fins oriented obliquely with respect to the wall face 114, but the cold radiation device of the invention may instead be provided with a single group of fins (a group of fins all arranged in parallel) situated at right angles to the wall face 114.

Figure 14:
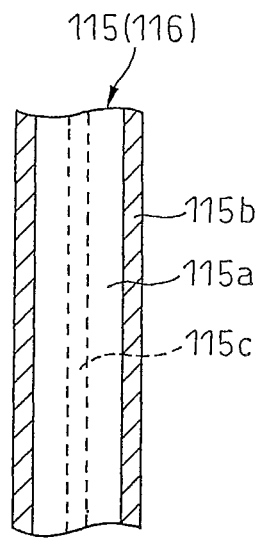
FIG. 14 is an illustration of the fin structure in a cold/heat radiation device.

The fins 115 and 116 are situated at 90° angles to each other. The fins 115 and 116 are long, flat and thin. FIG. 14 is a conceptual drawing showing the cross-sectional shape of a fin 115(116). As shown in FIG. 14, the fin 115(116) is composed of a long, thin aluminum sheet 115a, and on the surface there is formed a coating layer 115b with a thickness of approximately 200 μm, made of a white coating material comprising a mixture with a ground product obtained by grinding granite exhibiting a numerical value of greater than 0.9 for the far-infrared emissivity (hereinafter referred to as "stone powder"). The particle size of the stone powder in the coating layer 115b is no greater than 50 μm. The content of the stone powder in the coating layer 115b is 20 wt % when the coating material is in the hardened state (dry state). The coating layer functions as a cooling/dehumidifying surface and a heating surface. A water channel 115c is provided inside the aluminum sheet 115a, in the vertical direction.

As shown in FIG. 13B, a water supply pipe 117 runs through above the fins 115 and 116, while a water drainage pipe 118 runs under. The water supply pipe 117 and water drainage pipe 118 function as supporting members to support the fins 115 and 116. The water supply pipe 117 is connected to the top end of the water channel 115c of each fin (see FIG. 14), while the water drainage pipe 118 is connected to the bottom end of the water channel 115c of each fin (see FIG. 14). Both the water supply pipe 117 and water drainage pipe 118 are connected to a cold and hot water generator 111 (see FIG. 12) located outside.

The cold water or hot water supplied from the cold and hot water generator 111 shown in FIG. 12 is in turn supplied from the water supply pipe 117 to the water channels 115c in the fins 115 and 116, where it flows down the water channels 115c inside the fins 115 and 116 and is collected at the cold and hot water generator 111 through the water drainage pipe 118. The collected cold water or hot water is again cooled or heated at the cold and hot water generator 111 and supplied to the water supply pipe 117. Circulation of the cold water or hot water accomplishes temperature regulation of the fins 115 and 116.

As shown in FIG. 13B, both ends of the water supply pipe 117 and water drainage pipe 118 supporting the fins 115 and 116 above and below are in turn supported by struts 119 and 120. The lower ends of the struts 119 and 120 are fixed to the floor face 113, and the tops of the struts 119 and 120 are fixed to the wall face 114. A U-shaped or V-shaped chute 121 is situated under the fins 115 and 116 with its cross-section facing upward. The chute 121 is an example of water droplet-collecting means for collection of the condensing water droplets. The chute 121 has a structure supported by the struts 119 and 120 and inclined toward the left of the drawing. The left end of the chute 121 is connected to a drainage pipe 122 extending outside. In this example, water droplets that have condensed onto the fins by condensation drop into the chute 121 and are thus collected by the chute 121, being finally drained outside through a drainage pipe 122.

As shown in the drawing, the fins 115 and 116 are inclined 45° with respect to the wall face 114, and have their surfaces oriented in two oblique directions at 90° to each other, with respect to the indoor space of the living room 1 (see FIG. 12). Thus, a surface of the fin 115 and/or the fin 116 can be seen at any location inside the living room 1. In other words, far-infrared rays from any part of the living room 1 efficiently reach the fin 115 and/or 116. Stated differently, far-infrared rays from the fin 115 and/or 116 efficiently reach any part of the living room 1. Moreover, since a plurality of fins 115 and 116 are arranged in parallel, the total area of the fins can be greater compared to the occupied area and volume. Increasing the total area of the fins is advantageous from the standpoint of increasing the amount of absorption and emission of far-infrared rays, and of increasing the dehumidification efficiency.

Figure 15A:
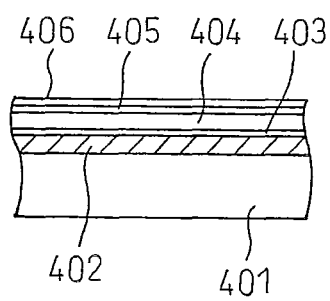
FIG. 15A is an illustration of the floor structure for the embodiment shown in FIG. 12.

The floor face of the living room 1 shown in FIG. 12 is boarding (or "flooring") employing an ordinary material. FIGS. 15A to 15H are conceptual drawings showing the structures of building materials used for this embodiment. FIG. 15A conceptually shows the cross-sectional structure of the floor of the living room 1. The floor of the living room 1 shown in FIG. 15A has a cross-sectional structure comprising a building frame 601 over which is layered a heat-insulating panel 602 with a reflection surface made of aluminum foil 603, and a plate material 604.

The surface of the plate material 604 has two varnish layers 605 and 606 formed as surface protective layers. The varnish layer 605 contacting the plate material 604 comprises the same stone powder as that adhering to the surface of the fins, further ground to no greater than 0.5 μm, at 10 wt % in a dry state. The varnish layer 605 is obtained by mixing the stone powder with a varnish starting material, thoroughly agitating the mixture, and coating and drying it just as with ordinary varnish. The varnish layer 606 is the outer surface protective layer, and it is formed without mixing stone powder with the same varnish starting material as the varnish layer 605.

Figure 15B:
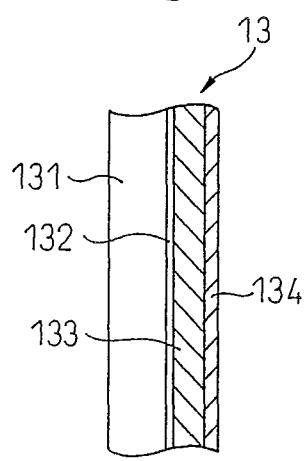
FIG. 15B is an illustration of the wall structure for the embodiment shown in FIG. 12.

The wall 13 of the living room 1 shown in FIG. 12 comprises a plaster wall face with a thickness of approximately 3 mm. On the plaster wall face, the aforementioned stone powder (particle size: ≤5 μm) is mixed with the plaster starting material to 5 wt % in the hardened state. FIG. 15B shows the cross-sectional structure of the wall 13. FIG. 15B shows a building frame 131 that serves as the foundation for the wall 13. A gypsum board 133 is pasted onto the building frame 131, having an aluminum foil 132 on the building frame 131 side. On the indoor space side of the gypsum board 133 there is formed a plaster wall face 134 with a thickness of approximately 3 mm obtained by coating the aforementioned stone powder-containing plaster.

Figure 15C:
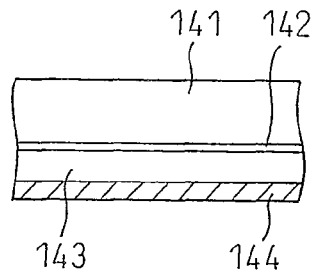
FIG. 15C is an illustration of the ceiling structure for the embodiment shown in FIG. 12.

The ceiling face wall of the living room 1 also has a plaster surface with the same structure as the wall 13. The building frame 141 serving as the foundation of the ceiling is shown in FIG. 15C, in which the cross-sectional structure of the ceiling section of the living room 1 is illustrated. On the indoor space side of the building frame 141 there is pasted a gypsum board 143 comprising an aluminum foil 142 on the building frame 141, and on the indoor space side of the gypsum board 143 there is formed a plaster ceiling face 144 with a thickness of approximately 3 mm obtained by coating the aforementioned stone powder-containing plaster.

As shown in FIG. 12, an opening and closing glass window 14 is provided in the living room 1. On the indoor space side of the glass window 14 there is situated a metal blind 15 (Venetian blind) as a sun shade.

The floor face of the Japanese-style room 2 shown in FIG. 12 consists of ordinary tatami mats. The wall 23 of the Japanese-style room 2 comprises the same plaster walls as the wall 13. The detailed structure is the same as the wall 13. The ceiling of the Japanese-style room 2, not shown in this drawing, has the structure shown in FIG. 15C.

An opening and closing glass window 24 is provided in the Japanese-style room 2, and an opening and closing paper screen 25 is situated on the indoor space side of the glass window 24. On the surface facing the paper screen 3 of the Japanese-style room 2 there is situated a storage room 22 with an opening and closing sliding door 21. The paper screen 3 and paper screen 25 are ordinary paper screens comprising "shojigami" pasted onto a wooden frame.

Figure 15D:
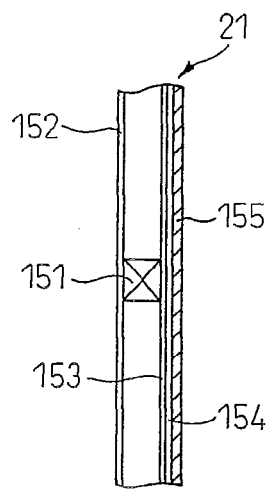
FIG. 15D is an illustration of a storage sliding door structure for the embodiment shown in FIG. 12.

The sliding door 21 comprises the same stone powder described above in order to exhibit far-infrared ray emitting/absorbing properties similar to the wall 23. FIG. 15D is a cross-sectional view showing the cross-sectional structure of the sliding door 21. The sliding door 21 has a basic structure with paper 152 and 153 pasted onto a wooden frame 151. For this example, an aluminum foil 154 that is to serve as the far-infrared ray reflection surface is attached onto the surface of the paper 153 on the indoor space side, and decorative paper 155 containing the stone powder is pasted thereover (on the indoor space side). The decorative paper 155 is formed by mixing stone powder into a mixture (slurry) containing the starting material when the paper is made, and making the paper in the same manner as ordinary methods. For this example, a mixture containing the stone powder at 5 wt % in the dry state was used. Including stone powder in the surface paper of the sliding door can increase the effective area of the wall face comprising the far-infrared emitting substance, while reserving the area of the storage room.

The structure of the floor of the hallway 5 shown in FIG. 12 is the same as the structure shown in FIG. 15A. The structure of the wall of the hallway 5 is the same as the structure shown in FIG. 15B. The structure of the ceiling of the hallway 5 is the same as the structure shown in FIG. 15C.

Figure 15E:
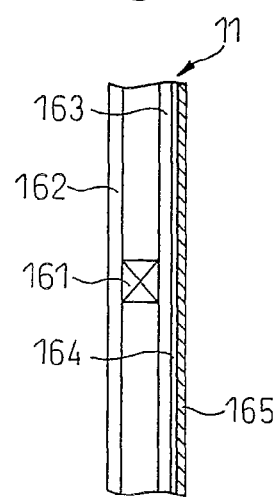
FIG. 15E is an illustration of a storage swinging door structure for the embodiment shown in FIG. 12.

The structure of the door 11 of the storage room 12 of the living room 1 in FIG. 12 will now be explained. FIG. 15E shows the cross-sectional structure of the door 11. The stone powder is included on the surface of the door 11 on the indoor space side. More specifically, the door 11 has a basic structure in which plywood 162 and 163 boards are attached to both sides of a wooden frame 161. The plywood 163 is situated on the indoor space side of the living room 1, a sheet of aluminum foil 164 that reflects far-infrared rays is attached to the surface on the living room 1 side, and decorative paper 165 made of the same material as the decorative paper 155 and having a cross-grain pattern is attached onto the aluminum foil 164. By including the stone powder on the surface of the door 11 it is possible to increase the effective area of the wall face comprising the far-infrared emitting substance, in the living room 1. This structure is particularly effective when the door 11 has a large area.

Figure 16A:
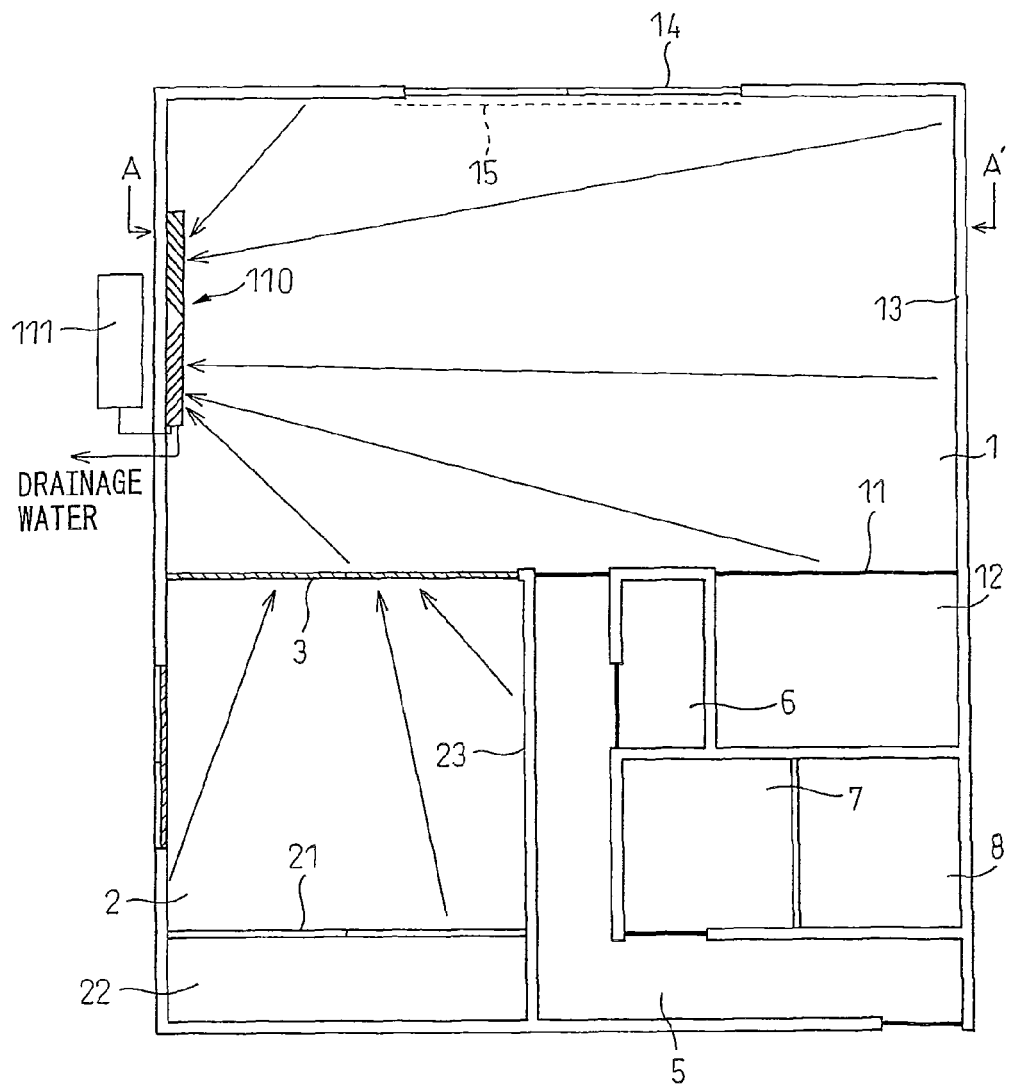
FIG. 16A is an illustration of the principle by which a cooling effect is obtained with the embodiment shown in FIG. 12.
Figure 16B:
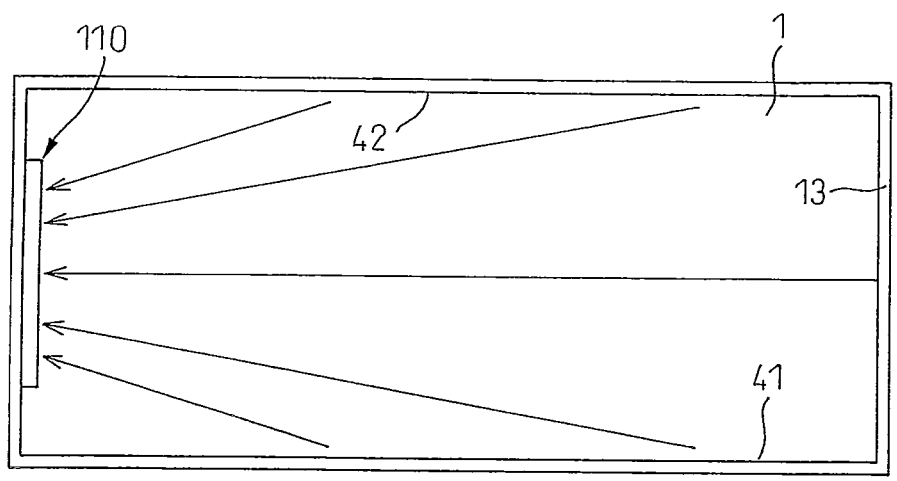
FIG. 16B is an illustration of the principle by which a cooling effect is obtained with the embodiment shown in FIG. 12.

FIGS. 16A and 16B are conceptual drawings for explanation of the principle of the cooling effect for the present embodiment. FIG. 16A shows the same plan view as FIG. 12, and FIG. 16B shows a cross-sectional view of FIG. 16A cut along line A-A'. In the cold and hot water generator 111, cold water is produced and supplied to the cold/heat radiation device 110 to accomplish cooling.

When the fins 115 and 116 (see FIGS. 13A and 13B) of the cold/heat radiation device 110 are cooled by the cold water, the temperature of the stone powder in the coating layer on the fin surfaces is lowered. As a result, the radiant energy density (radiant energy quantity) of the far-infrared rays from the fins of the cold/heat radiation device 110 is lower than the radiant energy density from the floor 41, walls 13 and ceiling 42 of the living room 1 comprising stone powder of the same composition (specifically, the value measured with a heat radiation meter is smaller). Because of this difference, relative thermal radiation is produced from the floor 41, walls 13 and ceiling 42 of the living room 1 toward the fins of the cold/heat radiation device 110. Since the same far-infrared emitting substance (stone powder) is contained in both, migration of heat energy occurs at high efficiency via the far-infrared rays between the floor 41, walls 13 and ceiling 42 of the living room 1 (hereinafter these will be collectively referred to as the "inner surface") and the fins of the cold/heat radiation device 110. In FIGS. 16A and 16B, this thermal radiation (far-infrared rays) is conceptually indicated by arrows.

Since the principle of high thermal radiation energy exchange efficiency between identical molecular species is active during this time, the radiant energy density between them is greater than between non-identical molecules. Thus, the inner surface section of the living room 1 comprising the stone powder has a reduced heat radiation quantity emitted toward the indoor space, by the amount of far-infrared rays absorbed by the cold/heat radiation device 110. As a result, the difference from the heat radiation quantity emitted by the human body increases, and the far-infrared rays emitted from the human body become more easily absorbed into the inner surface section of the living room 1 which comprises the stone powder. Naturally, thermal radiation will also be directly absorbed into the cold/heat radiation device 110 from the body of a human in the living room 1. A cooling effect is thus obtained.

Figure 17A:
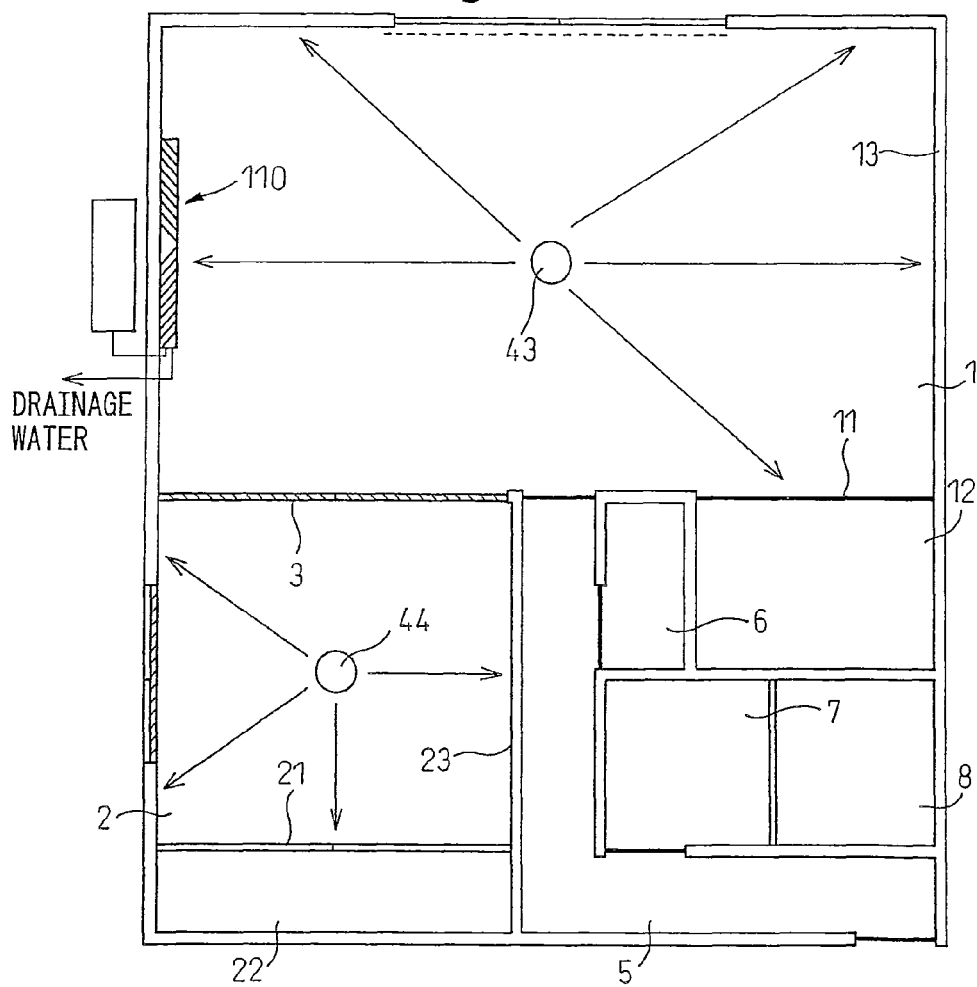
FIG. 17A is an illustration of the cooling action of the embodiment shown in FIG. 12.
Figure 17B:
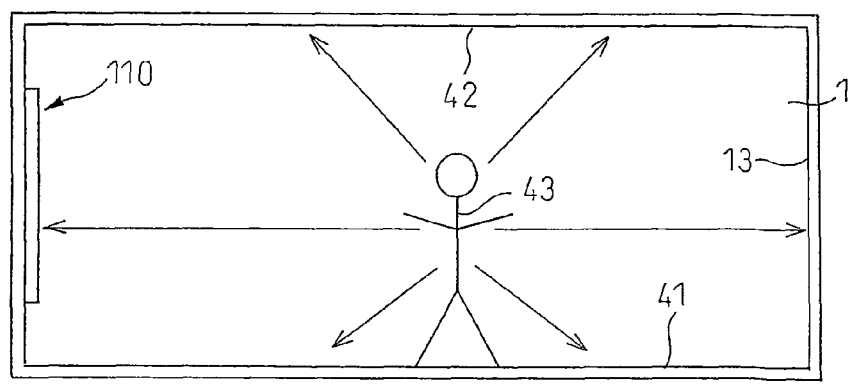
FIG. 17B is an illustration of the cooling action of the embodiment shown in FIG. 12.

FIGS. 17A and 17B are conceptual drawings illustrating the cooling action. FIG. 17A shows a plan view, and FIG. 17B shows a cross-sectional view similar to FIG. 16B. As explained above, the inner surface of the living room 1 is in a state that it readily absorbs thermal radiation from the body of a human in the living room 1, and therefore thermal radiation from the body 43 to the surroundings is absorbed into the wall 13 or ceiling 42 and also the floor 41, as indicated by the arrows in FIGS. 17A and 17B. This causes heat to escape from the body 43 in the form of thermal radiation, producing a cooling effect that causes a feeling of coolness. This cooling effect takes the form of absorption of heat from the body as thermal radiation into the entire inner surface of the room. Consequently, even though the heat absorption power per unit area of the wall, etc., is smaller than that of the cold/heat radiation device 110, it is effective for the area of the room inner surface and the angle range surrounding the body. Since a human emits thermal radiation evenly toward its surroundings, heat is absorbed in the form of thermal radiation across the entire inner surface of the room, thereby causing heat to be efficiently absorbed from the human body 43 and producing a cooling effect (low sensible temperature).

When stone powder of a different type (stone powder with a different composition) than the stone powder in the inner surface of the living room 1 is used in the coating layer 115b of the fins 115 and 116 (see FIG. 13), heat exchange takes place by radiation between different molecules, and therefore the energy exchange efficiency is lower than when using the same material, similar to the effect of electromagnetic energy exchange between resonance circuits with different resonance frequencies. The cooling effect described above is therefore reduced.

With the cooling action, the metal blind 15 (see FIG. 12) serves as a shielding surface, thus minimizing the phenomenon of absorption of thermal radiation from the glass window 14 into the cold/heat radiation device 110. Consequently, this helps prevent the phenomenon whereby thermal radiation from outside is absorbed by the cold/heat radiation device 110, causing wasteful consumption of energy to be prevented.

While efficiency is low, emission of far-infrared rays is produced during this time from the paper screen 3 as well to the cold/heat radiation device 110 (assuming that the paper screen 3 is closed). This state is conceptually shown by the arrow in FIG. 16A. Emission of far-infrared rays from the paper screen 3 to the cold/heat radiation device 110 lowers the temperature of the paper screen 3. As a result, the heat radiation quantity from the paper screen 3 is reduced. Since the paper screen 3 is thin, the heat radiation quantity of the paper screen 3 into the Japanese-style room 2 is also reduced. As a result, the heat radiation quantity from the wall 23, the sliding door 21 and the ceiling face of the Japanese-style room 2, which is not shown here (hereinafter referred to as the inner surface of the Japanese-style room 2) toward the paper screen 3 increases, thus lowering the temperature of the inner surface of the Japanese-style room 2. This state is conceptually shown by the arrow indicated in the Japanese-style room 2 of FIG. 16A. Since the paper screen 3 is thin, this phenomenon can be interpreted as a phenomenon in which thermal radiation from the inner surface of the Japanese-style room 2 passes through the paper screen 3 and is absorbed into the cold/heat radiation device 110 and the inner surface of the living room 1.

Because of this effect, the temperature of the inner surface of the Japanese-style room 2 is lowered and the heat radiation quantity from the inner surface of the Japanese-style room 2 into the Japanese-style room 2 is reduced. As a result, the heat radiation quantity from the body 44 of a human in the Japanese-style room 2 toward the inner surface of the Japanese-style room 2 increases, as conceptually shown by the arrow in FIG. 17A. This results in loss of more heat from the body 44 than a situation without this series of effects, so that a cooling effect is obtained. Naturally, thermal radiation from the body 44 to the ceiling face, which is not shown, also contributes to the cooling effect. This cooling effect is less than in the living room 1 because of the intervening paper screen 3.

If the paper screen 3 is left open, thermal radiation is produced directly from the inner surface of the Japanese-style room 2 toward the cold/heat radiation device 110 and the inner surface of the living room 1. This reduces loss caused by the intervening paper screen 3, and therefore the temperature of the inner surface of the Japanese-style room 2 is lowered to a more notable degree than when the paper screen 3 is closed, and the cooling effect is greater.

Figure 18:
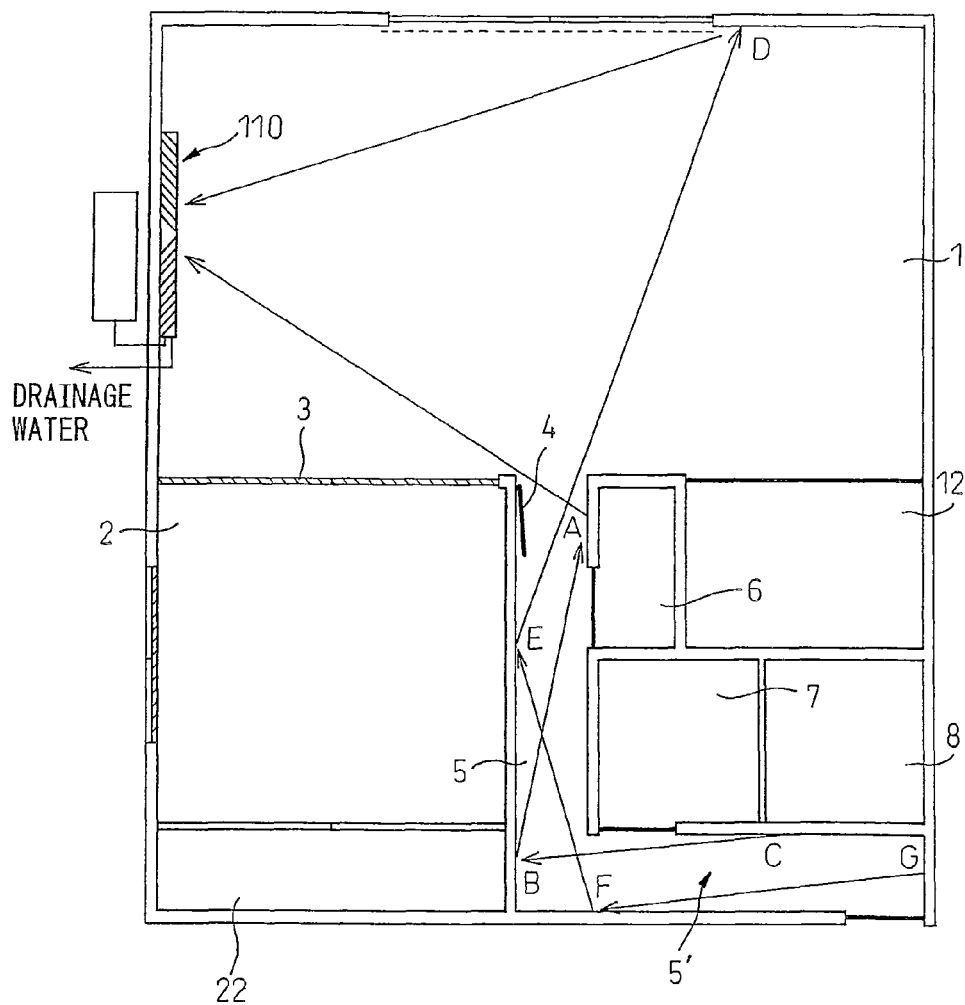
FIG. 18 is an illustration of the principle by which the cooling effect reaches areas not in view of the cold/heat radiation device of the embodiment of FIG. 12.

In this embodiment, a cooling effect can be obtained even at locations not in view of the cold/heat radiation device 110. This principle will now be explained. FIG. 18 conceptually shows a case where the cold/heat radiation device 110 is operated for cooling, with the glass door 4 between the hallway 5 and living room 1 open in the configuration shown in FIG. 12.

When the cold/heat radiation device 110 is cooled, thermal radiation takes place from the wall face A section of the hallway 5 toward the cold/heat radiation device 110, causing the temperature of the wall face A to be lowered. Lowering of the temperature of the wall face A produces a temperature difference between it and the wall face B within the range of its view, thus creating thermal radiation from the wall face B to the wall face A due to the tendency to eliminate the temperature difference, and lowering the temperature of the wall face B. By the same logic, thermal radiation is produced from the wall face C to the wall face B, thus lowering the temperature of the wall face C. These heat energy migration effects involve thermal radiation between identical molecular species and therefore take place at high efficiency.

Also, when the cold/heat radiation device 110 is cooled, thermal radiation takes place from the wall face D section of the living room 1 toward the cold/heat radiation device 110, causing the temperature of the wall face D to be lowered. Lowering of the temperature of the wall face D produces a temperature difference between it and the wall face E within the range of its view, thus creating thermal radiation from the wall face E to the wall face D due to the tendency to eliminate the temperature difference, and lowering the temperature of the wall face E. By the same logic, thermal radiation is produced from the wall face F to the wall face E, thus lowering the temperature of the wall face F. Also by the same logic, thermal radiation is produced from the wall face G to the wall face F, thus lowering the temperature of the wall face G.

These effects are exhibited in the same manner with the floor and the ceiling. Due to these effects, the far-infrared rays emitted by the body are readily absorbed into the floor face, wall faces and ceiling face of the hallway 5 even at the location indicated by 5' in the hallway 5, and a cooling effect is exhibited at that location. That is, a pathway of thermal radiation through building materials comprising the same far-infrared emitting substance is formed to the cold/heat radiation device 110, even at locations that are not in the range of view of the cold/heat radiation device 110, such that an environment is created in which thermal radiation from the body is readily absorbed into the surroundings. This effect, however, is less than the cooling effect in the living room 1 due to dissipation of the far-infrared rays and loss due to the influence of other materials.

The effect also functions effectively in the interior of the living room 1 or Japanese-style room 2. In the living room 1, for example, thermal radiation from the wall face at locations not in view of the cold/heat radiation device 110, due to furniture not shown in the drawing, is indirectly absorbed into the cold/heat radiation device 110 via the wall faces at locations that are in view of the cold/heat radiation device 110. This increases the far-infrared ray-absorbing capacity of the wall faces at locations not in view of the cold/heat radiation device 110, so that those sections of the wall faces contribute to the cooling function. Although parts of the wall faces will not be in view of the cold/heat radiation device 110 when the paper screen 3 is opened in the Japanese-style room 2, thermal radiation toward the cold/heat radiation device 110 will still be produced via the wall faces at the locations in view of the cold/heat radiation device 110, so that sections of the wall faces not in view of the cold/heat radiation device 110 will contribute to the cooling effect in the Japanese-style room 2.

When the stone powder contained in the coating layer 115b (see FIG. 14) of the fins of the cold/heat radiation device 110, the stone powder contained in the wall face D and the stone powder contained in the wall face E are of different types, loss occurs in stages during the exchange of thermal radiation discussed in relation to FIG. 18, so that a significant cooling effect cannot be obtained.

The explanation given above concerns the cooling effect, but the direction of the thermal radiation is opposite for the heating effect, and temperature of the wall faces, etc., comprising the far-infrared emitting substance increases to produce a heating effect.

Figure 15F:
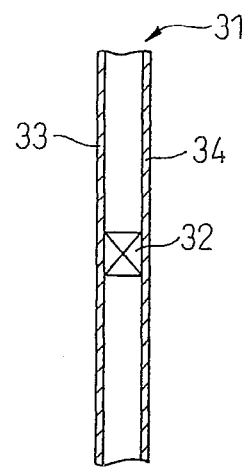
FIG. 15F is an illustration of a partitioning sliding door structure to be used for the embodiment shown in FIG. 12.

The sliding door explained below may be used instead of the paper screen 3 in FIG. 12. FIG. 15F shows a sliding door 31 that can be used instead of the paper screen 3. The sliding door 31 has a structure with decorative paper 33 and 34 attached to both sides of a wooden frame 32. The decorative paper 33 and 34 contains the same stone powder as the decorative paper 155 (see FIG. 15D) at a content of 5 wt % when dry.

Since the sliding door 31 contains the stone powder on both sides, migration of heat energy via far-infrared rays between the living room 1 and Japanese-style room 2 can take place with low loss. The function of the sliding door 31 will now be explained for cooling, as an example. The function of the sliding door 31 will now be explained for cooling, as an example. The decorative paper 33 is on the Japanese-style room 2 side and the decorative paper 34 is on the living room 1 side. Also, the sliding door 31 is closed.

During cooling, the far-infrared rays emitted from the decorative paper 34 of the sliding door 31 are absorbed into the cold/heat radiation device 110 on the living room 1 side and into the inner side (wall face, etc.) of the living room 1. Migration of thermal radiation energy takes place during this time more efficiently than with the paper screen 3, due to the principle of highly efficient exchange of thermal radiation between identical molecular species.

The decorative paper 34 that has lower temperature (a lower state of thermal energy) because of this phenomenon more readily absorbs thermal radiation from the decorative paper 33, and as a result the far-infrared rays being emitted from the decorative paper 33 are absorbed into the decorative paper 34, thus lowering the temperature of the decorative paper 33. Migration of heat energy also takes place with low loss due to the principle that migration of thermal radiation energy between identical molecular species occurs with low loss.

Far-infrared rays are also absorbed from the walls 23 and sliding door 21 of the Japanese-style room 2 into the decorative paper 33 which is at reduced temperature. This migration of heat energy also takes place with low loss since it is between identical molecular species. Thus, the temperature of the walls 23 and sliding door 21 of the Japanese-style room 2 is reduced and, due to the same principle as shown in FIG. 17A, the heat radiation quantity absorbed into the surroundings from the body 44 of a human that is present in the Japanese-style room 2 increases, so that a cooling effect is exhibited.

Stone powder-containing paper screen paper may also be used as the paper for the paper screen 3. In this case, paper with the same material as the decorative paper 33 or 34 is employed as the paper screen paper. Because such paper screen paper contains stone powder, an effect similar to the sliding door 31 is obtained.

The floor face of the living room 1 or hallway 5 may also be a stone floor constructed of a stone panel obtained by forming granite as stone powder starting material into a panel. Also, the floor heating device may be incorporated into the stone floor for floor heating. In this case, far-infrared rays emitted from the stone floor are re-emitted secondarily from the stone floor and from the wall faces and ceiling face containing the stone powder of the same material, so that a heating effect can be obtained by emission of far-infrared rays from the entire room. The wall faces or ceiling face may also be constructed of stone panel in addition to the floor face (or the floor face may be an ordinary floor face such as flooring). The stone is naturally not limited to granite.

Examples of the cooling/dehumidifying surface which dehumidifies by condensation according to the invention, or the heating surface which is heated, include not only the fins 115 and 116 shown in FIGS. 13A and 13B, but also simple surfaces. In such cases, a parts of the wall faces of the first room, for example, will serve as the cooling/dehumidifying surface provided with a coating layer comprising the ground ceramic material on a metal surface. If the surface is cooled it functions as a cooling/dehumidifying surface for dehumidification by condensation, and if it is heated it functions as a heating surface. The surface may also have a structure with irregularities or pleats to ensure sufficient surface area. Also, water droplet-drainage means such as a chute 121 is provided on the surface to collect the condensed water droplets. The structure of the water droplet-drainage means may have a design in which a trough is formed in the surface and water droplets are collected through the trough for drainage.

A rectangular columnar or circular columnar surface may also be used instead of laminar fins to form the cooling/dehumidifying surface or heating surface. In this case, a coating layer containing the far-infrared emitting substance may be formed on the surface of a rectangular columnar or circular columnar metal pipe, to form a structure in which cold water or hot water flows through the metal pipe.

In the example shown in FIG. 12, a metal blind 15 is situated on the indoor side of the glass window 14, so that thermal radiation from the glass window 14 is not absorbed into the cold/heat radiation device 110 during cooling, or thermal radiation from the cold/heat radiation device 110 is not absorbed into the glass window 14 during heating. A coating layer similar to the coating layer 115b formed on the surfaces of the laminar fins 115, 116 explained above (see FIG. 14) may also be formed on the indoor side surface of the blind 15. This can provide the same function as the wall 13, on the indoor side of the blind 15.

Figure 15G:
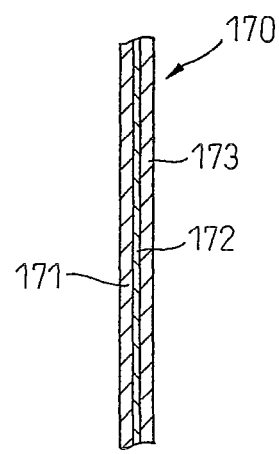
FIG. 15G is an illustration of a roll curtain structure to be used for the embodiment shown in FIG. 12.

A roll curtain may also be used instead of the blind 15. An example of the cross-sectional structure of such a roll curtain is shown in FIG. 15G. FIG. 15G shows the cross-sectional structure of a roll curtain 170 that has been drawn out from a wound roll. The roll curtain 170 has a decorative sheet 171 situated on the outdoor side (window side) and a stone powder-containing decorative sheet 173 placed on the indoor side, with an aluminum foil 172 functioning as a reflective layer against thermal radiation, situated between them. The decorative sheets 171 and 173 have resin material bases. The decorative sheet 173 is exposed on the indoor side and has a stone powder content of 10 wt %. The stone powder used is the same as contained in the coating layer 115b of the fins 115 and 116. In this example, the roll curtain 170 can function similar to the wall face 134.

Figure 15H:
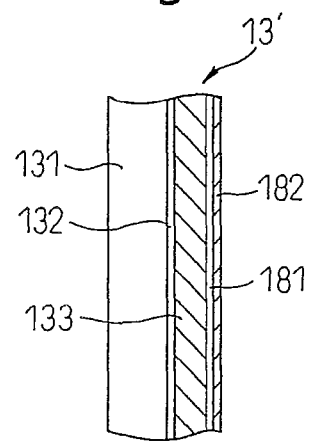
FIG. 15H is an illustration of a wallpaper-covered wall to be used for the embodiment shown in FIG. 12.

As one example of a construction in which the same far-infrared emitting substance as the cooling/dehumidifying surface is included in the wall faces, there may be mentioned an example in which the far-infrared emitting substance is added to the wallpaper. This example will now be explained. FIG. 15H is a conceptual drawing showing an example of the cross-sectional structure of a wall on which wallpaper is pasted. A wall 13' is shown in FIG. 15H. The wall 13' can be used instead of the wall 13 of FIG. 15B.

FIG. 15H also shows the building frame 131, with a gypsum board 133 with aluminum foil 132 attached thereto, mounted on the indoor side of the building frame 131. Aluminum foil 181 is also attached onto the indoor side surface of the gypsum board 133, and wallpaper 182 is attached onto the indoor side surface of the aluminum foil 181.

The wallpaper 182 comprises 3 wt % of the stone powder included in the coating layer 115b of the fin 115 of FIG. 14. Stone powder can be added to the wallpaper 182 by using a mixture of the stone powder in a slurry comprising a mixture of the starting materials, during production by paper making. In FIG. 15H, the aluminum foil 181 functions as a reflective sheet so that far-infrared rays emitted from the wallpaper 182 do not reach the gypsum board 133 side, and so that far-infrared rays from the gypsum board side do not reach the wallpaper 182. The gypsum board 133 functions as a heat-insulating layer so that heat from the wallpaper 182 does not escape to the building frame 131 or so that heat from the building frame 131 does not reach the wallpaper 182.

Since the heat exchange capacity of the wallpaper 182 can be increased in this construction, a significant effect can be expected when the wall face is used as an indirect cold radiation source or thermal radiation source. Also, the wallpaper-attached wall structure can reduce cost and minimize labor. When the wallpaper is composed of a resin sheet, stone powder may be added to the resin sheet starting material.

This particular example is an example of an indoor environment regulating system comprising a cooling/dehumidifying surface that contains a far-infrared emitting substance, wallpaper that contains a substance composed of the same molecules as the molecules composing the far-infrared emitting substance in the cooling/dehumidifying surface, a far-infrared ray reflection surface (metal sheet) situated on the rear side of the wall face, and a heat-insulating material situated on the rear side of the reflection surface. The content of the substance in the wallpaper is preferably between 1 wt % and 20 wt %.

The example described above employs granite, which is natural stone, as the far-infrared emitting substance, but the far-infrared emitting substance may be other natural stone (for example, basalt or the like) or a ceramic material (for example, silicon carbide, silicon nitride, glass or the like). The far-infrared emitting substance that has been worked into a panel may also be attached to the wall face or ceiling. A panel-shaped building material may of course include aggregates or additives as components in addition to the far-infrared emitting substance. In order to efficiently emit and absorb far-infrared rays, the far-infrared emitting substance is preferably exposed as much as possible to the indoor space. However, it is not a significant problem if the far-infrared emitting substance is not directly exposed to the indoor space, so long as it is covered with a protective layer of no greater than about 1 mm (for example, a paint layer, varnish layer, wallpaper or the like).

Different types of far-infrared emitting substances may also be used in admixture. In such cases, the mixing proportion of the far-infrared emitting substances is preferably the same in at least one face selected from among the floor face, wall faces and ceiling face and in the surface layer of the fins.

Ordinary glass used in windows and doors is also a satisfactory far-infrared emitting substance and may be used as the far-infrared emitting substance for the invention. For example, a swinging door fitted with a glass plate may be used instead of the paper screen 3 in the construction shown in FIG. 12, and the fins of the cold/heat radiation device 110 may be coated with the ground product of the glass plate fitted in the swinging door. The wall faces and ceiling faces of the living room 1, Japanese-style room 2 and hallway 5 may also be composed of plaster containing a ground product of the glass fitted in the swinging door. The content of the ground glass in the plaster is the same as explained in relation to FIGS. 12-15H. With such a construction, migration of heat energy through the glass plate-fitted swinging door used instead of the paper screen 3 will allow the cooling effect or heating effect in the living room 1 to reach the Japanese-style room 2.

The fins 115, 116, or a simple surface that can be used instead of the fins 115, 116 as explained above, may also be composed of an integral solid consisting of or comprising the far-infrared emitting substance. As such integral solids there may be mentioned sintered ceramic plates. Also, water droplets condensed on the fins 115 and 116 may be collected and recovered in a drainage tank or the like, without being drained outdoors. In addition, the surfaces of the fins or the wall face of the plaster may be polished to expose the ground infrared-emitting material, so that more efficient exchange of thermal radiation can take place.

The embodiment described above is assumed to be an example of applying the invention to a room of residence, but the invention may also be generally utilized for a classroom, office, sports facility, library, shop, or any other room in which humans are active or live. The embodiment described above is only for illustration, and appropriate building materials and methods may be selected according to the object and building site.

Also, the embodiment described above employs a single type of stone powder in the inner surfaces of the room, but use of a first type of stone powder on a first wall face surface and a second type of stone powder on a second wall face surface, for example, is possible. In this case, the fins 115 and 116 of the cold/heat radiation device 110 may be coated with a mixture of the first type of stone powder and second type of stone powder.

Also, water is used as the medium in the cold and hot water generator 111 shown in FIG. 12, but a medium other than water may be used instead. For cooling alone, for example, a known refrigerant, such as ammonia, may be used as the medium. For heating alone, oil or steam may be used as the medium.

The embodiment described above may be summarized as an indoor environment regulating system having a construction provided with a room comprising a far-infrared emitting substance in at least part of the inner surface, a cooling/dehumidifying surface that is situated in the room, comprises a substance composed of the same molecules as the molecules composing the far-infrared emitting substance and is cooled for dehumidification by condensation, and another room adjacent to the aforementioned room, wherein at least part of the inner surface of the another room contains a substance composed of the same molecules as the molecules composing the far-infrared emitting substance. It may also be described as an indoor environment regulating system having a construction wherein a first section in view of the cooling/dehumidifying surface and a second section not in view thereof are present on the inner surface of the another room, the first section and second section contain a substance composed of the same molecules as the molecules composing the far-infrared emitting substance, and the first section and second section are in view of each other.

Application examples of the present embodiment will now be described.

Stone is often already used in the wall faces or floor faces of public facility or hotel lobbies, for example. Using such a facility as an example for application of the invention, a cold/heat radiation device 110 (see FIGS. 13A, 13B and FIG. 14) comprising fins coated with a ground product of the same stone (the stone used in the wall face or floor face) may simply be installed in the existing indoor space in such cases.

As another example of applying the principle of the cooling effect according to the invention, there may be mentioned a case using clothing that employs fiber or a woven fabric (or nonwoven fabric) comprising a far-infrared emitting substance. In this case, thermal radiation takes place from the body to the clothing during cooling operation, and thermal radiation in turn takes place from the clothing to the fins of the cold/heat radiation device and the inner surface of the room, so that finally heat from the body is absorbed into the fins of the cold/heat radiation device, thus exhibiting a cooling effect. In other words, in an indoor environment regulating system comprising the structure of the living room 1 shown in FIG. 12 or the like, the clothing functions as a part of the system, absorbing heat from the body in the form of thermal radiation. When clothing is being worn, the opposite action occurs during heating, with a lower heat radiation quantity escaping from the body to the surrounding environment, thus increasing the heating effect.

For example, if nightwear (sleeping wear) is prepared as such clothing, it is possible to sleep in a cool environment when the temperature is hot and in a warm environment when the temperature is cold, if a configuration similar to the construction of the living room 1 or Japanese-style room 2 shown in FIG. 12 is used for the bedroom. Application to bedding can also produce a similar effect, if the same material as the far-infrared emitting substance is included in pillows, futons and the like. This also applies to sofas, cushions, rugs and the like. The proportion of the far-infrared emitting substance included may be the same for a wall face or the like.

This application example is an example of a cooling method and system for the human body in an environment, wherein the environment includes a first room comprising a far-infrared emitting substance in at least part of the inner surface and a cooling/dehumidifying surface situated in the first room and comprising a substance composed of the same molecules as the molecules composing the far-infrared emitting substance, which is cooled and accomplishes dehumidification by condensation, and wherein cooling of the cooling/dehumidifying surface causes thermal radiation emitted from a human wearing clothing comprising a substance composed of the same molecules as the molecules composing the far-infrared emitting substance to be absorbed into the substance in the clothing, and thermal radiation from the substance in the clothing to be absorbed into the inner surface and cooling/dehumidifying surface. The invention may also use bedding instead of clothing. This application example will be explained in further detail below.

According to another application example of the above embodiment, the room of the invention is not limited to a room used by humans for living, but may be instead a room for storage of articles (for example, a warehouse room) or a space for display (for example, a showcase). Some foods must be kept away from high temperature, while others are preferably not exposed to cold air. Still others must be kept from high temperature but are also preferably not exposed to excessive cold. A room or space applying a system of the invention may be utilized for the storage and display of such foods.

Also, a cooling system (or heating system) utilizing the invention may also be introduced into a room for breeding of animals. Introducing a cooling system utilizing the invention into a room for breeding of farm animals, for example, can reduce the burden on farm animals during seasons with high atmospheric temperature.

The room according to the invention is not limited to a room in a structure such as a house or building, and may be a room for vehicles. As vehicles there may be mentioned cars, buses, railway vehicles, ships and aircraft. Since the cooling function utilizing the invention operates with low power consumption compared to cooling with an air conditioner, it can be suitably applied to automobiles which have limited electric power capacity. It is especially suitable for utilization in small vehicles and electric vehicles.

The present invention allows exchange of heat energy through indirect thermal radiation even in locations that are not in view of a cold energy source, to utilize those locations as secondary (or indirect) cold energy sources, thus allowing a cooling effect to be effectively exhibited even in spaces having configurations in which the view in the space is blocked by a sheet back rest, such as in a passenger vehicle. When the invention is applied to a passenger vehicle space, the inside surfaces of the doors may be utilized as the wall faces in the space. Also, the far-infrared emitting substance may be included in the exposed surface of the sheet to ensure the maximum area of the far-infrared emitting substance-containing face.

The invention may also be applied to an office. In such cases, the far-infrared emitting substance may be included not only in the inner surfaces such as the wall faces of the room but also in the surfaces of partitions (also known as screens or partitionings) that divide working spaces and the like, in order to utilize the partitions as secondary cold radiation sources (or secondary thermal radiation sources) similar to the wall faces. In order to provide such a function in the partitions, the surface material covering the surfaces of the partitions (a surface material made of a woven fabric, for example) may be impregnated with a binder comprising the ground product of a far-infrared emitting substance.

Table 3 below shows the results of measuring the heat radiation quantity of the fins 115 of the cold/heat radiation device 110 (see FIGS. 13A and 13B), the wall face sections indicated by [1]-[9], and a human body, for the embodiment shown in FIG. 12, using a heat radiation meter. The heat radiation meter used here was an ER-1PS by Optex, Inc. (measuring wavelength range: 7-20 µm), at a distance of 1 m from the measuring section to be measured. Measurement for the fins 115 was conducted at the center of the area of alignment of the fins 115. The measurement was carried out at nighttime in order to avoid the effects of sunlight. The temperature of the fins was set to the preset temperature of the controller accessory of the cold and hot water generator 111. For human body measurement, the human was an adult male (body weight: 64 kg), wearing a cotton T-shirt on the upper body and cotton breeches on the lower body. Each measurement was conducted after 1 hour had passed after setting the temperature. The paper screen 3 in FIG. 12 was closed, the glass door 4 was open, and the door of the toilet 6 was closed. The outdoor air temperature was approximately 28° C. The area ratio between the total area of the fins and the living room 1 (wall faces+ceiling face) was approximately 1:20. The floor was ordinary flooring.

The measured values obtained with the heat radiation meter are values displayed on the display of the heat radiation meter, and are the raw data without emissivity-based calibration. The values are also arbitrary values, and the absolute values thereof do not directly represent the values for the thermal radiation energy. For simplicity of explanation and convenience, however, data for the heat radiation meter shown in Table 3 will be referred to as heat radiation quantities hereunder. Since the heat radiation quantities in Table 3 are within the measurable range of the heat radiation meter (several tens of square cm under these conditions), they may be considered to correspond to the heat radiation quantity per unit area.

TABLE 3

| | Fin temperature 9° C. | Fin temperature 11° C. | Fin temperature 20° C. | Fin temperature 25° C. |
|---|---|---|---|---|
| Fin | 248 | 253 | 285 | 318 |
| Living room [1] | 298 | 300 | 304 | 308 |
| Living room [2] | 300 | 300 | 306 | 309 |
| Paper screen, living room side [3] | 301 | 305 | 307 | 309 |
| Paper screen, Japanese room side [4] | 300 | 305 | 307 | 308 |
| Japanese-style room wall face [5] | 305 | 307 | 309 | 309 |
| Japanese-style room wall face [6] | 305 | 306 | 308 | 308 |
| Japanese-style room wall face [7] | 305 | 305 | 308 | 308 |
| Hallway wall face [8] | 302 | 306 | 308 | 309 |
| Toilet wall face [9] | 309 | 310 | 310 | 310 |
| Human | 321 | 320 | 325 | 327 |
| Living room indoor temperature | ~25° C. | ~25° C. | ~27° C. | ~28° C. |

The fin temperatures 9° C. and 11° C. correspond to cooling operation, a fin temperature of 20° C. corresponds to very moderate cooling, and a fin temperature of 25° C. corresponds to the cold/heat radiation device 110 being in the OFF state during summer season. Since the circulating water in the cold/heat radiation device 110 requires a long time to reach room temperature even when the cold and hot water generator 111 power is OFF, it is set to 25° C. to simulate the OFF state of the cold/heat radiation device 110 during summer season.

As seen from Table 3, the heat radiation quantity of a human is a larger value than the heat radiation quantity of a fin or wall face. Because of this difference in values, relative thermal radiation is produced from the body to the fin or wall face, and the thermal radiation energy emitted from the body is absorbed into the fin or wall face.

Figure 19:
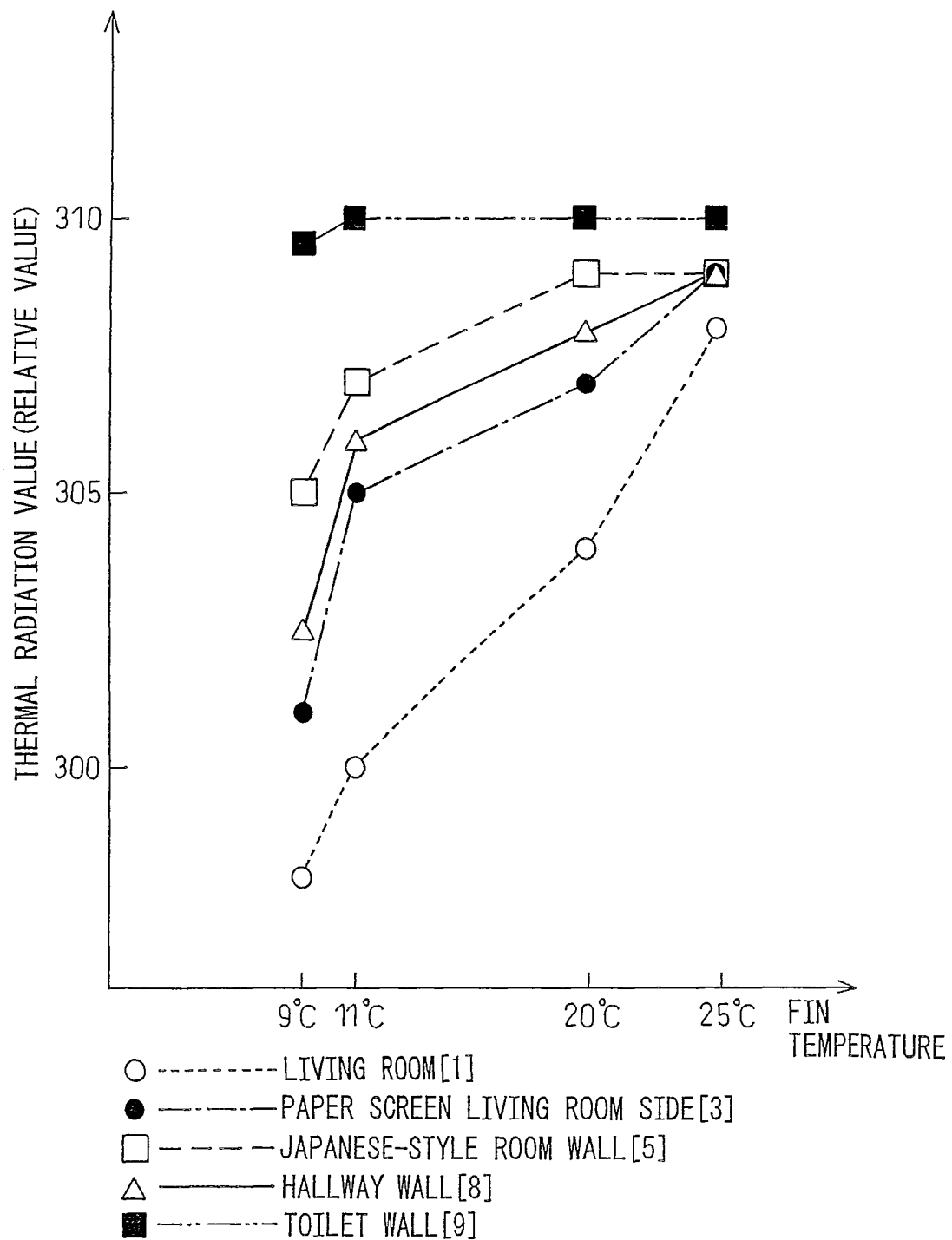
FIG. 19 is a graph showing the relationship between the fin temperature of the cold/heat radiation device and the heat radiation quantity at 5 wall sections, for the embodiment of FIG. 12.

FIG. 19 shows part of the data of the Table 3 in graph form. The shift of the circular plot points in FIG. 19 reflects the phenomenon of reduced heat radiation quantity from the wall 13 in the living room 1, by lowering the temperature of the fins. In other words, it reflects the phenomenon whereby lowering of the fin temperature increases the thermal radiation energy absorbed from the wall 13 to the cold/heat radiation device 110, by which the temperature of the wall 13 simultaneously decreases and the amount of far-infrared rays emitted from the wall 13 decreases.

Table 3 shows the measured value for the heat radiation quantity from a human standing in the center of a living room. As clearly seen in Table 3, lowering of the fin temperature causes the heat radiation quantity from the human to also decrease, though slightly. This can be understood to be a phenomenon in which the amount of thermal radiation from the body absorbed by the surroundings is increased in proportion to the reduction in fin temperature, and therefore the heat of the body decreases, thus reducing the heat radiation quantity from the body.

This is experienced as excessive cooling (i.e. coldness) when the fin temperature is 9° C. or 11° C., or a weak cooling effect when the fin temperature is 20° C. With this embodiment, a fin temperature of about 15-17° C. was found to be a comfortable cooling environment, although this depended on the outdoor air temperature and outdoor humidity.

When the circular plot points and black circular plot points in FIG. 19 are compared, the face of the paper screen 3 on the living room side has a larger heat radiation quantity value with respect to the reduction in fin temperature, compared to the wall 13. That is, the degree of cooling that followed the fin temperature was lower than the wall 13.

This suggests that since the paper screen 3 is composed of ordinary paper screen paper that does not contain granite as the far-infrared emitting substance contained in the coating layer of the fins, it cannot utilize the principle of maximum heat transfer efficiency of thermal radiation energy by thermal radiation between identical molecular species, and therefore the loss during heat transfer of thermal radiation energy is significant.

Thus, the data represented by the circular plot points and the black circular plot points may be said to indicate the superiority of utilizing the phenomenon in which heat transfer by thermal radiation between identical molecular species takes place at high efficiency.

Judging from Table 3, lowering the fin temperature from 25° C. to 9° C. lowers the heat radiation quantity of the fins by 70. Consequently, when a human in an environment with a fin temperature of 25° C. (heat radiation quantity: 327) moves to an environment with a fin temperature of 9° C., the difference in heat radiation quantity between the body and the fins increases from 9 to 79, and the heat radiation quantity absorbed into the fins from the body increases by the difference of 70, and a feeling of coolness is perceived by that amount.

On the other hand, Table 3 also shows that lowering the fin temperature from 25° C. to 9° C. causes the heat radiation quantity of the wall section [1] in the living room 1 to fall from 308 to 298. Consequently, when a human in an environment with a fin temperature of 25° C. (heat radiation quantity: 327) moves to an environment with a fin temperature of 9° C., the difference in heat radiation quantity between the body and the wall [1] section of the living room 1 increases from (327−308)=19 to (327−298)=29, and the heat radiation quantity absorbed into the wall [1] section of the living room 1 from the body increases by the difference of 10.

The degree of increase in the difference between the heat radiation quantities of the wall 13 and the body (a numerical value of 10) is about 14% of the degree of increase in the difference between the heat radiation quantities of the fins and the body (a numerical value of 70).

However, since the area ratio between the total area of the fins and the area of the living room 1 (wall faces+ceiling face) is approximately 1:20, and the total amount of thermal radiation energy is proportional to the area of the sections in which thermal radiation takes place, if it assumed that all of the wall faces and ceiling face of the living room 1 function in the same manner, it may be assumed that a cold radiation effect equal to or greater than that of the cold/heat radiation device 110 operates with the walls and ceiling as a whole. Furthermore, since the walls and ceiling are located surrounding the human, the thermal radiation energy emitted by the human is effectively absorbed as a whole. Thus, it is concluded that the contribution of the cooling effect of the walls and ceiling comprising stone powder is equal to or greater than that of the cold/heat radiation device 110, and is effective.

FIG. 19 shows the phenomenon whereby reduction in fin temperature lowers the heat radiation quantity at the wall [5] section of a Japanese-style room 2 partitioned with a paper screen 3. While the degree of reduction in heat radiation quantity at the wall [5] section of the Japanese-style room 2 shown in FIG. 12 is lower than that in the living room 1, a phenomenon can be seen from FIG. 19 in which the cooling effect utilizing thermal radiation according to the invention reaches from the living room 1 to the Japanese-style room 2 through the closed paper screen 3. A cooling effect is in fact felt in the Japanese-style room 2, although not as much as in the living room 1. The data in FIG. 19 coincide with this actually perceived result. If the paper screen 3 is opened, it is expected that an effect of heat transfer of thermal radiation energy between identical molecular species would operate, such that the cooling effect in the Japanese-style room 2 is further increased.

FIG. 19 shows data indicating reduction in the heat radiation quantity at the wall [8] sections of the cold/heat radiation device 110 which are not in view of the fins. These data suggest the mechanism explained in relation to FIG. 18. A cooling effect is in fact felt near 5' in the hallway 5 (see FIG. 18), although not as much as in the living room 1. The data in FIG. 19 coincide with this actually perceived result.

Judging from FIG. 11, no significant change is seen in the heat radiation quantity from the wall [9] sections of the toilet 6 even when the fin temperature is lowered. This suggests that, because the closed door of the toilet 6 has a structure made of plywood (a single plywood panel having a supposed thickness of about 5 mm, with unknown internal structure) attached to both sides thereof and is also coated on its exposed surfaces, the effects of thermal radiation did not reach the interior of the toilet 6. It may also be due to the fact that the wall faces of the toilet 6 were ordinary wallpaper.

With a fin temperature of 25° C., the heat radiation quantities of each section converge to similar values. This is believed to be because the thermal radiation-absorbing effect (cold radiation effect) of the fins did not function effectively. This tendency is also reflected in Table 3. That is, according to Table 3, the heat radiation quantity on the fin surface at a fin temperature of 25° C. is measured to be a larger value than the other sections, except for the human body. This may be considered to indicate the phenomenon in which the fins tend to function, though slightly, as thermal radiation sources toward the sections listed in the table other than the body, and not as cold radiation sources.

Figure 20:
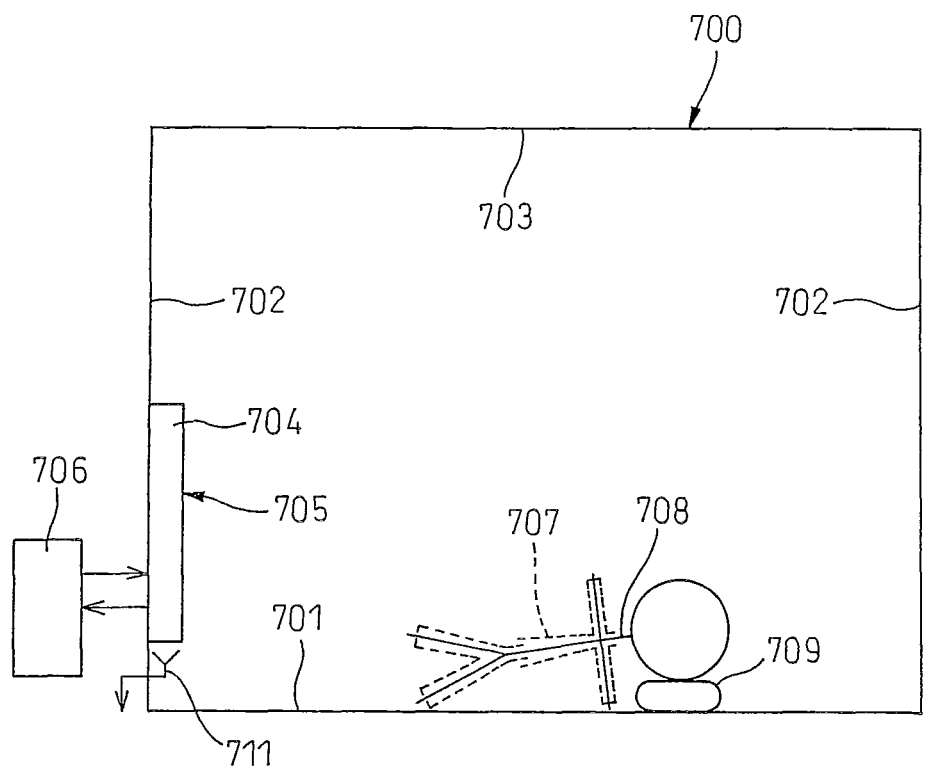
FIG. 20 is an illustration of an embodiment that utilizes the present invention to regulate a living environment.

FIG. 20 is a conceptual drawing showing an example of regulating the living environment by the principle of the invention, as an additional embodiment of the invention. A room 700 is shown in FIG. 20. The room 700 comprises a flooring floor face 701, plaster wall faces 702 and a plaster ceiling face 703. The floor face 701 is coated with a varnish comprising a mixture of stone powder obtained by grinding granite, having a 25° C. emissivity of greater than 0.9, to a size of 1 μm or smaller. The stone powder content of the varnish layer is approximately 3 wt %. The plaster in the wall faces 702 and ceiling face 703 has a thickness of approximately 3 mm, and when hardened the stone powder is present at about 5 wt %.

A cooling/heating apparatus 705 having a cooling and dehumidifying surface/heating surface 704 is situated inside the room 700. The cooling/heating apparatus 705 has a structure in which a plurality of fins (not shown) each with a cooling and dehumidifying surface/heating surface 704 on the surface are arranged in parallel. The cooling and dehumidifying surface/heating surface 704 is constructed of a coating layer obtained by coating the aforementioned stone powder on the surfaces of the fins. The fins are made of aluminum, and their interiors are structured so that cold water or hot water can flow through. The fins may be constructed of another metal material or alloy material with satisfactory heat conduction, such as iron or copper or an alloy thereof, for example. By flowing cold water or hot water through the interior of the fins, the stone powder coating layer formed on the surfaces of the fins function as cooling/dehumidifying surfaces or heating surfaces.

In this example, the coating layer is composed of a coating material comprising the stone powder that has been coated on the surfaces of the fins and hardened as a layer (a film of the coating material comprising the stone powder). The stone powder content of the film of the dried coating material is 15 wt %. The stone powder content of the coating layer will generally be 1 wt % or greater.

A cold and hot water generator 706 is placed outside of the room 700, as an outdoor device. The cold and hot water generator 706 has a known heat pump function, and it supplies cold water or hot water to the cooling/heating apparatus 705. In the case of cold water, for example, the cold water supplied to the cooling/heating apparatus 705 undergoes heat exchange and absorbs heat from the fins, thus cooling the fins. The cold water that has undergone temperature increase by heat exchange (or the water that is no longer cold water due to the temperature increase) is returned to the cold and hot water generator 706 and re-cooled, and then re-supplied to the cooling/heating apparatus 705. In the case of hot water, the hot water is supplied from the cold and hot water generator 706 to the cooling/heating apparatus 705.

Under the cooling and dehumidifying surface/heating surface 704 there is situated a chute 711 that collects condensed water droplets having dropped down into it. The water droplets collected in the chute 711 are drained to the outside.

FIG. 20 shows the state of a human body 708 wearing clothing 707 and lying down with the head placed on a pillow 709. The clothing 707 is composed of a fabric of cotton mixed with polyester fiber. The polyester fiber is spun from a starting material comprising a mixture of the stone powder. The stone powder content is 3 wt % with respect to the total clothing 707. The surface of the pillow 709 is covered with the same fabric as that composing the clothing 707.

Figure 21A:
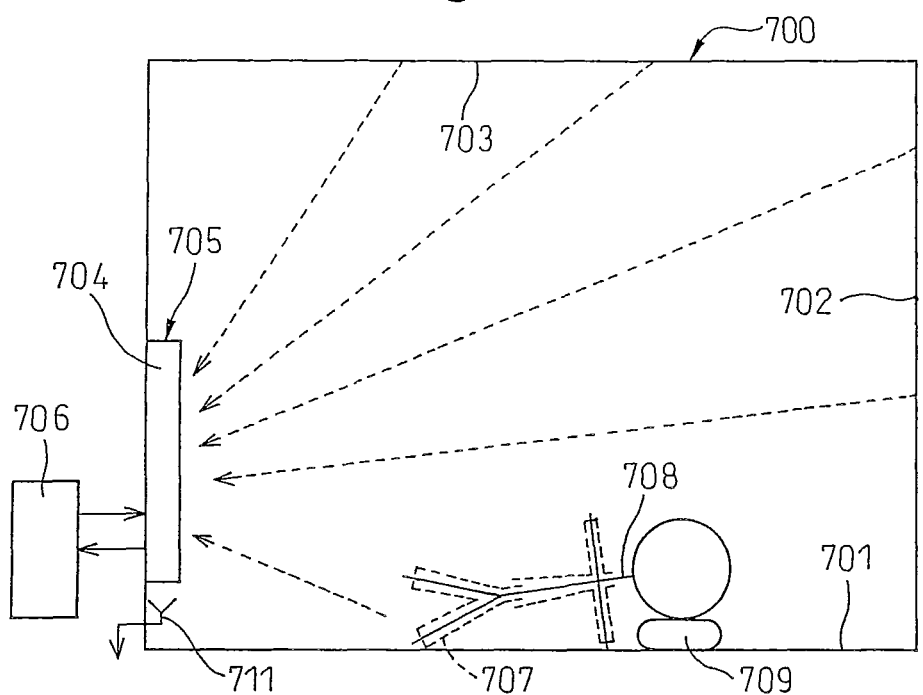
FIG. 21A is an illustration of the cooling effect of the embodiment shown in FIG. 20.
Figure 21B:
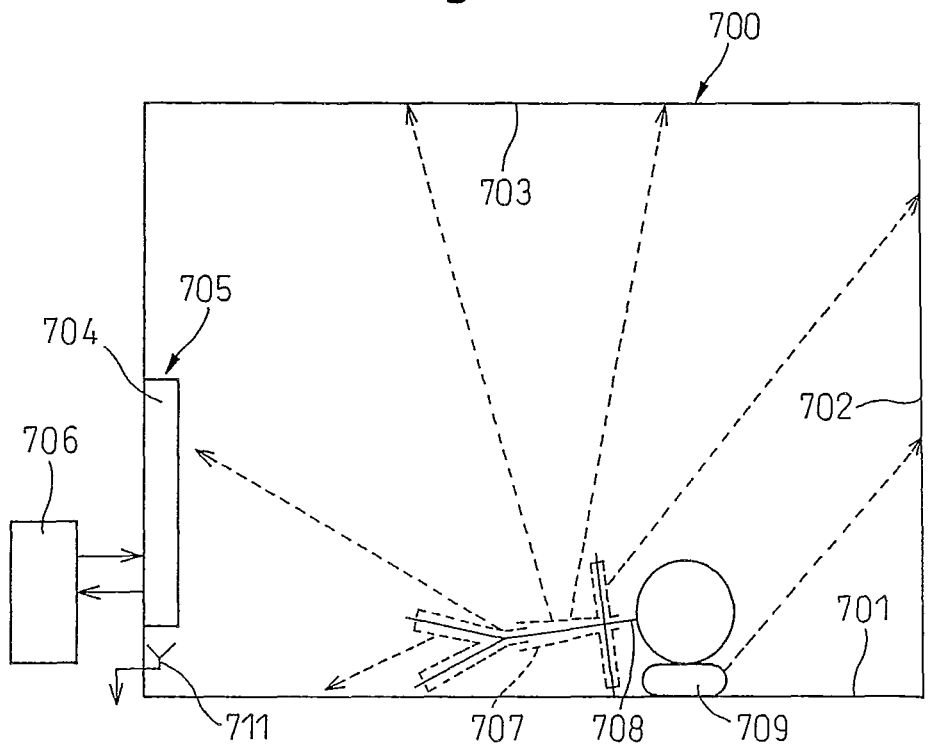
FIG. 21B is an illustration of the cooling effect of the embodiment shown in FIG. 20.

FIGS. 21A and 21B are conceptual drawings for explanation of the cooling effect for the present embodiment. When cold water is generated in the cold and hot water generator 706 and is supplied to the cooling/heating apparatus 705, the cooling and dehumidifying surface/heating surface 704 becomes cooled. Cooling of the cooling and dehumidifying surface/heating surface 704 causes the cooling and dehumidifying surface/heating surface 704 to fall to a relatively low temperature with respect to the floor face 701, wall faces 702 and ceiling face 703, so that based on Stefan-Boltzmann's law, thermal radiation is produced from the floor face 701, wall faces 702 and ceiling face 703 toward the cooling and dehumidifying surface/heating surface 704. This state is conceptually shown in FIG. 21A. This thermal radiation takes place at high efficiency due to the principle of highly efficient exchange of energy by thermal radiation between identical molecular species.

The floor face 701, wall faces 702 and ceiling face 703, from which heat energy has escaped due to thermal radiation to the cooling and dehumidifying surface/heating surface 704, lose heat energy and thus fall slightly in temperature. As a result, the temperatures of the floor face 701, wall faces 702 and ceiling face 703 are slightly reduced with respect to the clothing 707 and pillow 709 that comprise far-infrared emitting substances with the same molecular species, and the far-infrared rays emitted from the clothing 707 and pillow 709 are absorbed into the floor face 701, wall faces 702 and ceiling face 703. Heat exchange takes place at high efficiency during this time as well, due to the principle of highly efficient exchange of energy by thermal radiation between identical molecular species.

In this manner, the heat energy of the clothing 707 or pillow 709 is absorbed into the cooling and dehumidifying surface/heating surface 704 in the form of thermal radiation via the floor face 701, wall faces 702 and ceiling face 703, being finally discharged outside from the cold and hot water generator 706. There also exists, naturally, a thermal radiation component which is absorbed into the cooling and dehumidifying surface/heating surface 704 from the clothing 707 or pillow 709.

Absorption of the far-infrared rays emitted from the clothing 707 and pillow 709 into the floor face 701, wall faces 702 and ceiling face 703 causes the surface temperature of the clothing 707 and pillow 709 to be slightly reduced, to produce a state in which thermal radiation is absorbed more easily from the human body 708.

Specifically, since the body is a heating body that consistently releases heat at about 36.5° C., it constantly produces thermal radiation to its surroundings. Due to the phenomenon described above, when thermal radiation from the clothing 707 and pillow 709 is finally absorbed into the cooling and dehumidifying surface/heating surface 704 through the wall faces 702, etc., the heat radiation quantity from the clothing 707 and pillow 709 decreases (i.e., the temperature falls), and the difference between it and the heat radiation quantity from the human 708 increases. As a result, the heat radiation quantity from the clothing 707 and pillow 709 to the human 708 decreases compared to a situation without cooling of the cooling and dehumidifying surface/heating surface 704. In other words, this increases the tendency for heat from the human body 708 to be absorbed into the clothing 707 and pillow 709 in the form of thermal radiation. Thus, heat lost by the human body 709 increases compared to a situation in which the cooling and dehumidifying surface/heating surface 704 is not cooled, thus realizing an environment in which the human 708 feels coolness.

When the cooling and dehumidifying surface/heating surface 704 is cooled, condensation occurs on the cooling and dehumidifying surface/heating surface 704, causing moisture in the air to be condensed onto the cooling and dehumidifying surface/heating surface 704 as water droplets. The condensed water droplets fall down into the chute 711 and are drained to the outside. Dehumidification of the interior of the room 700 is accomplished by this mechanism. The dehumidification is also an effective function for increasing comfort inside the room 700.

According to the example described above, cooling of the cooling/dehumidifying surface 704 causes thermal radiation from the wall faces 702 and ceiling face 703 to be absorbed into the cooling/dehumidifying surface 704 and thermal radiation from the clothing 707 and pillow 709 to be absorbed into the wall faces 702 and ceiling face 703, based on the principle that exchange of heat energy takes place at higher efficiency via thermal radiation between identical molecules. As a result, the heat radiation quantities of the clothing 707 and pillow 709 decrease, producing a state in which thermal radiation from the human 708 is more readily absorbed. In addition, absorption of thermal radiation from the human 708 into the clothing 707 and pillow 709 increases the heat lost from the human 708, thus producing an environment in which the human 708 feels cool.

Since cold air does not contact the skin under this principle, no discomfort results from cold air as occurs with cooling by ordinary air conditioning. Hence, there is no chilling due to cold air or injury to the respiratory system by cold air. Moreover, since dehumidification is accomplished simultaneously, a refreshing environment is created by reduced humidity. In addition, since thermal energy emitted from the body is absorbed into the cooling and dehumidifying surface/heating surface without a process of cooling air with a refrigerant and cooling the body with the cooled air, the energy utilization efficiency is higher than with air conditioning. That is, a cooling effect can be obtained with lower energy consumption.

Furthermore, since the cooling effect of the clothing can be modified, persons sensitive to heat may wear clothing with a high far-infrared emitting substance content while persons sensitive to cold may wear clothing with a low far-infrared emitting substance content (or if necessary they may double ordinary underwear), for easy adjustment to the preferences of different people. With cooling by ordinary air conditioning, discomfort may occur for cold-sensitive persons due to cold air contacting exposed areas such as the face, hands and feet even if they wear layered clothing, while the respiratory system may be subjected to burden by breathing in cold air. Utilizing the present invention, however, eliminates the problems caused by cold air and therefore allows easier modification of the environment to suit the situation for each person.

Figure 22A:
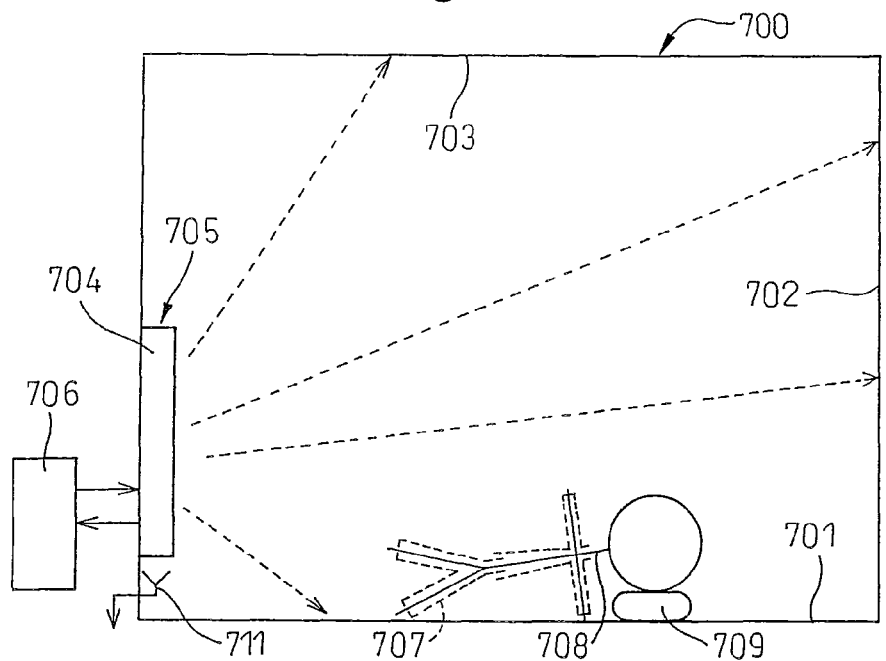
FIG. 22A is an illustration of the heating effect of the embodiment shown in FIG. 20.
Figure 22B:
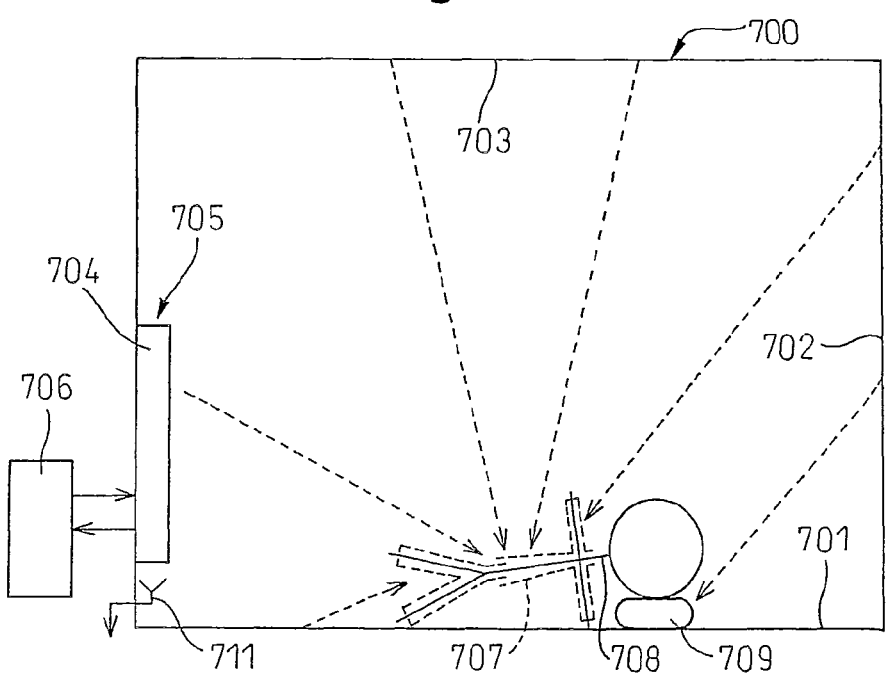
FIG. 22B is an illustration of the heating effect of the embodiment shown in FIG. 20.

FIGS. 22A and 22B are conceptual drawings for explanation of the principle of the heating effect for the present embodiment. When hot water is generated in the cold and hot water generator 706 and is supplied to the cooling/heating apparatus 705, the cooling and dehumidifying surface/heating surface 704 becomes heated. Heating of the cooling and dehumidifying surface/heating surface 704 causes the cooling and dehumidifying surface/heating surface 704 to rise to a relatively high temperature with respect to the floor face 701, wall faces 702 and ceiling face 703, so that based on Stefan-Boltzmann's law, thermal radiation is produced from the cooling and dehumidifying surface/heating surface 704 toward the floor face 701, wall faces 702 and ceiling face 703. This state is conceptually shown in FIG. 22A. This thermal radiation takes place at high efficiency due to the principle of highly efficient exchange of energy by thermal radiation between identical molecular species.

The floor face 701, wall faces 702 and ceiling face 703, that have been given heat energy by thermal radiation from the cooling and dehumidifying surface/heating surface 704, gain heat energy and thus rise slightly in temperature. As a result, the temperatures of the floor face 701, wall faces 702 and ceiling face 703 are slightly increased with respect to the clothing 707 and pillow 709 that comprise far-infrared emitting substances with the same molecular species, and the heat radiation quantities from the floor face 701, wall faces 702 and ceiling face 703 become larger than the heat radiation quantities from the clothing 707 and pillow 709, such that thermal radiation is generated from the floor face 701, wall faces 702 and ceiling face 703 to the clothing 707 and pillow 709. Heat exchange takes place at high efficiency during this time as well, due to the principle of highly efficient exchange of energy by thermal radiation between identical molecular species. There also exists, naturally, a thermal radiation component which is directly transferred from the cooling and dehumidifying surface/heating surface 704 into the clothing 707 or pillow 709.

Generation of thermal radiation from the floor face 701, wall faces 702 and ceiling face 703 into the clothing 707 and pillow 709 causes the surface temperatures of the clothing 707 and pillow 709 to increase, such that the heat radiation quantities of the clothing 707 and pillow 709 are greater than when the cooling and dehumidifying surface/heating surface 704 is not heated. As a result, the heat radiation quantity escaping from the human body 708 into the clothing 707 and pillow 709 is lower and heat loss from the human body 708 into the surroundings is reduced, thus minimizing coldness felt by the human 708 and producing a heating effect.

The fabric containing the far-infrared emitting substance may also be applied to mats or futons. A fabric containing the far-infrared emitting substance may also be utilized on furniture such as a sofa. This can produce mats, futons, sofas and the like exhibiting the same function as the clothing 707 or pillow 709 described above.

The floor face may also have a floor heating structure for heating of the floor face. In such cases, the cooling and dehumidifying surface/heating surface 704 does not need to be heated (although it may still be heated, of course). This will allow heat from the floor face to be transferred to the fabric through the wall faces and ceiling face, thus producing a heating effect. The examples described above assume a construction which allows selection of cooling and heating, but a construction with cooling alone or heating alone may be used.

The invention is not limited to the different embodiments described above, and other embodiments may be employed, such as the examples described below.

(1) An indoor environment regulating system comprising
an indoor space provided with a floor face, wall faces and a ceiling face,
a heating apparatus constructed of a material comprising at least 3 wt % of a material with a far-infrared emissivity of 0.8 or greater and having a heating surface exposed to the indoor space, and
a cooling/dehumidifying device constructed of a material comprising at least 3 wt % of the material with a far-infrared emissivity of 0.8 or greater and having a cooling/dehumidifying surface exposed to the indoor space,
wherein the floor face and the wall faces or the floor face and the ceiling face comprise at least 3 wt % of the material with a far-infrared emissivity of 0.8 or greater.

(2) An indoor environment regulating system according to (1) above, wherein
the material with a far-infrared emissivity of 0.8 or greater is a natural stone material,
the floor face is composed of a stone floor panel obtained by working the natural stone material, and
the floor face is a heating surface.

(3) An indoor environment regulating system according to (1) or (2) above, wherein the wall faces or the ceiling face comprise a ground product of the material with the far-infrared emissivity of 0.8 or greater.

(4) An indoor environment regulating system according to any one of (1) to (3) above, wherein the floor face and the wall faces or the floor face and the ceiling face have a total heat capacity of at least twice the heat capacity of the air volume in the indoor space.

(5) An indoor environment regulating system according to any one of (1) to (4) above, wherein the cooling/dehumidifying surface comprises
a metal material which is cooled, and
a covering layer comprising the material with a far-infrared emissivity of 0.8 or greater covering the surface of the metal material.

(6) An indoor environment regulating system comprising
an inner side structural member inside the room that comprises a first material with a far-infrared emissivity of 0.8 or greater which absorbs far-infrared rays generated in the room,
a cooling/dehumidifying surface which comprises the first material and which when cooled absorbs far-infrared rays emitted from the first material, and
a cooling/dehumidifying device which cools the cooling/dehumidifying surface.

(7) An indoor environment regulating system comprising
a first room which includes a far-infrared emitting substance in at least part of the inner side,
a cooling/dehumidifying surface which is situated in the first room, comprises a substance composed of the same molecules as the molecules composing the far-infrared emitting substance, and when cooled, accomplishes dehumidification by condensation, and
water droplet collecting means that collects water droplets condensed on the cooling/dehumidifying surface.

(8) An indoor environment regulating system comprising
a first room which includes a far-infrared emitting substance in at least part of the inner side, and
a heating surface which is situated in the first room, comprises a substance composed of the same molecules as the molecules composing the far-infrared emitting substance, and is heated.

(9) An indoor environment regulating system according to (7) or (8) above, which is provided with a second room that is adjacent to the first room and comprises a substance composed of the same molecules as the molecules composing the far-infrared emitting substance in at least part of the inner side.

(10) An indoor environment regulating system according to (7) or (8) above, wherein the wall faces of the first room are coated walls comprising at least 1 wt % of a ground material of the same material as the far-infrared emitting substance.

(11) An indoor environment regulating system according to (9) above,
which is provided with partitioning means that partitions the first room and second room, the partitioning means comprising a substance composed of the same molecules as the molecules composing the far-infrared emitting substance.

(12) An indoor environment regulating system according to (9) above, wherein the first room and/or second room are provided with a storage room with opening and closing means, and when closed, the first or second room indoor side surfaces of the opening and closing means comprise a substance composed of the same molecules as the molecules composing the far-infrared emitting substance.

(13) An indoor environment regulating system according to (7) above, wherein the cooling/dehumidifying surface is constructed of a coating layer comprising the far-infrared emitting substance, formed on a metal surface.

(14) An indoor environment regulating system according to (8) above, wherein the heating surface is constructed of a coating layer comprising the far-infrared emitting substance, formed on a metal surface.

The following processes may be mentioned as examples for regulating the living environment by application of an indoor environment regulating system according to the invention.

(15) A method for regulating a living environment, whereby in a room comprising a far-infrared emitting substance in at least part of the inner surface, a cooling/dehumidifying surface that is situated in the room, comprises a substance composed of the same molecules as the molecules composing the far-infrared emitting substance and accomplishes dehumidification by condensation when it is cooled, is cooled, and the heat radiation quantity from a fabric comprising a substance composed of the same molecules as the molecules composing the far-infrared emitting substance is reduced.

(16) A method for regulating a living environment, whereby in a room comprising a far-infrared emitting substance in at least part of the inner surface, a heatable heating surface, that is situated in the room and comprises a substance composed of the same molecules as the molecules composing the far-infrared emitting substance, is heated, and the heat radiation quantity from a fabric comprising a substance composed of the same molecules as the molecules composing the far-infrared emitting substance is increased.

(17) A method for regulating a living environment according to (16) above, wherein the heating surface is a floor face.

The system of (1) above is characterized by comprising an indoor space provided with a floor face, wall faces and a ceiling face, a heating apparatus constructed of a material comprising at least 3 wt % of a material with a far-infrared emissivity of 0.8 or greater and having a heating surface exposed to the indoor space, and a cooling/dehumidifying device constructed of a material comprising at least 3 wt % of the material with a far-infrared emissivity of 0.8 or greater and having a cooling/dehumidifying surface exposed to the indoor space, wherein the floor face and the wall faces or the floor face and the ceiling face comprise at least 3 wt % of the material with a far-infrared emissivity of 0.8 or greater.

According to the system of (1), the heating surface is heated to generate thermal radiation (heat radiation) in the form of emission of far-infrared rays from a material with a far-infrared emissivity of 0.8 or greater contained therein (this will hereinafter be referred to as "far-infrared emitting substance"). Here, since (a) the heating surface is exposed to the indoor space, (b) exchange of radiation and absorption of infrared rays takes place between the same materials and (c) the far-infrared emitting substance is contained in the combination sections where electromagnetic waves emitted into the room will definitely contact, such as the floor and ceiling or the floor and walls, the heat energy emitted from the heating surface is effectively absorbed into the floor or ceiling or the floor or walls.

The rest of the far-infrared emitting substance that has absorbed radiant heat from the heating surface emits secondary radiation of absorbed heat as far-infrared rays. Repetition of this action causes the room interior to be filled by thermal radiation from many directions. Thus, radiant heat is emitted from many directions in the room and a human in the room feels warmth by receiving the radiant heat. In addition to this, the radiant heat is also absorbed into the far-infrared-absorbing components in the air inside the room (mainly moisture and carbon dioxide), so that the atmospheric temperature in the room rises.

Because of this mechanism, the heat energy required to heat the heating surface is emitted into the room as radiant heat from the heating surface. This radiant heat is absorbed into the same material components (far-infrared emitting substance) of the floor, walls and ceiling as those in the heating surface. The emission and absorption of heat energy is exchange of energy by a resonance phenomenon via far-infrared rays of molecular vibrational energy between identical molecules. Consequently, emission and absorption of heat energy occurs at high efficiency and with low loss. The floor, walls and ceiling that have received the radiant heat produce secondary radiation into the room, and this heats a human body in the room or far-infrared-absorbing components in the air of the indoor space, by radiant heat.

Since this heating is not by hot air, the problems caused by contact of hot air with skin do not occur. Furthermore, since no hot air flow is utilized and radiation is accomplished evenly throughout the entire indoor space, it is possible to reduce the difference in temperature distribution in the vertical direction of the indoor space. In addition, the components of the radiant heat produced by secondary radiation from the floor or walls that have not been absorbed into the body or far-infrared-absorbing components in the air are re-absorbed into the other sections of the floor or walls and re-emitted into the indoor space, thus repeating the same effect. During this time, the far-infrared rays that have not been absorbed into the body or far-infrared-absorbing components in the air undergo the repeated cycle of radiation→absorption→re-emission of the far-infrared rays between identical molecules, and therefore can be utilized (or, used up) for heating of the body or the far-infrared-absorbing components in the air, so that waste of heat energy supplied from the heating surface can be avoided. It is thus possible to accomplish uniform heating of the far-infrared-absorbing components in the air throughout the entire room, and to avoid wasteful heating. Heating can be accomplished with energy savings for these reasons.

Since the present invention is a technique for causing absorption of radiant heat into the body of a human in an indoor space to produce a warm feeling in the human, the term "heating" will be used here to mean "the effect of producing a warm feeling in a human in an indoor space". Similarly, the term "cooling" will be used to mean "the effect of producing a cool feeling in a human in an indoor space".

In the system of (1) above, cooling of the cooling/dehumidifying surface causes the heat balance to be significantly disturbed, so that the far-infrared emitting substance contained therein efficiently absorbs radiant heat from the floor, walls or ceiling as the inner surface of the room. This utilizes the basic principle whereby an object with excellent far-infrared rays-emitting properties also has excellent far-infrared ray-absorbing properties. For absorption of radiant heat at the cooling/dehumidifying surface, since (a) the cooling/dehumidifying surface is exposed to the indoor space, (b) exchange of emission and absorption of infrared rays takes place between the same materials and (c) far-infrared rays are emitted from locations that are not in direct view of the cooling/dehumidifying surface with combinations of the floor and ceiling or the floor and walls, the radiant heat is effectively absorbed into the cooling/dehumidifying surface from the floor or ceiling or the floor or walls. The floor, walls or ceiling that have caused absorption of heat in the form of radiation into the cooling/dehumidifying surface exhibit increased ability to absorb the heat energy of a body in the indoor space or of the far-infrared-absorbing components in the air in the indoor space in the form of radiant heat. This causes heat generated by the body in the indoor space or heat of the far-infrared-absorbing components in the air in the indoor space to be lost to the floor, walls and ceiling in the form of radiant heat, so that the human feels cold and the indoor temperature is lowered. A cooling effect is thus obtained by this principle.

This effect is also accompanied by a dehumidifying function that operates by utilizing the cooling/dehumidifying surface. Since the cooling/dehumidifying surface is cooled, a suitable surface temperature is selected to allow condensation of water vapor in the indoor space. The condensed water droplets fall down and are recovered, thus allowing dehumidification of the indoor space. Since moisture in the air is a far-infrared ray-absorbing substance, it interferes with the effect of increased far-infrared ray-absorbing function of the wall faces, etc., utilizing the aforementioned radiation, and with the far-infrared ray-absorbing function from the body to the wall faces, etc. Consequently, performing dehumidification of the indoor space to remove the moisture in the air in the indoor space can increase the efficiency of the aforementioned cooling effect that utilizes radiation. Furthermore, since the discomfort index is reduced with dehumidification, it is possible to increase the cooling effect from this viewpoint as well. The cooling function of the indoor environment regulating system of the invention is a system that absorbs radiant heat from the cooling/dehumidifying surface, and therefore no forced cooling effect is produced whereby the room temperature is lowered 5° C. or more, as with an ordinary convection cooling apparatus. However, using the aforementioned dehumidifying function in combination can increase the absorption efficiency for radiant heat from the body into the building materials of the room, while also countering the high temperature and high humidity of the summer season and providing a more comfortable living environment.

With this cooling mechanism, migration of heat energy by radiation between identical molecules is utilized to cause absorption of heat energy in the indoor space into the cooling/dehumidifying surface, and therefore the heat energy migration efficiency is high and heat energy in the indoor space can be effectively absorbed into the cooling/dehumidifying surface. The cooling/dehumidifying surface can also be directly cooled by the cooling device, to obtain high cooling efficiency. It is thus possible to increase the utilization efficiency for the energy required to cool the cooling/dehumidifying surface.

Furthermore, since no movement of cooled air is used, the problems caused by direct contact of airflow with the skin with convection current system cooling do not occur. Furthermore, since no cold air flow is utilized and radiation is accomplished evenly throughout the indoor space, it is possible to reduce the difference in temperature distribution in the vertical direction of the indoor space.

As explained above, according to the present invention, heat is supplied to the body utilizing emission of far-infrared rays generated by members forming the inner surface of a room, or heat is absorbed from the body into members forming the inner surface of a room that has been rendered sensitive to absorption of radiant heat. The energy loss is therefore lower and energy utilization efficiency is higher, compared to a convection system. With a convection system, a 2-stage heat exchange procedure is necessary whereby air is heated or cooled and a human body is cooled or heated by the air, and therefore loss is significant during heat exchange. In contrast, although heating or cooling of the far-infrared-absorbing components in the air is carried out according to the invention, it is by direct heat exchange with a body utilizing radiation, and therefore loss during heat exchange can be reduced. Moreover, since the floor face or wall faces are used as thermal sources or cold energy sources, the effect of radiation can be exerted uniformly throughout the entire indoor space. Consequently, the uniformity of the effect is increased and the energy utilization efficiency for heating or cooling can be increased.

The far-infrared emitting substance used in the system of (1) above is preferably a material with a far-infrared emissivity of 0.8 or greater. As such materials there may be selected natural stone or various ceramic materials with far-infrared emissivities of 0.8 or greater. A higher emissivity is desirable, and specifically a higher effect can be obtained with a value of 0.9 or greater. The emissivity of a material is defined as $W/W_0$, where $W_0$ is the radiant energy for far-infrared rays of an ideal black body, and W is the radiant energy for far-infrared rays of the material under the same conditions. Far-infrared rays are electromagnetic waves with a wavelength of 3 μm-1000 μm.

Because the invention utilizes the phenomenon whereby exchange of radiant heat between the same materials takes place at high efficiency, an emissivity below this value for the far-infrared emitting substance will increase the loss during emission and absorption of far-infrared rays, thereby lowering the utilization efficiency of introduced energy for heating and cooling. For example, a metal has low emissivity, and therefore low capacity for exchange of heat by emission/absorption (low heat exchange capacity), while relying mainly on convection for heat exchange. The effect of the invention cannot be obtained in such cases. Even materials with low heat capacities such as wood are undesirable as far-infrared emitting substances according to the invention because of their low heat exchange capacities.

The content of the far-infrared emitting substance in the floor face, wall faces and ceiling face is preferably at least 3 wt %. According to experimental data, a content of 3 wt % or greater was found to produce a notable effect of heat exchange by the aforementioned radiation phenomenon. On the other hand, a content of greater than 20 wt % tended to saturate the heat exchange efficiency. The upper limit for the far-infrared emitting substance is therefore about 20-30 wt %. The far-infrared emitting substance may be included at a greater proportion, incidentally. Also, the far-infrared ray material itself may be used to form the floor face, wall faces or ceiling face. The far-infrared emitting substance may be included in the walls and ceiling of the system of (1) above. The sections that function as heating surfaces and cooling/dehumidifying surfaces preferably have increased far-infrared emitting substance contents from the viewpoint of ensuring heat exchange capacity by emission/absorption.

The system of (2) above corresponds to the system of (1) above in which a natural stone material with a far-infrared emissivity of 0.8 or greater is used and the floor face is constructed of a stone floor panel obtained by working the natural stone material, with the floor face being used as the heating surface. According to the system of (2) above, the floor face is constructed of a stone panel with excellent far-infrared ray-emitting properties, so that the floor face can function as a large-heat-capacity thermal storage layer, and the heating effect and cooling effect described above can be obtained to a greater degree. Using the floor face as the heating surface can also produce a floor heating effect during heating.

The system of (3) above corresponds to a system according to (1) or (2) above wherein the wall faces or the ceiling face comprise a ground product of the material with a far-infrared emissivity of 0.8 or greater. For example, when stone with a high far-infrared emissivity is used, it is sometimes difficult to use the stone itself as the wall face or ceiling face due to material cost or working cost considerations. In such cases, a ground sand of the stone is mixed with the existing wall face (for example, plaster wall) or building material (for example, gypsum board) to impart the function of a far-infrared emitting substance to the building material. This will allow the invention to be implemented while utilizing a conventional residence structure or building construction method. Also, grinding is advantageous in that it can increase the surface area of the far-infrared emitting substance and increase the far-infrared emissivity.

When the floor face is constructed of a stone floor panel and the wall faces or ceiling face are constructed of a ground stone included in an ordinary building material, it is possible to obtain an indoor environment regulating system with rapid initial heating and cooling effects. In this case, the heat capacity is relatively large since the floor face is constructed of the stone itself. In contrast, the wall faces or ceiling face are building materials comprising the ground stone of the floor face, and therefore their heat capacities are relatively smaller than the floor face. Thus, the effects of temperature changes on the floor face by radiation easily reach the wall faces and ceiling face. Consequently, the speed at which the wall or ceiling temperature follows the floor face temperature by emission and absorption of far-infrared rays is increased, and the time required for the heating or cooling effect to be felt after the power is switched ON is shortened. Since a smaller heat capacity of the wall face or ceiling face is advantageous to obtain this effect, the upper limit for the ground stone in the wall face or ceiling face is preferably about 20-30 wt % from this viewpoint as well.

The system of (4) above corresponds to any of the systems of (1)-(3) above wherein the floor face and wall faces or the floor face and ceiling face have a total heat capacity of at least twice the heat capacity of the air volume in the indoor space. The value used for the heat capacity of the air volume in the indoor space is the value measured under conditions with an atmospheric temperature of 20° C. and a humidity of 50%. In the systems of (1)-(3) above, the presence of the far-infrared emitting substance in a member on the inner side forming the room allows heating by emission of far-infrared rays from the far-infrared emitting substance or cooling by absorption of far-infrared rays from the infrared ray-emitting material. Whether emission of far-infrared rays or absorption of far-infrared rays occurs during this time is determined by the shift from the thermal equilibrium state, or in other words, on the slope of the heat gradient.

With an object A and an object B, the slope of the heat gradient is the slope from the object of relatively high temperature to the object of relatively low temperature. Based on thermodynamic principles, no migration of heat occurs if the temperature of the both are the same. When heat is transferred from object A to object B so that object B is heated, if both heat capacities are roughly equal, a heat balance is rapidly reached causing migration of heat to cease (i.e. the heat effect is weak), and therefore it is important for the heat capacity of object A to be a larger value than the heat capacity of object B. This may be considered to apply as well when heat is drawn into object A to cool object B.

In the system of (4) above, therefore, the heat capacities of the floor face and wall faces or the floor face and ceiling face, which correspond to object A in the above explanation, is at least twice the heat capacity of the air in the indoor space, which corresponds to object B in the above explanation. This will allow heating or cooling of the far-infrared-absorbing components in the air in the indoor space to be accomplished more effectively.

The system of (5) above corresponds to a system according to any one of (1)-(4) above wherein the cooling/dehumidifying surface comprises a metal material which is cooled, and a covering layer comprising the material with a far-infrared emissivity of 0.8 or greater covering the surface of the metal material. As mentioned above, the invention disclosed herein is based on the basic physical principle that exchange of heat by far-infrared rays takes place most efficiently between identical molecules (between identical materials). Therefore, if the cooling/dehumidifying surface that absorbs thermal radiation in the indoor space is a metal material wherein ordinary heat conduction is preferential, the radiant heat absorption efficiency is low (the metal surface is a good reflection surface for far-infrared rays) and the aforementioned principle of the present invention does not function effectively.

According to the system of (5) above, the upper surface of the cooling/dehumidifying surface is covered with the far-infrared emitting substance contained in the floor face and wall faces or the floor face and ceiling face, and therefore migration of heat by radiation can take place at high efficiency between the cooling/dehumidifying surface and the floor face and wall faces, or between the cooling/dehumidifying surface and the floor face and ceiling face. Also, since the ground layer of the cooling/dehumidifying surface is constructed of a metal material (for example, aluminum or copper) with good thermal conductivity, it is possible to efficiently cool the upper surface of the cooling/dehumidifying surface. Incidentally, a low far-infrared emitting substance content of the covering layer will reduce the radiant heat-absorbing function of the covering layer, and therefore the far-infrared emitting substance content in the covering layer is 3 wt % or greater and preferably 10 wt % or greater.

The system of (6) above is characterized by comprising an inner side structural member inside the room that comprises a first material with a far-infrared emissivity of 0.8 or greater which absorbs far-infrared rays generated in the room, a cooling/dehumidifying surface which comprises the first material and which when cooled absorbs far-infrared rays emitted from the first material, and a cooling/dehumidifying device which cools the cooling/dehumidifying surface.

In the system of (6) above, the inner side structural member in the indoor space is at least one of the members forming the floor, walls and ceiling. In the system of (6) above, cooling of the cooling/dehumidifying surface purposely produces a heat gradient from the inner side structural member with respect to the cooling/dehumidifying surface, thereby creating a flow of radiant heat from the inner side structural member toward the cooling/dehumidifying surface, lowering the heat of the inner side structural member, and forming a heat gradient from the person in the indoor space or air in the indoor space toward the inner side structural member. This causes active absorption of thermal radiation from the person in the indoor space or the far-infrared-absorbing components in the air in the indoor space into the inner side structural member, producing a cooling effect.

Since the human body is cooled using radiation in the system of (6) above, it is possible to obtain higher energy utilization efficiency compared to a convection cooling system that produces cold air and delivers it into the indoor space. In particular, since cold air is not directly contacted with the skin, it is possible to avoid discomfort or adverse effects on health produced by contact of cold air with the skin.

In an air conditioning system of a type that contacts cold air with the skin (i.e. a conventional convection type), 2-stage heat exchange is necessary whereby cold air is produced and contacted with the human body, and therefore energy loss during heat exchange (conversion loss) is considerable. As a result, the air must be excessively cooled in light of the expected conversion loss, so that the atmospheric temperature in the indoor space tends to be set too low. This is a cause of "cooling disorder".

Since cooling of the body by radiation can minimize such conversion loss, and the body is directly cooled, there is no need to excessively cool the air in the indoor space. Onset of cooling disorder can thus be prevented.

The system of the invention utilizes the phenomenon of emission and absorption of far-infrared rays by building materials of rooms (floor, wall and ceiling members). The effect is therefore reduced with a low proportion of use of building materials exhibiting this phenomenon. The proportion of area of the sections containing the far-infrared emitting substance of the total area of the floor face and wall faces or the floor face and ceiling face is 50% or greater, preferably 60% or greater and more preferably 70% or greater. This will allow the heating function and cooling function by radiation to be more effectively exhibited.

The system of (7) above is characterized by comprising a first room which includes a far-infrared emitting substance in at least part of the inner side, a cooling/dehumidifying surface which is situated in the room, comprises a substance composed of the same molecules as the molecules composing the far-infrared emitting substance, and when cooled, accomplishes dehumidification by condensation, and water droplet collecting means that collects water droplets condensed on the cooling/dehumidifying surface.

The system according to (8) above is characterized by comprising a first room which includes a far-infrared emitting substance in at least part of the inner side, and a heating surface which is situated in the room, comprises a substance composed of the same molecules as the molecules composing the far-infrared emitting substance, and is heated.

Here, the substance composed of the same molecules as the molecules composing the far-infrared emitting substance is a substance of identical molecular species as the far-infrared emitting substance (a substance having the same composition and the same molecular structure).

In the systems of (7) and (8) above, the proportion of the sections comprising the substance composed of the same molecules as the molecules composing the far-infrared emitting substance, on the inner side of the room, is preferably at least 25%, more preferably at least 40% and even more preferably at least 60%. This is because, since the area of the inner surface of the room is utilized for absorption of thermal radiation from the body and supply of thermal radiation to the body, a larger proportion of area at the sections contributing to heat exchange will increase the cooling effect or heating effect. The inner surfaces of the room are the faces on the inside of the room, and they include the floor face, wall faces and ceiling face, as well as openings such as doors of the hallway or other rooms, storage room doors, windows and the like.

The system of the invention may have a construction wherein the same far-infrared emitting substance is added to one or more faces, selected from among the wall faces, the floor face and the ceiling face. In an ordinary home, however, the wall faces are the most effective as locations for including the same far-infrared emitting substance as that in the face that functions as a cooling/dehumidifying surface or heating surface. This is because in the room of an ordinary home, the area of the wall faces constitutes the largest part of the area forming the indoor space, and can effectively receive radiation from the body regardless of body posture. If permitted in terms of cost, the greatest effect is obtained if two or more faces among the floor face, wall faces and ceiling face, and more preferably all of the faces, contain the far-infrared emitting substance.

According to the system of (7) above, cooling of the cooling/dehumidifying surface lowers the temperature of the far-infrared emitting substance in the cooling/dehumidifying surface with respect to the far-infrared emitting substance in the inner surface (for example, wall faces) of the first room. With two objects having a temperature difference, thermal radiation is emitted from the object at relatively high temperature to the object at low temperature. The migrating radiant energy is directly proportional to the fourth power of the temperature, according to Stefan-Boltzmann's law. When this phenomenon operates between the same substances (between identical molecular species), the identical molecular vibration causes migration of heat energy to take place at high efficiency, similar to energy exchange by resonance.

Due to this phenomenon, heat energy migrates in the form of thermal radiation from the inner surface of the first room to the cooled cooling/dehumidifying surface. The heat energy is discharged out of the system through cooling means that cools the cooling/dehumidifying surface. The far-infrared emitting substance in the inner surface of the first room that have lost heat energy in the form of thermal radiation, and the temperature falls by that amount. When the same far-infrared emitting substance is not present in the cooling/dehumidifying surface and the inner surface of the first room, transport of energy does not take place at high efficiency by thermal radiation between identical molecular species, and the temperature-lowering effect is minimal.

When the temperature of the far-infrared emitting substance in the inner surface of the first room is lowered, the temperature of the surface section of the walls, as the base material (base), is lowered by heat conduction between the solids. As a result, the function of absorbing far-infrared rays from the body, exhibited by the sections of the inner surface of the first room containing the far-infrared emitting substance, is increased. In other words, the temperature difference between the body and the sections of the inner surface of the first room containing the far-infrared emitting substance is large, and radiant energy from the body is readily absorbed into the inner surface of the first room, proportionally to the difference in the fourth power of each temperature. A direct thermal radiation-absorbing effect from the body into the cooling/dehumidifying surface is also active during this time.

Since a relatively large area can be ensured for the inner surface of the first room compared to the area of the cooling/dehumidifying surface, the total amount of thermal radiation from the body to the inner surface of the first room acts on the area of the sections of the inner surface of the first room containing the far-infrared ray material. Consequently, thermal radiation from the body is absorbed in a section with a wide area. The thermal radiation from the body is finally absorbed into the cooling/dehumidifying surface and discharged out of the system. The phenomenon whereby thermal radiation from the body is absorbed into the cooling/dehumidifying surface through the inner surface of the first room is according to the principle of the cooling effect of the invention. That is, exchange of heat energy via thermal radiation which cools the inner surface of the room to function as an indirect (secondary) cold energy source, and thus actively absorb thermal radiation from the body not only into the cooling/dehumidifying surface but also into the inner side of the room, may be said to be the principle of the invention. The effect in which a human feel coolness is referred to as a cooling effect. The opposite effect in which a human feels warmth is referred to as a heating effect.

The principle of the cooling effect in the first room described above acts even when the cooling/dehumidifying surface and the sections of the inner surface of the room containing the far-infrared emitting substance are not in view of each other due to obstacles between them. In such cases, if a wall face or ceiling face containing the far-infrared emitting substance is placed in view of both, migration of heat energy will occur by thermal radiation between them, and finally heat will be absorbed into the cooling/dehumidifying surface. The temperature of the far-infrared emitting substance in the inner surface of the room will fall in this case as well, such that a cooling effect will be exhibited by absorption of far-infrared rays from the body. Thus, even locations that are not in view of the primary cold energy source (cooling/dehumidifying surface) in the first room receive heat energy indirectly via thermal radiation, and therefore those locations (for example, walls) can function as indirect cold energy sources.

The above explanation assumes a cooling effect from locations that are not in view of the primary cold energy source (cooling/dehumidifying surface) of the first room, by utilizing indirect thermal radiation through surfaces that are in view of the primary cold energy source, but two or more faces containing far-infrared ray materials can contribute to migration of heat energy from the locations not in view of the primary cold energy source toward the primary cold energy source. Thus, when there is no face in view of the primary cold energy source in a range which is in view of a given location that is not in view of the primary cold energy source, migration of heat energy is possible from the given location through the face, and then through a separate face that is in view of the primary cold energy source (i.e. exchange of thermal radiation in stages).

Such migration of heat energy via indirect radiation functions as a significant phenomenon due to the principle that energy migration by radiation between identical molecular species takes place at high efficiency. Consequently, this effective indirect migration of heat energy does not occur between materials of different molecular species, even if they are far-infrared emitting substances having an emissivity of 0.6 or greater.

Furthermore, since the cooling/dehumidifying surface accomplishes dehumidification by condensation, it is possible to obtain a comfortable feel by dehumidification in addition to the cooling effect. Since moisture in the air is a good far-infrared ray-absorbing material, removal of the moisture in the air can even more effectively produce the cooling effect utilizing thermal radiation. Also, while the base material of the cooling/dehumidifying surface is preferably made of a metal (aluminum, iron, copper or an alloy) with good heat conduction from the viewpoint of cooling efficiency (or heating efficiency), metals have low emissivity and therefore a sufficient effect of dehumidification by condensation is not exhibited merely by cooling them. This is because, due to the low emissivity of metals, the efficiency of absorption of thermal radiation from the moisture in the air to a metal surface near the metal surface is low, such that the efficiency for generation of water droplets onto the surface of the metal by condensation of moisture is also low. According to the invention, on the other hand, the cooling/dehumidifying surface contains a far-infrared emitting substance with high emissivity, and therefore the emissivity of the cooling/dehumidifying surface can be increased and the efficiency of absorption of thermal radiation from moisture in the air into the cooling/dehumidifying surface near the cooling/dehumidifying surface can be increased. It is therefore possible to increase the efficiency by which moisture in the air is condensated onto the cooling/dehumidifying surface. That is, it is possible to increase the dehumidification effect.

The explanation above concerns the cooling effect, but the heating effect is the opposite. That is, heating the face functioning as the cooling/dehumidifying surface causes it to become a heating surface, and the heat of the heating surface is absorbed into the far-infrared emitting substance on the inner surface of the first room, causing its temperature to increase. Increase in the temperature of the far-infrared emitting substance on the inner surface of the first room results in a greater amount of far-infrared ray emission from them, whereby the heat radiation quantity absorbed from a human in the first room into the inner surface of the room decreases, and a heating effect is produced. If the temperature of the inner surface of the room comprising the far-infrared emitting substance increases above body temperature during this heating, thermal radiation will take place from those sections to the body, resulting in a higher heating effect.

In order to obtain the cooling effect or heating effect described above, the far-infrared emitting substance content in the inner surface of the room comprising the far-infrared emitting substance is preferably 1 wt % or greater, and a greater effect is obtained with a content of 3 wt % or greater. This also applies for a cooling/dehumidifying surface or heating surface containing a substance composed of the same molecules as the molecules composing the far-infrared emitting substance. If the value of the content is below 1 wt %, the effect of high-efficiency exchange of thermal radiation will be reduced. The upper limit for the content is about 20-30 wt % in the inner surface (wall faces, etc.) of the room. The cooling/dehumidifying surface or heating surface preferably contains more of the far-infrared emitting substance, within the possible range.

Utilizing the system of (7) above makes use of high-efficiency energy migration, so that the area occupied by the cooling/dehumidifying surface can be minimized. This is advantageous from the viewpoint of reducing working costs and achieving effective utilization of interior decoration and indoor area. Furthermore, since the cooling effect is based on exchange of heat energy via thermal radiation, it is possible to reduce the frequency of heat exchange via conversion of energy forms and thus reduce conversion loss during heat exchange, compared to cooling with an air conditioner whereby air is cooled and contacted with the body to cool it, so that energy consumption can be minimized.

The purpose of the room is not restricted, and it may be a hallway, passageway, lavatory, toilet, main entrance indoor space, storage room or the like, or it may be a shop or public facility room, or a warehouse, office, animal-breeding room, warehouse, food storage room or the like. The room may also be the passenger or freight compartment of a vehicle.

The far-infrared emitting substance may be any one with a far-infrared emissivity of 0.6 or greater, and materials with 0.8 or greater are preferred. As such materials there may be selected natural stone or various ceramic materials with far-infrared emissivities of 0.6 or greater. A higher emissivity is desirable, and specifically a higher effect can be obtained with a value of 0.9 or greater. The emissivity of a material is defined as $W/W_0$, where $W_0$ is the radiant energy for far-infrared rays of an ideal black body, and W is the radiant energy for far-infrared rays of the material under the same conditions. The value of the emissivity may be the value at near 10 μm where thermal effects on the human body are greatest and preferably at room temperature which is near the actual use temperature (for example, 25° C.)

If the emissivity of the far-infrared emitting substance is below this value, the utilization efficiency for introduced energy will be reduced. For example, a metal has low emissivity, and therefore low capacity for exchange of heat by emission/absorption (low heat exchange capacity), while relying mainly on convection for heat exchange. The effect of the invention cannot be obtained in such cases. A material with low thermal conductivity, such as wood, is disadvantageous in terms of cooling efficiency of the cooling/dehumidifying surface or heating efficiency of the heating surface. For example, cooling of wood and dehumidification by condensation has very low efficiency and is not practical. Consequently, the far-infrared emitting substance used for the invention is preferably natural stone or a ceramic material. The heat exchange capacity is a parameter that is proportional to the (emissivity/heat capacity) ratio of the material.

The substance composed of the same molecules as the molecules composing the far-infrared emitting substance may be in any form. For example, if the two molecular species are identical, one may be an integral solid and the other a powder. Alternatively, both may be powders but with different particle sizes or particle shapes. Their contents in the base material may also be different. The embodiment of (7) above and the embodiment of (8) above may be utilized in a switchable manner, or separately, in a single system.

The system of (9) above corresponds to a system according to (7) or (8) above which is provided with a second room, adjacent to the first room and comprising a substance composed of the same molecules as the molecules composing the far-infrared emitting substance in at least part of the inner side.

The cooling effect utilizing exchange of thermal radiation between identical far-infrared emitting substances, described in relation to the system of (7) above, also reaches the second room that is adjacent to the first room. For example, if the first room and second room are connected by an opening, thermal radiation is exchanged through the opening and temperature reduction occurs at the sections of the second room containing the far-infrared emitting substance. During this time, even if the area of the opening connecting the two rooms is small and there are sections of the second room containing the far-infrared emitting substance that are not in view of the cooling/dehumidifying surface in the first room, the phenomenon of indirect migration of heat energy described above compensates for the temperature difference between the inner surface of both rooms and produces a cooling effect in the second room. This also applies for the heating effect.

Also, even if the first room and second room are partitioned by a partitioning member that absorbs far-infrared rays, so long as it is not a member that reflects far-infrared rays (for example, metal), exchange of heat energy via thermal radiation through the partitioning member takes place between the cooling/dehumidifying surface and first room inner surface and the partitioning member, and also between the partitioning member and the second room inner surface. That is, an effect acts whereby heat at the sections of the second room containing the far-infrared emitting substance are finally absorbed into the cooling/dehumidifying surface through the partitioning member in the form of thermal radiation. A cooling effect is therefore active in the second room. This effect is lower than the effect obtained without the partitioning member because of loss due to exchange of thermal radiation at the partitioning member. This also applies for the heating effect.

Although the relationship between the first room and second room is simply shown in (9) above, a third room or fourth room may also be present adjacent to the first room. A third room may also be adjacent to the second room. In the latter case, the cooling effect (or heating effect) in the second room reaches the third room through the second room, and therefore the resulting cooling effect (or heating effect) is lower than in the second room.

Furthermore, even when the second room is bent, inner surface (for example, wall faces) containing the far-infrared emitting substance will be present at areas beyond the bend, and exchange of thermal radiation through the stages mentioned above will allow the cooling effect (or heating effect) to work even to the areas beyond the bend.

Furthermore, the usage of the far-infrared emitting substance in the first room and second room may be the same or different. For example, a construction may be employed wherein the far-infrared emitting substance is included in all three of the floor face, wall faces and ceiling face in the first room and the far-infrared emitting substance is included in two of the wall faces/ceiling face in the second room. The limit for the far-infrared emitting substance content in the inner surface of the second room is the same as for the first room. The definition of the inner surface is also the same as for the first room.

In the system of (9) above the cooling/dehumidifying surface which requires energy consumption for the cooling effect may be in the first room or in the second room. As a result of the partitioning means, the cooling effect described above is exhibited even if the first room and second room are physically partitioned. That is, even if the first room and second room are partitioned to ensure privacy or independence, cooling of the cooling/dehumidifying surface in the first room can simultaneously produce a cooling effect in the first room and a cooling effect in the second room.

If only a cooling effect by cold radiation is desired, this can be achieved if the entire inner walls of the first room and second room are cooled and used as cold radiation faces, but it will involve large-scale installation and drastically increase working costs, while also requiring large energy consumption. If the cooling equipment must be located on the indoor side of a wall, the effective utilization area of the room will be decreased. The system of (9) above is advantageous from this viewpoint. These advantages are the same for a heating effect.

The system of (10) above corresponds to the system of (7) or (8) above wherein the wall faces of the first room are coated walls comprising at least 1 wt % of a ground material of the same material composing the far-infrared emitting substance. Since the ground product far-infrared emitting substance may be mixed into the starting material for the coated wall in the system of (10) above, it is possible to use a conventional method for working in order to lower working costs. Also, since the coated wall is a wall face ordinarily employed in housings and the like in the prior art, it has the advantage of high compatibility for persons used to conventional housings.

The coated wall is a wall obtained by coating the starting material for the wall onto a wall base layer, and as specific examples there may be mentioned lime plaster walls, diatomaceous earth walls, ordinary plaster walls, fiber walls (kyokabe, jurakukabe, etc.), sand coated walls, clay walls and the like. The coated wall is not limited to the wall faces, and may also be used for the ceiling face.

A more prominent effect can be exhibited if the mixing proportion of the ground product of the same material as the far-infrared emitting substance in the coated wall is 3 wt % or greater. The upper limit for the mixing proportion of the ground product is about 20-30 wt %. In excess of this mixing proportion, the effect will be saturated and the workability and quality of the coated wall will be adversely affected. The mixing proportion is the value measured in the dry state after working.

The ground product of the same material as the far-infrared emitting substance may be added not only to coated walls, but also to interior finishing panels (interior finishing boards) such as gypsum panels, interior sheet-like building materials such as wallpaper (also resin materials), coating material layers (painted surfaces), members on surfaces exposed to room interiors such as paper of paper screens or sliding doors, adhesive layers for adhesion onto wallpaper and the like, floor-covering sheet-like members, decorative sheets with printed grain patterns, glass, and the like. The lower limit for the mixing proportion of the ground product in these materials is the same as for a coated wall. The upper limit will differ depending on the material, but for most cases it is the same as for a coated wall. The form of the ground product may be particulate or fibrous. It may also be an amorphous ground form.

The system of (11) above corresponds to the system of (9) above which is provided with partitioning means that partitions the first room and second room, the partitioning means comprising a substance composed of the same molecules as the molecules composing the far-infrared emitting substance. According to the system of (11) above, the migration efficiency for thermal radiation energy between the first room and second room through the partitioning means is high, due to the principle that migration of heat energy via thermal radiation between identical molecular species takes placed at high efficiency. Consequently, even though the first room and second room are partitioned it is possible for the cooling effect or heating effect in the first room to effectively reach the second room. The partitioning means may be a door, wall, curtain or the like. The content of the substance composed of the same molecules as the molecules composing the far-infrared emitting substance in the partitioning means is preferably 1 wt % or greater and more preferably 3 wt % or greater, similar to the case of a wall face or the like.

The system of (12) above corresponds to the system of (9) above wherein the first room and/or second room are provided with a storage room with opening and closing means, and when closed, the first or second room indoor side surfaces of the opening and closing means comprise a substance composed of the same molecules as the molecules composing the far-infrared emitting substance. When a storage space is provided, the area occupied by the opening of the storage room is present on the wall face of the first and/or second room. By including a substance composed of the same molecules as the molecules composing the far-infrared emitting substance on the surface of the indoor side of this section, it is possible for the section to function similarly to a wall face comprising the substance composed of the same molecules as the molecules composing the far-infrared emitting substance. The content of the substance composed of the same molecules as the molecules composing the far-infrared emitting substance in this surface is preferably 1 wt % or greater and more preferably 3 wt % or greater, similar to the case of a wall face or the like.

The storage room door may be an openable door such as a swinging door, or a door with a roll-up structure (roll screen) or folding structure. The material quality is not particularly restricted. For example, a wooden door may be used for a Western-style storage room, or a paper screen or sliding door may be used for a Japanese-style storage room.

According to the invention, the same material as the far-infrared emitting substance in the cold energy source (or hot energy source) is added to as much of the inner surface of the room as possible, so that the inner surface of the room can be utilized as faces participating in exchange of thermal radiation (secondary cold radiation surfaces or secondary thermal radiation surfaces) to effectively obtain a cooling effect or heating effect. Utilizing the storage room door in the system of (12) above can ensure a surface with efficient exchange of thermal radiation.

The system of (13) above corresponds to the system of (7) above wherein the cooling/dehumidifying surface is constructed of a coating layer comprising the far-infrared emitting substance, formed on a metal surface. By forming a coating layer comprising the far-infrared emitting substance on the surface of a metal, it is possible to utilize the high cooling efficiency (the ready cooling property) of the metal and to obtain an effective cold radiation function (thermal radiation-absorbing function) due to migration of heat energy between far-infrared emitting substances. Also, since the emissivity of the coating layer can be increased, it is possible to increase the ability to absorb thermal radiation from moisture in the air, and thus increase the dehumidification efficiency by condensation. That is, it is possible to obtain a high dehumidification effect.

The system of (14) above corresponds to the system of (8) above wherein the heating surface is constructed of a coating layer comprising the far-infrared emitting substance, formed on a metal surface. With the system of (14) above, it is possible to utilize the high heating efficiency (ready heating property) of the metal and to obtain an effective thermal radiation function by migration of heat energy between the far-infrared emitting substances.

The content ratio of the far-infrared emitting substance in the coating layer for (13) and (14) above is 1 wt % or greater, preferably 3 wt % or greater and more preferably 20 wt % or greater. The materials other than the far-infrared emitting substance composing the coating layer may be coating materials, organic binders, inorganic binders, adhesives or putties, or various fillers. For example, a ground product of the far-infrared emitting substance may be mixed into the coating material or inorganic binder and coated onto the metal surface to obtain the coating layer. The mixing amount of the far-infrared emitting substance in the coating layer may be adjusted so as to be 1 wt % or greater, preferably 3 wt % or greater and more preferably 20 wt % or greater in the hardened state.

In the systems of (7)-(14) above, a reflective member that reflects far-infrared rays such as a metal foil is preferably situated on the outer side (the side opposite the room interior) of the layer containing the far-infrared-emitting material on the inner side of the room. A heat-insulating material is preferably also situated on the outer side of the reflective member. Also, the systems of (7)-(14) above preferably have openings such as windows in the rooms, with a metal blind or the like situated therein to limit thermal radiation from the exterior into the room. In addition, preferably a member provided with a far-infrared ray-reflecting layer such as a metal foil on the outer side and with a layer containing the far-infrared emitting substance on the inner side (for example, a roll screen having such a structure) is situated in the window, to impart the same effect as a wall face containing the far-infrared emitting substance, to the opening of the window.

The methods for regulating a living environment according to (15)-(17) above make use of the phenomenon whereby heat conduction by thermal radiation between identical molecular species takes place at higher efficiency than between nonidentical molecular species, and the presence of the same far-infrared emitting substance in at least part of the cooled surface and the inner surface of the room causes the inner surface of the room (for example, a wall face) to function as an absorbing member for far-infrared rays (as a secondary cold radiation source). Also, by including the far-infrared emitting substance in the fabric of clothing and the like, far-infrared rays emitted from the fabric are absorbed into the inner surface and cooling surfaces of the room, thereby reducing the heat radiation quantity from the fabric. This creates an environment in which thermal radiation from the body is readily absorbed into clothing employing the fabric. Also, if the cooling surface is changed to a heating surface, it creates an environment with less heat lost in the form of thermal radiation from the body.

More specifically, according to (15) above, in a room comprising a far-infrared emitting substance in at least part of the inner surface, a cooling/dehumidifying surface that is situated in the room, that comprises a substance composed of the same molecules as the molecules composing the far-infrared emitting substance and that when cooled accomplishes dehumidification by condensation, is cooled, and the heat radiation quantity from a fabric comprising a substance composed of the same molecules as the molecules composing the far-infrared emitting substance is reduced.

According to (16) above, in a room comprising a far-infrared emitting substance in at least part of the inner surface, a heatable heating surface, that is situated in the room and comprises a substance composed of the same molecules as the molecules composing the far-infrared emitting substance, is heated, and the heat radiation quantity from a fabric comprising a substance composed of the same molecules as the molecules composing the far-infrared emitting substance is increased.

The inner surface consists of at least part of the floor face, wall faces and ceiling face forming the inside of the room. The far-infrared emitting substance is a substance with an emissivity of 0.6 or greater, preferably 0.8 or greater and more preferably 0.9 or greater at room temperature (25° C.). A ceramic or natural stone material is preferred as the far-infrared emitting substance.

The method for adding the far-infrared emitting substance to the inner side of a room may be a method in which the inner side of the room is constructed of a coated wall (plaster wall or sand coated wall) and the ground far-infrared emitting substance is mixed into its starting material, a method in which the ground far-infrared emitting substance is mixed with the coating material and the coating material is used to form a painted wall, a method in which the ground far-infrared emitting substance is mixed with the starting material of a building material such as gypsum board, or a method in which the ground far-infrared emitting substance is mixed with wallpaper. The far-infrared emitting substance may be worked into a panel to form the inner side of the room.

The far-infrared emitting substance content in the inner side of the room is preferably 1 wt % or greater, more preferably 3 wt % or greater and even more preferably 10 wt % or greater. This also applies for a cooling/dehumidifying surface or heating surface.

The fabric may be a woven fabric or nonwoven fabric. The fiber used may be natural fiber or synthetic fiber, or a mixture of natural fiber and synthetic fiber. The method used to add the far-infrared emitting substance into the fabric may be a method in which the finely ground far-infrared emitting substance is coated onto the fabric or the fiber used to form the fabric, or a method in which the finely ground far-infrared emitting substance is mixed with a synthetic fiber starting material and the starting material is spun to obtain fiber. A method of mixing the finely ground far-infrared emitting substance with a dye used to dye the fabric may also be employed. The content of the far-infrared emitting substance in the fabric is 1 wt % or greater, preferably 3 wt % or greater and more preferably 10 wt % or greater.

The fabric used may be one generally employed in clothing, bedding, furniture and other indoor household articles. As examples there may be mentioned pajamas and shirts using the fabric, mats or beddings (for example, futons or pillows) using the fabric, furniture such as beds or sofas using the fabric, general purpose cushions or floor cushions using the fabric, coverings including bed covers or table cloths using the fabric, and curtains using the fabric. According to the invention, knitted fabrics in knitted goods are also included as fabrics.

INDUSTRIAL APPLICABILITY

The present invention can be widely used to regulate the environments of rooms or spaces in construction or architectural fields that provide various rooms and facilities in which humans live or are active, rooms for storage of articles (for example, warehouse rooms) or spaces for display (for example, showcases).

| | Reference Numbers List |
|---|---|
| 1 | Living room |
| 2 | Japanese-style room |
| 3, 25 | Paper screens |
| 4 | Glass door |
| 5 | Hallway |
| 7 | Lavatory |
| 8 | Bath room |
| 11 | Door |
| 12, 22 | Storage rooms |
| 13, 23 | Walls |
| 14, 24 | Glass windows |
| 15 | Blind |
| 21, 31 | Sliding doors |
| 41 | Floor |
| 42 | Ceiling |
| 43, 44 | Human bodies |
| 51 | Emitted far-infrared rays |
| 52, 708 | Humans |
| 53 | Re-emitted far-infrared rays |
| 61 | Far-infrared rays emitted toward cooling/dehumidifying surface |
| 62 | Far-infrared rays absorbed from body |
| 100, 700 | Rooms |
| 101 | Indoor space |
| 110 | Cold/heat radiation device |
| 111 | Cold and hot water generator |
| 115, 116, 304 | Fins |
| 200, 701 | Floor faces |
| 204 | Heater controller |
| 205 | Stone floor panel |
| 300, 702 | Wall faces |
| 301 | Cooling/dehumidifying surface |
| 302 | Refrigerant-cooling device |
| 304a | Far-infrared absorption layer |
| 313 | Plaster layer |
| 400, 703 | Ceiling faces |
| 403 | Gypsum board |
| 704 | Cooling and dehumidifying face/heating face |
| 705 | Cooling/heating apparatus |

| Reference Numbers List | |
|---|---|
| 707 | Clothing |
| 709 | Pillow |

What is claimed is:

1. An indoor environment regulating system, comprising:
an indoor space formed by a floor, a ceiling and walls;
an indoor surface structural member constructed of a material comprising a far-infrared emitting substance that emits and absorbs far-infrared rays and has a far-infrared emissivity of 0.6 or greater, and
at least one source, which may cool the indoor space, or may heat the indoor space, or may cool and heat the indoor space, having a heat transfer surface constructed of a material comprising a same far-infrared emitting substance as the far-infrared emitting substance of the indoor surface structural member,
wherein the heat transfer surface is exposed to the indoor space.

2. An indoor environment regulating system according to claim 1, wherein the indoor surface structural member is constructed of stone comprising the far-infrared emitting substance, or is constructed of a material including the far-infrared emitting substance, or has a film comprising the far-infrared emitting substance.

3. An indoor environment regulating system according to claim 1, wherein the indoor surface structural member and the at least one source are present in the same room.

4. An indoor environment regulating system according to claim 1 wherein, with a first room and a second room that are either adjacent or connected, the at least one source is located in the first room while the indoor surface structural member is located in either or both the first room and second room.

5. An indoor environment regulating system according to claim 4, wherein if a partition for the first room and second room are present, the partition comprises the far-infrared emitting substance.

6. An indoor environment regulating system according to claim 5, wherein the partition is movable.

7. An indoor environment regulating system according to claim 1, wherein the indoor surface structural member constitutes at least part of the wall face, ceiling face or floor face of an indoor space whose environment is to be regulated.

8. An indoor environment regulating system according to claim 1, wherein the indoor surface structural member contains the far-infrared emitting substance at 1 wt % or greater.

9. An indoor environment regulating system according to claim 8, wherein the indoor surface structural member contains the far-infrared emitting substance at 3 wt % or greater.

10. An indoor environment regulating system according to claim 1, wherein the heat transfer surface is constructed with a covering layer that contains the far-infrared emitting substance at 1 wt % or greater.

11. An indoor environment regulating system according to claim 10, wherein the covering layer contains the far-infrared emitting substance at 3 wt % or greater.

12. An indoor environment regulating system according to claim 10, wherein the covering layer contains the far-infrared emitting substance at 20 wt % or greater.

13. An indoor environment regulating system according to claim 10, wherein the at least one source is a device that cools, or heats, or cools and heats the heat transfer surface by circulating a medium through an internally formed fluid channel.

14. The indoor environment regulating system according to claim 13, wherein the heat transfer surface is formed by coating a material forming the fluid channel with a material comprising the far-infrared emitting substance.

15. An indoor environment regulating system according to claim 10, wherein the covering layer is formed on the surfaces of heat exchange fins made of a metal material.

16. An indoor environment regulating system according to claim 1, wherein the cooling surface carries out dehumidification by condensation.

17. An indoor environment regulating system according to claim 16, wherein the system further comprises a collector for collecting water that has condensed on the cooling surface.

18. An indoor environment regulating system according to claim 1, wherein one of the indoor surface structural member and the at least one source is a stone floor panel.

19. An indoor environment regulating system according to claim 1, wherein the far-infrared emissivity of the far-infrared emitting substance is 0.8 or greater.

20. An indoor environment regulating system according to claim 19, wherein the far-infrared emissivity of the far-infrared emitting substance is 0.9 or greater.

21. An indoor environment regulating system according to claim 1, wherein the indoor surface structural member comprising the far-infrared emitting substance has a total surface area of at least 25% of the inner area of the room in which the indoor surface structural member is located.

22. An indoor environment regulating system according to claim 1, wherein at least one article in the indoor space comprises the far-infrared emitting substance.

23. An indoor environment regulating system according to claim 22, wherein the at least one article is an article of furniture, bedding, clothing, indoor appliance, interior furnishing or storage door.

24. An indoor environment regulating system according to claim 23, wherein the at least one article is a chair, sofa, table, desk, bed, futon, blanket, bed wear, pillow, cushion, mat, partition, curtain, table cloth or bed cover.

25. An indoor environment regulating system according to claim 1, which is used to regulate the environment in a closed space where humans are active or living, a closed space in which articles are stored or exhibited, a closed space for breeding of animals or a closed space for transport vehicles.

26. An environment regulating system according to claim 25, wherein the closed space in which humans are active or living is a closed space in a separate or multiple dwelling house, an office, an educational facility, a sports facility, a library or a shop.

27. An environment regulating system according to claim 25, wherein the closed space in which articles are stored or exhibited is a closed space in a warehouse, a showcase or an exhibition case.

28. An environment regulating system according to claim 25, wherein the transport vehicle is an automobile, railway vehicle, ship or aircraft.

29. The indoor environment regulating system according to claim 1, wherein the heat transfer surface is constructed of stone comprising the far-infrared emitting substance, or is constructed of a material including the far-infrared emitting substance, or is constructed of a film comprising the far-infrared emitting substance.

30. The indoor environment regulating system according to claim 1, wherein the heat transfer surface has a protective layer.

31. The indoor environment regulating system according to claim 30, wherein the protective layer has a thickness of no greater than 1 mm.

32. A method for regulating an indoor environment using the indoor environment regulating system according to claim 1.

* * * * *